US008266365B2

(12) United States Patent
Lasser

(10) Patent No.: US 8,266,365 B2
(45) Date of Patent: Sep. 11, 2012

(54) RUGGEDIZED MEMORY DEVICE

(75) Inventor: Menahem Lasser, Kohav Yair (IL)

(73) Assignee: SanDisk IL Ltd., Kfar Saba (IL)

( * ) Notice: Subject to any disclaimer, the term of this patent is extended or adjusted under 35 U.S.C. 154(b) by 490 days.

(21) Appl. No.: 12/316,924

(22) Filed: Dec. 17, 2008

(65) Prior Publication Data

US 2010/0153660 A1     Jun. 17, 2010

(51) Int. Cl.
*G06F 12/00*     (2006.01)
(52) U.S. Cl. ........................................ 711/103; 711/202
(58) Field of Classification Search .................. 711/103, 711/202
See application file for complete search history.

(56) References Cited

U.S. PATENT DOCUMENTS

| | | | |
|---|---|---|---|
| 5,974,426 A | 10/1999 | Lee et al. | |
| 6,668,336 B2 | 12/2003 | Lasser | |
| 6,832,373 B2 | 12/2004 | O'Neill | |
| 6,883,114 B2 | 4/2005 | Lasser | |
| 7,366,826 B2 * | 4/2008 | Gorobets et al. | 711/103 |
| 2003/0088804 A1 * | 5/2003 | Lasser | 714/5 |
| 2006/0050622 A1 | 3/2006 | So et al. | |
| 2007/0050535 A1 * | 3/2007 | Nelson | 711/103 |
| 2007/0106919 A1 * | 5/2007 | Chang et al. | 713/300 |
| 2008/0270680 A1 * | 10/2008 | Chang | 711/103 |
| 2009/0049222 A1 * | 2/2009 | Lee et al. | 710/300 |

FOREIGN PATENT DOCUMENTS

WO    WO 2005/066770 A2    7/2005

OTHER PUBLICATIONS

Invitation to Pay Additional Fees and Communication Relating to the Results of the Partial International Search for PCT Application No. PCT/IB2009/007784, 7 pages, Apr. 15, 2010.
International Search Report and Written Opinion for PCT Application No. PCT/IB2009/007784, 17 pages, Jul. 12, 2010.
U.S. Appl. No. 11/820,670, entitled "Memory Device with Circuitry for Writing Data of an Atomic Transaction", filed Jun. 19, 2007, 27 pages.
U.S. Appl. No. 11/820,617, entitled "Method for Writing Data of an Atomic Transaction to a Memory Device", filed Jun. 19, 2007, 27 pages.
International Preliminary Report on Patentability and Written Opinion issued in international application No. PCT/IB2009/007784, dated Jun. 21, 2011 (9 pages).

* cited by examiner

*Primary Examiner* — Hashem Farrokh
(74) *Attorney, Agent, or Firm* — Brinks Hofer Gilson & Lione

(57) ABSTRACT

A non-volatile storage device with built-in ruggedized features is disclosed. The device processes a write command to a logical block address by writing the data from the command to a non-volatile memory within the non-volatile storage device and conditionally associating the data received from the command with its corresponding logical block address. Two or more received write commands define a set of commands associated with an atomic transaction. When an end of set command is received, the device unconditionally associates the received data with each write command with its corresponding logical block address. If a power loss interrupts the reception of a set of commands, the non-volatile storage device may recover the last consistent data state before the atomic transaction was started. A write command transaction identifier allows the device to associate the command with a thread of commands that define an atomic transaction in a multithreaded system.

25 Claims, 48 Drawing Sheets

RUGGEDIZED MEMORY DEVICE

TECHNICAL FIELD

This application relates generally to the operation of non-volatile flash memory systems, and, more specifically, to ruggedized memory devices.

BACKGROUND

There are many commercially successful non-volatile memory products being used today, particularly in the form of small form factor cards, which employ flash EEPROM (Electrically Erasable and Programmable Read Only Memory) cells formed on one or more integrated circuit devices. Some of the commercially available card formats include Compact-Flash (CF) cards, MultiMedia cards (MMC), Secure Digital (SD) cards, and personnel tags (P-Tag). Hosts that may incorporate or access non-volatile small form factor cards include personal computers, notebook computers, personal digital assistants (PDAs), various data communication devices, digital cameras, cellular telephones, portable audio players, automobile sound systems, and similar types of equipment. Control of the memory may be achieved by software on a controller in the card. Besides a memory card implementation, this type of memory can alternatively be embedded into various types of host systems. In both removable and embedded applications, host data may be stored in the memory according to a storage scheme implemented by memory controller software and/or hardware. The data stored within a card is accessed via an interface that is controlled by a program and, in some cases, security hardware or software.

The increase in storage density of non-volatile memory cards allows an ever-growing number of host applications to make use of the additional storage space. For example, the additional space may be utilized for storage of MP3 audio files, high-resolution images files, video files, and documents. In cellular telephone applications, the non-volatile storage space may store a variety of data for advanced cellular telephone services, such as storing Multimedia Messaging Service (MMS) object attachments. The storage space may also facilitate full personal information management (PIM) functionality by allowing the storage of e-mail contact lists and calendars. The files may be organized in the card according to a file system stored on the card and at least partially maintained by the host accessing the card.

Certain file system operations, such as writing a file to a non-volatile storage device or memory card, can be thought of as transitioning the device from one consistent data state to another consistent data state. A sequence of separate transactions between the storage device and the host device may be required in order to cause the transition between consistent data states. A loss of power to the card (possibly caused by removing the card, or because of a loss of power to the host device) in the middle of this sequence of transactions may easily destroy the consistency of the file system.

For example, the host may direct the host device driver to overwrite a block of data in a non-volatile storage device. The process of overwriting a block in a non-volatile storage device with new data may not be atomic. The term atomicity refers to an operation that is guaranteed to proceed to completion or have no effect at all.

An atomic transaction refers to a set of operations that, from the perspective of the host caller, appears as a single operation that either succeeds or fails to execute. Overwriting a block may not be atomic because a host device driver may need to issue several separate commands to the non-volatile storage device in order to complete this operation. If a power loss occurs during the middle of the sequence of commands, the block may be left half written, with part of the block containing old data and part of the block containing new data. Consistent data states include the block with fully old data (before any overwriting occurs), or the block once fully overwritten with new data. However, when the block contains a mixture of old and new data, it is in an inconsistent data state, as it leaves the storage device or card file system in a state which is not the old state (before the write operation) or the new one (after a successful write operation).

In another example, a host application may issue a command to the file system to write a new file to the non-volatile storage device. To complete this task, the file system may issue a sequence of several device driver commands. It is possible that a power loss within the sequence of commands will allow only a few of them to be completed, while others will not take place. For example, the file might actually be written into the device, but its directory entry may not be written, so that it might now be impossible to locate the file. A more severe danger occurs when overwriting an existing file with new contents, where it might happen that the previous contents are already lost while the new contents have not yet been written—a situation which is highly undesirable. An even more severe danger occurs when the integrity of the file system structures themselves are damaged by interrupting a sequence of non-atomic operations, as the whole device contents may be lost if the file system is not designed to accommodate a power loss scenario during the update of a file allocation table.

Different techniques exist for handling a power loss scenario by providing a "ruggedized" file system for the non-volatile storage device. A ruggedized file system has the capability of staying in or being recovered to a certain known consistent data state until a sequence of operations is completed and a new known consistent data state is reached. Any interruption (such as a sudden power-loss) before reaching the new consistent data state will cause a "roll-back" of the operations which occurred after the previous consistent data state, leaving the component in this first state. In other words, a sequence of file system operations may end in a new consistent data state or in a previous consistent data state, but never in between. Thus, a ruggedized file system can survive any sudden power loss without losing its consistency, and can be recovered to a consistent data state.

Some techniques to ruggedize a file system have involved periodically copying all or a portion of the file system to another media such as a backup tape. If a failure occurs, the file system can be retrieved from the backup copy to recover a consistent data state. This method usually requires manual intervention and/or bringing the whole storage system offline when making the backup or restoring from it. Another technique implemented by some file systems does not backup the whole device contents but rather only the metadata of the file system. The backup data copy is stored on the protected device. Yet another technique involves duplicating only a portion of the file system metadata in order to create a backup for ruggedization purposes, thus reducing the performance and storage penalty associated with creating the backup.

These methods for achieving file system ruggedness are based on implementing special data structures and algorithms at the file system level. For example, these prior methods require the implementation of special snapshot bits for each block entry in the file system allocation table, and also require changing how file deletion works, to avoid erasing blocks that may still be needed for a previous snapshot of the file system. Using special data structures and algorithms at the file system level has several disadvantages. First, if the ruggedized file system is a specially designed one, with unique algorithms and data structures, utilizing another file system more suitable for a particular application requires giving up the ruggedized features, or porting the ruggedized features to the other file system. Second, a ruggedized file system using special data structures may be incompatible with other file systems. If a storage device is moved from a system with a ruggedized file system into a system with a non-ruggedized file system or vice versa, the device contents might be interpreted differently or may even not be readable at all. Third, if ruggedized file systems typically employ special algorithms all the time, a storage space and performance penalty is incurred even when some operations to the non-volatile storage device do not require ruggedness protection.

Another known technique for addressing file system ruggedness includes providing the ruggedness feature to the non-volatile storage device not inside the file system itself, but rather, in the block device driver servicing file system commands. In order to provide ruggedness features, the block device driver exports commands that allow the file system to define the current state of the non-volatile storage device as a consistent data state, and mark the beginning and end of a sequence of commands that may be required in order to cause the transition between consistent data states. In doing so, the block device driver may perform a sequence to recover a consistent data state in the event of a power loss. This technique involves modification to the block device driver of the host in communication with a non-volatile storage device, as the block device driver maintains the requisite data structures to provide ruggedness and recover the non-volatile storage device to a consistent data state in the event of a power loss. Further, if a power loss event occurs because the non-volatile storage device is removed from one host during a transition between consistent data states, and the non-volatile storage device is subsequently reconnected to another host without a ruggedized block device driver, recovery of a consistent data state in the non-volatile storage device may not be possible.

SUMMARY

In order to address these issues, there is a need for an improved technique for file system ruggedness. Described herein is a method and system for file system ruggedness, where support is provided within a controller of the non-volatile storage device itself, instead of within the file system code or block device driver of the host. In one embodiment, a non-volatile storage device includes an internal memory controller, where the controller executes flash management code. The memory controller exports to the host a few special commands to allow the host to execute rugged operations to the non-volatile memory by inserting calls of these special commands between calls of the regular device commands. The flash management code running on the controller implements the support for those special commands. The host file system and block device driver simply make use of these special commands, and are otherwise relieved of the data structure management required to provide ruggedized operation. For example, an exemplary sequence may use one special command to tell the non-volatile memory device that the current state is a "fallback" state or a consistent data state, into which the non-volatile storage device should recover to if interrupted prior to completion of the sequence. After sending this command, the host may perform any operations required by the file system, such as deleting, writing or overwriting blocks. Finally, a second special command may be utilized to tell the non-volatile storage device that the atomic sequence is complete, and hence, a new consistent data state has been reached.

In response to the special commands, the controller on the non-volatile storage device creates and manages the requisite data structure or flags to mark the memory transactions that have occurred since the last consistent memory state. If the non-volatile storage device experiences a power interruption while the host is transitioning between consistent data states, the device can recover a consistent data state without the assistance of the host when power is restored to the device. The concept(s) presented herein can be implemented in various embodiments, and this summary includes a number of exemplary embodiments.

In one embodiment, there is a method of processing an atomic transaction in a non-volatile storage device. A set of commands is received at the non-volatile storage device, where the set of commands includes two or more write commands, and each write command is associated with a corresponding logical block address and includes data. The non-volatile storage device processes each of the write commands by writing the data from each write command to a non-volatile memory within the non-volatile storage device, and conditionally associating the data received from each write command with its corresponding logical block address. A command is received at the non-volatile storage device indicating the end of a set of commands. In response to this, and without moving the data within the non-volatile storage device, for each logical block address that is associated with a write command in the set of commands, the non-volatile storage device unconditionally associates with the logical block address the data of the last command of the set of commands conditionally associated with the logical block address. In one implementation, a command may also be received that indicates the start of the set of commands, prior to receiving the first command in the set of commands.

In another embodiment, a method of processing an atomic transaction in a non-volatile storage device is provided. The non-volatile storage device receives a set of commands, where the set of commands contains two or more write commands and each write command is associated with a corresponding logical block address and contains data and a transaction identifier. The transaction identifier can permit the non-volatile storage device to associate a received write command with a set of commands, where a multi-threaded host in communication with the non-volatile storage device may interleave other commands between the write commands that are part of the set of commands sent to the non-volatile storage device. The non-volatile storage device processes each of the write commands by writing the data from each write command to a non-volatile memory within the non-volatile storage device, and conditionally associating the data received from each write command with its corresponding logical block address. When an end of set command is received, indicating an end of the set of commands associated with the transaction identifier, conditionally received data associated with that transaction identifier is unconditionally associated with the corresponding logical block address. Specifically, for each logical block address that is associated with data from a write command in the set of commands, the logical block address is unconditionally associated with the data of the last command of the set of commands conditionally associated with that logical block address.

In yet another embodiment, there is a method of writing data to a non-volatile storage device in a multi-threaded system. A transaction identifier is requested and received from the non-volatile storage device. A set of commands is transmitted to the non-volatile storage device, where the set of commands includes two or more commands associated with the transaction identifier, and at least one command in the set includes data. An end of set command is transmitted to the non-volatile storage device indicating an end of the set of commands associated with the transaction identifier.

In another embodiment, there is a method of processing a read command in a non-volatile storage device. A read command specifying the requested data is received at a non-volatile storage device. In response to the read command, data is retrieved according to one of two read procedures. In the first procedure, a most recently written version of the requested data not associated with an open transaction is selected. In a second procedure, a most recently written version of the requested data is selected. In one embodiment, the procedure to be used is defined by a configurable parameter. The selected data is then returned.

Other embodiments, and features and advantages thereof are possible and will be, or will become, apparent to one with skill in the art upon examination of the following figures and detailed description. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION OF THE PRESENTLY PREFERRED EMBODIMENTS

Figure 1:
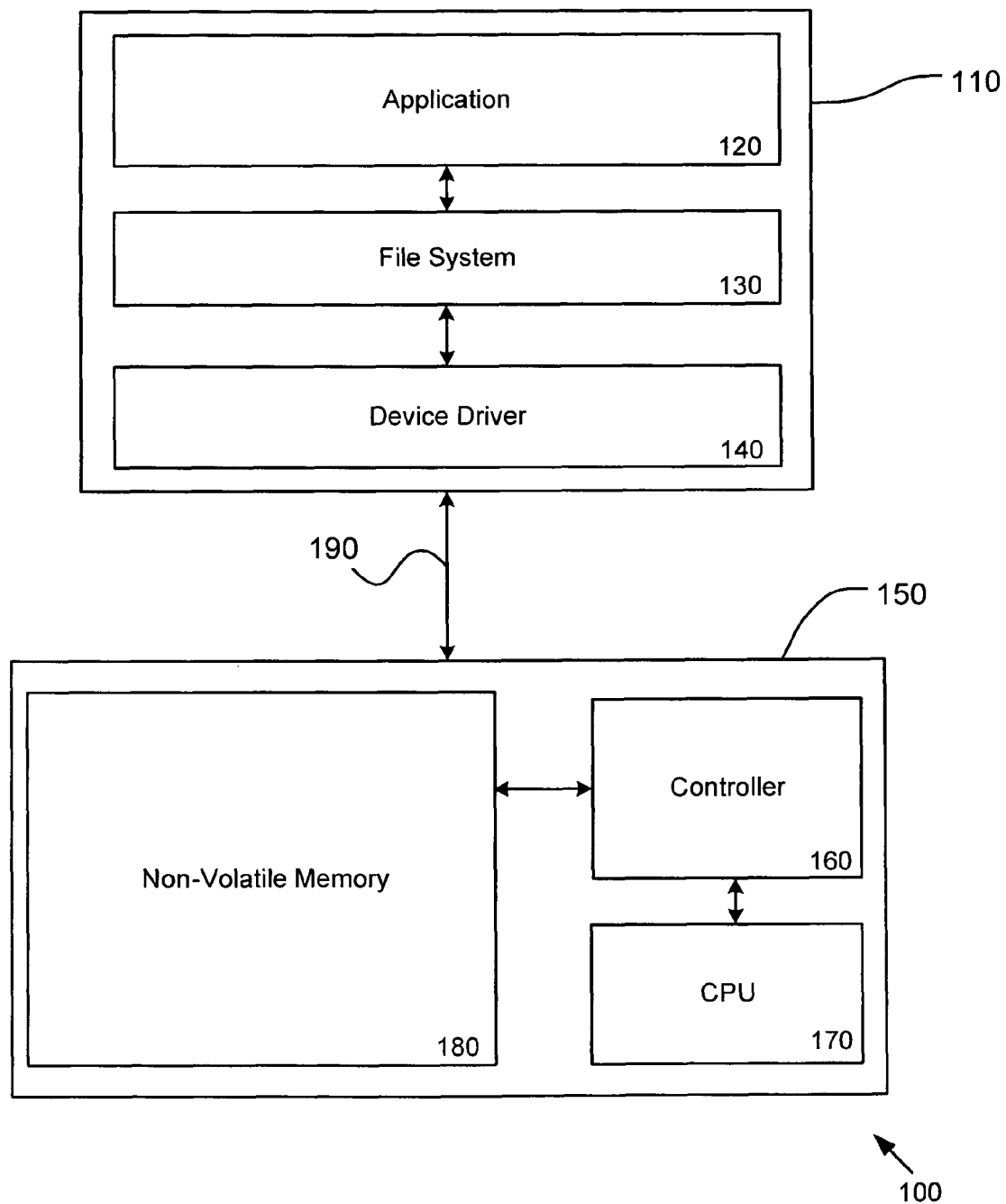
FIG. 1 is a diagram illustrating an exemplary system for accessing non-volatile storage.

Non-volatile storage devices such as removable media cards may be utilized in a variety of host systems, including personal computers, notebook computers, personal digital assistants (PDAs), various data communication devices, digital cameras, cellular telephones, portable audio players, automobile sound systems, and similar types of equipment. New host applications are continually being developed to take advantage of the increasing storage capacity of non-volatile storage devices. For example, individual host applications may read or write MP3 audio files, high-resolution images files, video files, documents, Multimedia Messaging Service (MMS) object attachments, e-mail messages, address books, and calendars.

In portable systems with removable media cards, there is a risk of losing the files stored on the card. Specifically, interruption of power to the card during a file operation may leave the file system of the storage device in an unstable or inconsistent data state. For example, a power failure of a battery-powered device during a write operation to the memory card may leave the file data, file system directory structure, or both, in an inconsistent data state. Similarly, if a user removes a non-volatile memory card from a host device in the middle of a file write or erase operation, the file system of the memory card may become corrupted.

The present embodiments are directed to an improved non-volatile storage device that supports a ruggedized file system. Specifically, the non-volatile storage device provides ruggedness to the file system within the card. A controller in the non-volatile storage device supports specialized commands that a host can use to define a consistent data state. The controller supports specialized data structures maintained within the card to track the changes to the data in the storage system that have occurred since the host last established a consistent data state. If a power interruption occurs, the controller in the non-volatile memory card "rolls back" the changes to recover the last consistent data state defined by the host. The controller can recover a consistent data state even when reconnected to host devices that are otherwise incapable of utilizing the specialized ruggedization commands for defining a consistent data state, because the controller only relies on the host device to define a consistent data state, and the controller builds its own data structures to allow it to recover the storage device to a consistent data state without assistance from the host, as explained further below. Stated another way, a host has the option to utilize specialized commands supported by the memory card to take advantage of the ruggedness features of the card. However, the card can recover a consistent data state without receiving any commands or direction from the host. Thus, recovery to a last consistent data state is not dependent on any capability or attribute of the host, such as host software that advantageously utilizes the ruggedized features of the card.

In the forthcoming explanations it is first assumed that a block is the unit of storage that can be used for all physical media operations (read, write, erase/delete, allocate), and is the data exchange unit between the host computer and the storage device. In addition, there is also presented below a more general case where this assumption is not necessarily true for erasing or allocation. As will be explained in more detail below, care must be taken to avoid confusion regarding the term "block", which is used in flash memory literature to indicate the smallest chunk of storage space that can be erased in one operation. This concept is called herein a "unit", and the term "block" as used herein refers to the basic chunk of data exchanged between host and storage or its corresponding physical allocated space.

FIG. 1 is a diagram illustrating an exemplary system 100 for accessing non-volatile storage by a host. The system 100 includes a host 110 and a non-volatile storage device 150. The components that make up the host 110 and the non-volatile storage device 150 may be implemented in hardware, software, or a combination of hardware and software. In one embodiment, the non-volatile storage device 150 is a TrustedFlash™ card, a storage device from SanDisk Corporation of Milpitas, Calif. The host 110 and the non-volatile storage device 150 may be in communication over a communication interface 190. The communication interface may be a Universal Serial Bus (USB) interface, a Secure Digital (SD) interface, or any communication interface or protocol or combination of protocols capable of exchanging commands and data between the host 110 and a non-volatile storage device 150. For example, the host 110 may transmit data and a command over the communication interface 190 to store the data in the non-volatile storage device 150. In another example, the host 110 may transmit a command over the communication interface 190 to read data from the non-volatile storage device 150, and the non-volatile storage device 150 may return data to the host 110 over the communication interface 190. Other file operations that may be transmitted over the communication interface 190 include opening, closing, creating, extending, and erasing a file. As will be discussed further below, the file system 130 and the device driver 140 may translate file level operations requested by a host application 120 into equivalent sets of block level commands to send to the non-volatile storage device 150. This translation may be required because the non-volatile storage device 150 may not have awareness of the file system structure of the data being stored in it, because the non-volatile storage device 150 primarily operates on blocks of data being read from or written to it.

The non-volatile storage device 150 may comprise a controller 160 that processes commands from the host 110 over the communication interface 190, a CPU 170 that may store its own data and perform other computational tasks, and a non-volatile memory 180 that stores data at the direction of the controller 160, and ultimately, the host 110. The controller 160 may be implemented as any combination of hardware or software. In one embodiment, the controller 160 is primarily software code executing on the CPU 170.

The host 110 may comprise one or more applications 120 that may store or access data in the non-volatile storage device 150. In one embodiment, one or more users may store or access data in the non-volatile storage device 120 using one or more applications 120. Further, applications running on a processor 170 within the non-volatile storage device 150 may store or access data therein. From the perspective of the non-volatile storage device 150, some or all of these access attempts may appear as coming from two or more separate entities.

The application 120 may rely on an application programming interface (API) provided by a host file system 130 to perform file-level accesses to the non-volatile storage device 150. As each storage device may have its own unique interface and peculiarities which make it very inconvenient to work with, it is the common practice to have a software device driver 140 included in the operating system running on the host 110 (or running on the bare hardware, if no operating system is used), with this device driver 130 providing a simplified and standardized interface for other software components wishing to access the non-volatile storage device 150, such as the file system 130. For storage devices 150 used for storing files (i.e. disks, diskettes, etc.), but not only for them, the interface provided by their device drivers is usually of the type known as "block device driver". Such device drivers 140 interact with their clients using blocks of data rather than single bytes. This applies to both input and output operations, that is, to both reading and writing data to the non-volatile storage device 150. The most common example for a block device is the magnetic disk, whose hardware interface is commonly configured for transferring only complete blocks (usually called "sectors" in this context), such as 512 bytes or more. It should be emphasized that it is not necessary for the physical storage device 150 to be physically limited to block operations in order to have a device driver 140 presenting a block device interface. For example, a battery-backed RAM disk is not physically limited to blocks and may physically read and write each of its memory bytes. Still, typically its device driver 140 presents a block device interface to the rest of the system, so as to be compatible and interchangeable with magnetic disks. Therefore, for the purpose of the present embodiments, a block device is any device whose driver presents a block device interface, regardless of its actual physical structure.

Figure 2:
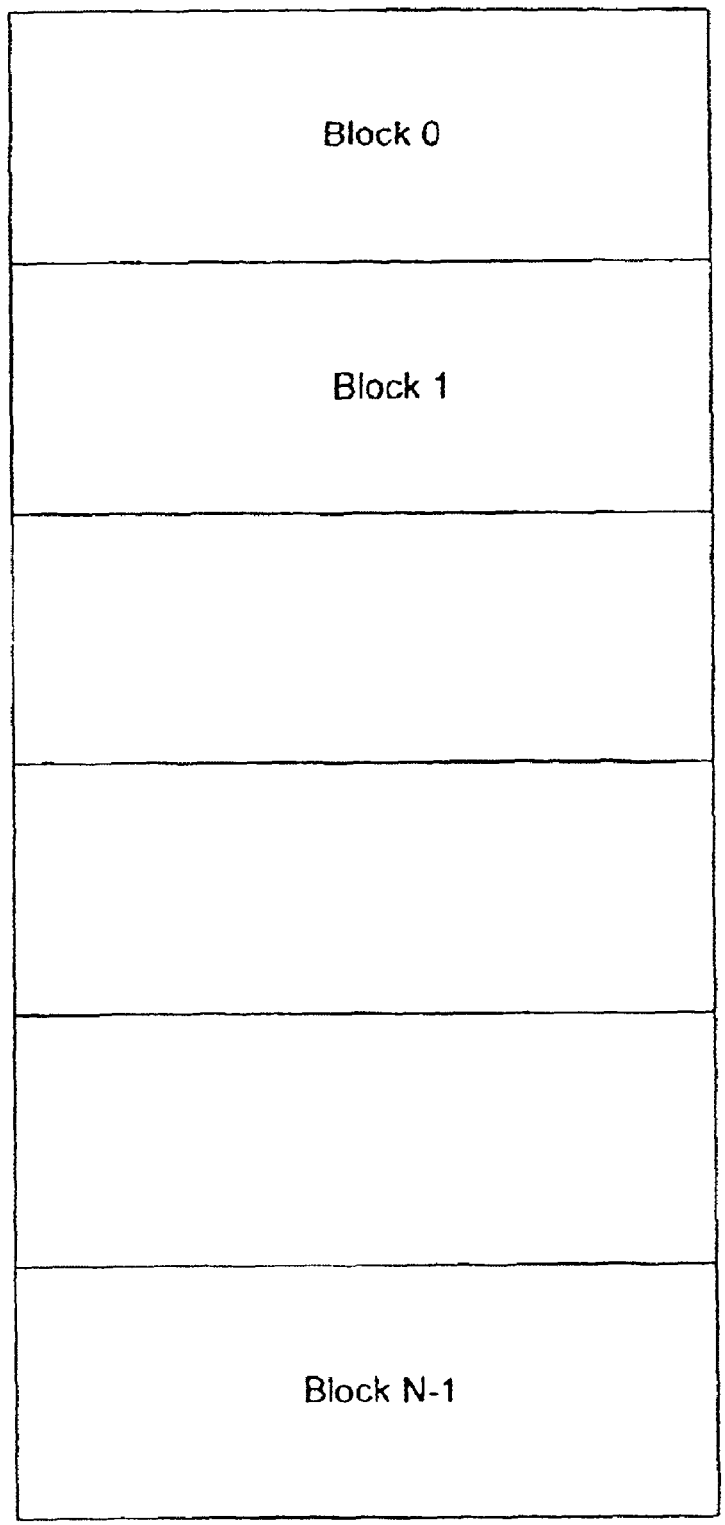
FIG. 2 is a diagram illustrating an exemplary logical organization of a non-volatile memory into N logical blocks.

A block device such as the non-volatile storage device 150 appears to the host 110 as a linear array of blocks of a certain fixed size. In one embodiment, a block comprises 512 bytes of data. Each one of the blocks can be read or written independently of the other blocks using its index or address in the array, as shown in FIG. 2. As shown in the figure, one practice is to number the blocks from block number 0 to block number (N-1), where N is the number of blocks exported by the device driver. The linear array structure depicted in FIG. 2 does not necessarily exist at the physical device level. For example, a flash disk block device driver 140 also presents this linear array image, but internally the physical blocks in the non-volatile memory 180 are usually scattered in a random order (such that block number 0 may physically be located in the middle or the end) due to the writing limitations in flash memory and the possible existence of bad blocks, where the controller 160 remaps this linear or logical array image into actual physical blocks on the media 180. It should also be understood that the block device driver 140 has no knowledge of the contents put into its blocks by the upper software layers.

Referring back to FIG. 1, a file system (FS) software layer 130 may exist on top of the device driver 140. A file system is a software component which provides further abstraction from the physical device, by enabling the application programs to interact with the storage device using only the concept of files, a concept which is much more natural and convenient to the typical programmer or user. The file system 130 achieves this abstraction by organizing the user data on the block device into some logical structure, and associating the blocks containing a file's data with the file's attributes (i.e. file name, creation time, access permissions, etc.). For that purpose the file system 130 stores metadata in the non-volatile memory 180 which is not directly visible to the user. The metadata contains the file system internal bookkeeping information with which it is able to trace and access the user files stored in the non-volatile memory 180. For example, the Microsoft DOS FAT12 file system, which is one of the simplest file systems commercially available, stores on the storage device 150 a boot sector containing some basic parameters, allowing the location of the other metadata structures within the first device block, one or more copies of the File Allocation Table (FAT), which is the allocation map of the device, and a root directory structure for locating files by name. The application programs 120 interact with the file system on the file-level, by issuing commands such as "open file", "delete file", "write file", etc., being completely ignorant of the underlying block structure. There are many file systems in use today, greatly differing in their internal structures and characteristics. In many cases (such as with the Linux operating system) an operating system even provides several file systems to its users and they may choose the one most suitable for their needs.

Figure 3:
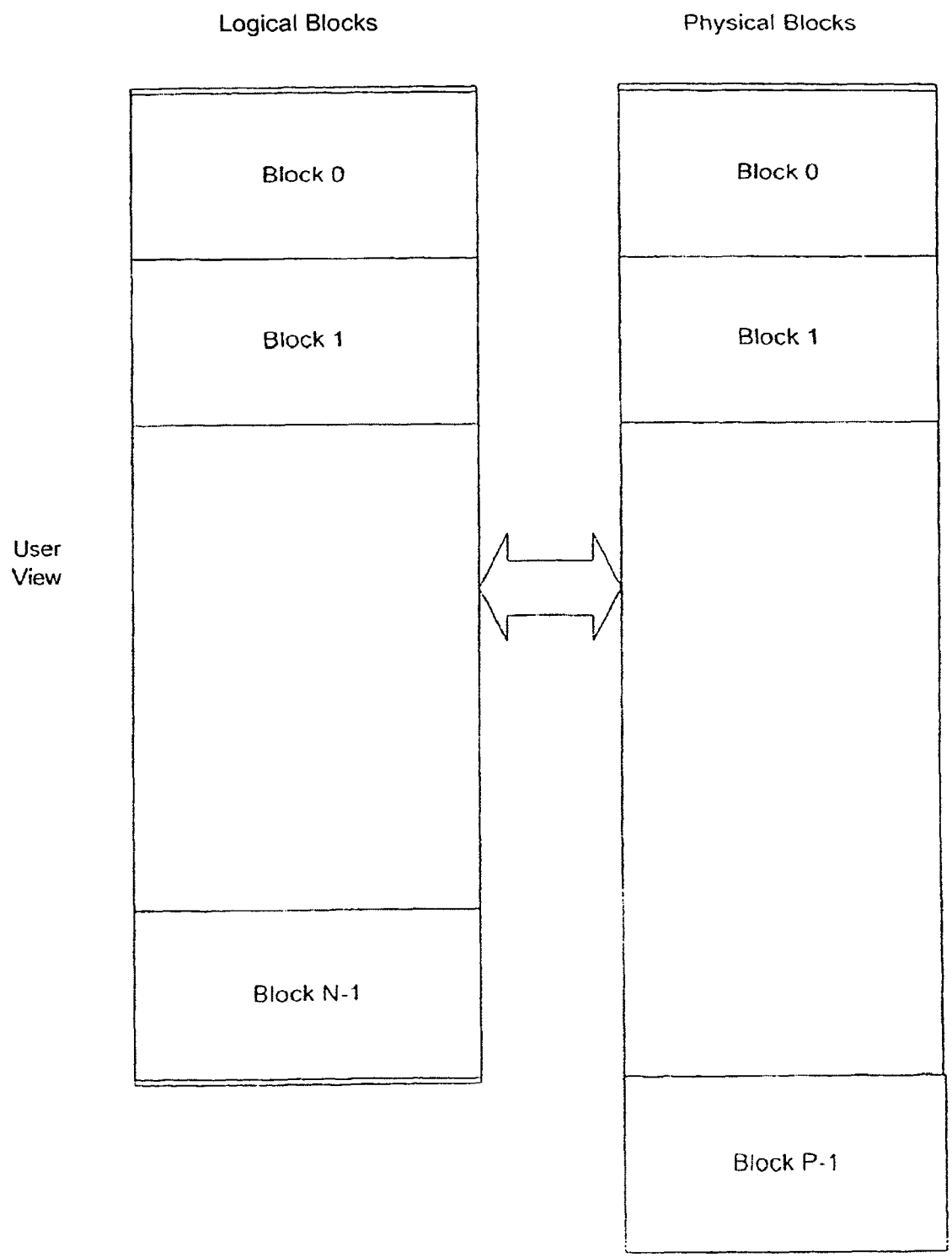
FIG. 3 shows an exemplary non-volatile memory storage organization and address mapping maintained by the controller in a non-volatile storage device.

The embodiments rely on the common concepts of "logical blocks", "physical blocks" and "chains of blocks". FIG. 3 shows an exemplary non-volatile memory 180 storage organization and address mapping maintained by the controller 160 in the non-volatile storage device 150. The device driver 140 interacts with logical blocks, and the host 110 perceives the storage device 150 as having a certain number of them (N in the case of FIG. 3). The logical blocks are not actual storage, but rather are associated with actual physical block storage. Internally the memory 180 contains a larger number of physical blocks (P in the case of FIG. 3). When the host commands a write or read operation to logical block, the controller 160 remaps the logical block specified (via a logical block address) to a physical block within the non-volatile memory 150. This distinction between logical and physical blocks is quite well known in the prior art. Many flash memory disk management systems are based on such an arrangement. However, in flash disks the need for such an arrangement is the result of the unique features of flash memory, such as the inability to write over an already written block without first erasing it, or the existence of bad blocks in the physical media. The embodiments disclosed below may require such an arrangement, and thus, a controller 160 implemented in accordance with the one of the embodiments employs this structure even if it does not need it for other reasons.

In the embodiments, it must always be the case that P, the number of physical blocks, is greater than N, the number of logical blocks. In a non-ruggedized non-volatile storage device, one physical block may be allocated per logical block. In contrast, this is theoretically impossible in a ruggedized non-volatile storage device, as more than one physical block may be conditionally associated with a logical block to allow the recovery of a consistent data state in the event of a power loss to the non-volatile storage device 150. Once the controller 160 is told (via a command received from the host 110) that a certain state is the current fall-back state or consistent data state, when subsequent commands are received for overwriting logical block addresses with new data, the controller 160 must keep both the old data (in case a recovery to the previous state is required) and the new data (in case the command set sequence completes successfully and a transition to a new consistent data state occurs) on the non-volatiles storage device 150. This means that some physical blocks must be set aside to contain these alternative copies of conditionally stored data associated with a logical block address written during the command set sequence. Hence, there must be more physical blocks than logical ones. The number of extra physical blocks available in excess of the number of exported logical blocks can be fixed at the time that the file system is created (i.e. when formatting the device 150) or can be dynamically changed during operation. Setting the number to a large value has the advantage of allowing a large amount of new data to be written to the non-volatile storage device before transitioning from one consistent data state to the next, but has the disadvantage of reducing the number of logical blocks that can be exported for use by the host 110, thus reducing the logical size of the storage device 150. Setting the number to a small value increases the logical storage size but limits the amount of write operations that can occur before a new consistent data state is established by the host 110.

While there is a requirement that the number of physical blocks is greater than the number of logical blocks for ruggedization, many types of mapping between logical and physical blocks are possible. For example, the controller 160 may assign the first N physical blocks to match the N logical blocks with a straight-forward one-to-one mapping, with the last (P-N) physical blocks serving as extra blocks for the alternative copies of data stored while transitioning between consistent data states. Another implementation may create a partial or full random mapping, where any physical block may be assigned to any logical block. Information on the mapping of logical to physical blocks may be stored within the controller 160 or in the non-volatile memory 180 accessible to the controller 160.

As briefly mentioned above, ruggedization may require the controller 160 to map one logical block address to more than one physical block. The group of physical blocks corresponding to the same logical block is called a "chain of blocks" or simply "chain" in the current description. A chain is an ordered set of blocks, meaning that it is possible to determine the order in which the individual blocks were put into the chain. A variety of implementations are possible that satisfy the above requirement. For example, the chain may be constructed using forward pointers, backward pointers, or any other data structures. Many flash memory disk management systems are based on such a block chaining arrangement. The operations required for updating a chain, such as inserting a new block at the end of a chain, or removing the oldest block from the beginning of a chain, can be done safely and atomically using methods known in the prior art. Additionally, depending on the embodiment, a chain may have a predetermined maximum length, or may be unlimited in length. In one embodiment, explained in further detail below, the controller may map a logical block address to no more than two physical blocks (which is the absolute minimum required for supporting ruggedization), In another embodiment, also explained below, the controller 160 may allow mapping of a logical block to larger groups of physical blocks. In other words, chains may be limited to length of no more than two physical blocks, or longer sequences of physical blocks may be allowed.

According to a first embodiment, the built-in ruggedized features of a non-volatile storage device 150 can have practically no extra storage requirements on the non-volatile memory 180 for overhead data above what is required for maintaining the chains. FIGS. 4A-4E are diagrams illustrating an exemplary sequence of logical to physical mapping of memory in the non-volatile storage device when transitioning between two consistent data states.

Figure 4A:
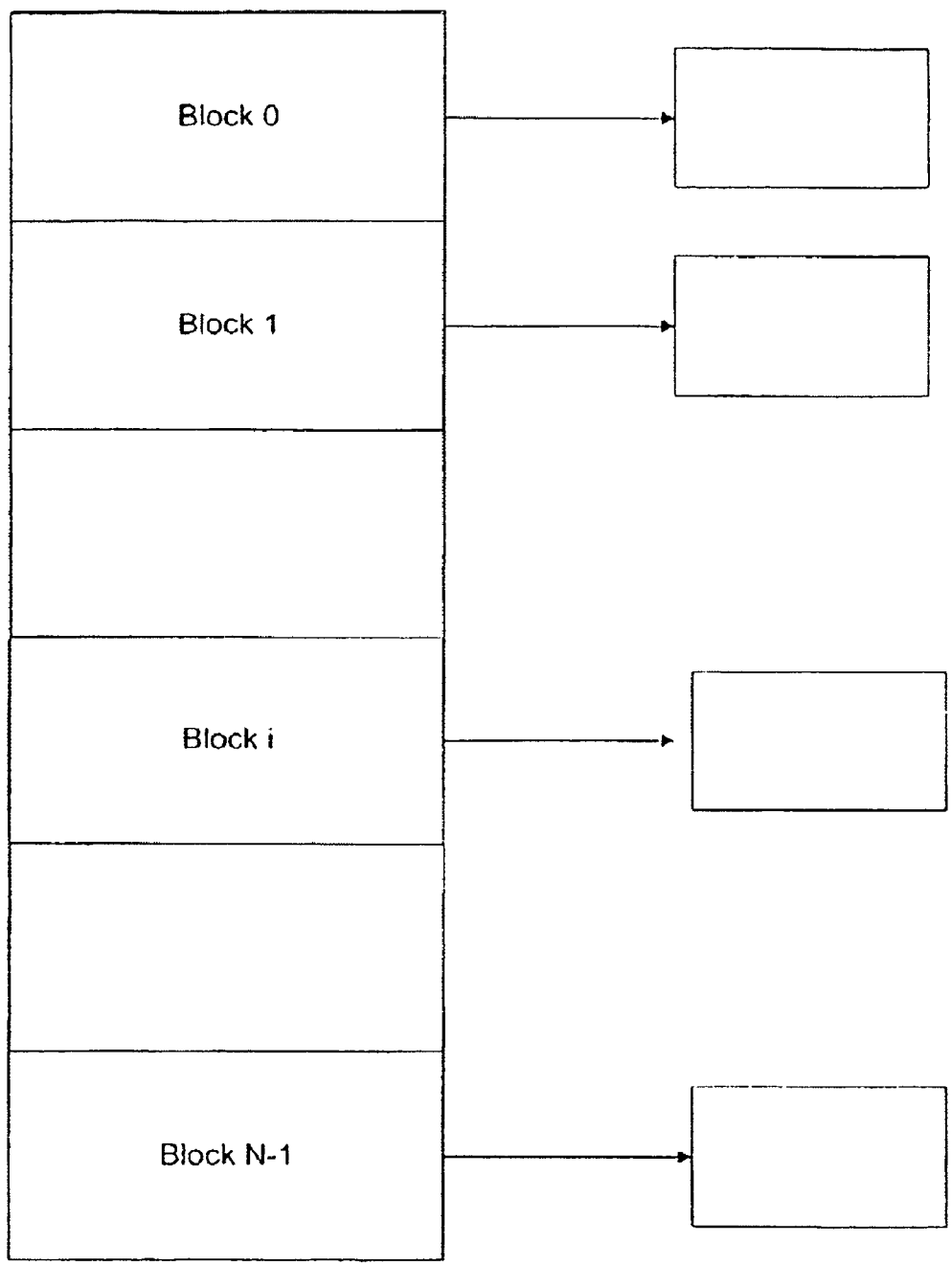
FIGS. 4A-4E are diagrams illustrating an exemplary sequence of logical to physical mapping of memory in a non-volatile storage device when transitioning between two consistent data states

FIG. 4A shows an initial consistent data state in which the controller 160 maps each logical block to a single physical block. Stated another way, each physical block shown in FIG. 4A is unconditionally associated with a corresponding logical block address. Because the number of physical blocks exceeds the number of logical block addresses, there are unmapped physical blocks not shown in the figure. In the example, it is assumed that all physical blocks associated with logical block addresses contain data, in other words, that none of them is empty. As will be evident to those of skill in the art, examples starting with empty blocks are also possible in all embodiments.

Figure 4B:
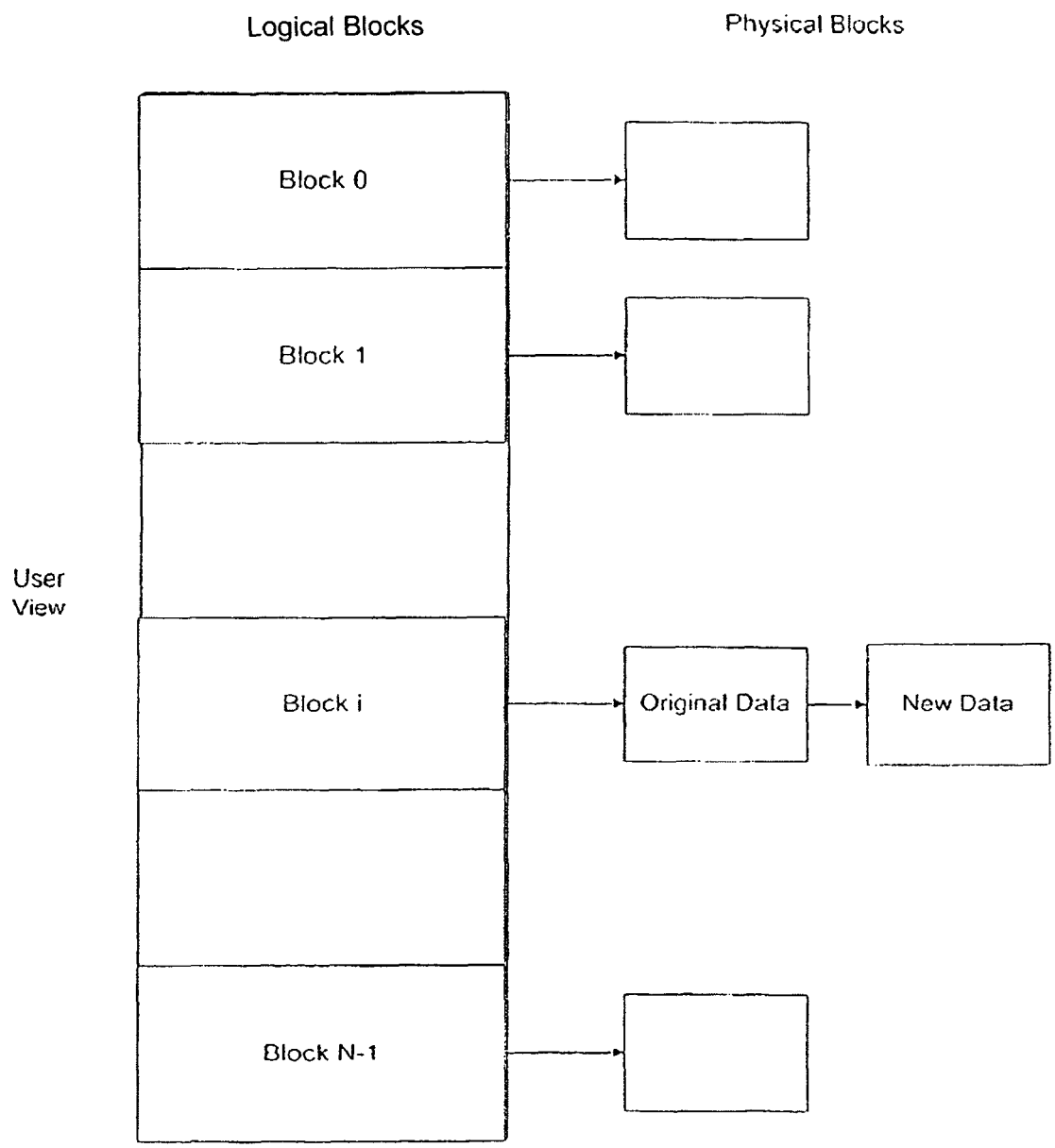

The non-volatile storage device 150 may receive a request to write data to one logical block address. In FIG. 4B the controller 160 logical to physical block address mapping state is shown after the first write request (to the logical block address associated with logical block "i") following a consistent data state is processed. As can be seen in the figure, the original data is not overwritten, as the original data may be needed if a power loss requires the controller 160 to recover the consistent data state shown in FIG. 4A. Instead, the controller 160 writes the data to a free physical block, and then adds the newly written physical block to the set of physical blocks associated with the logical block address corresponding to the logical block (that is, to the physical blocks chain of the logical block).

Figure 4C:
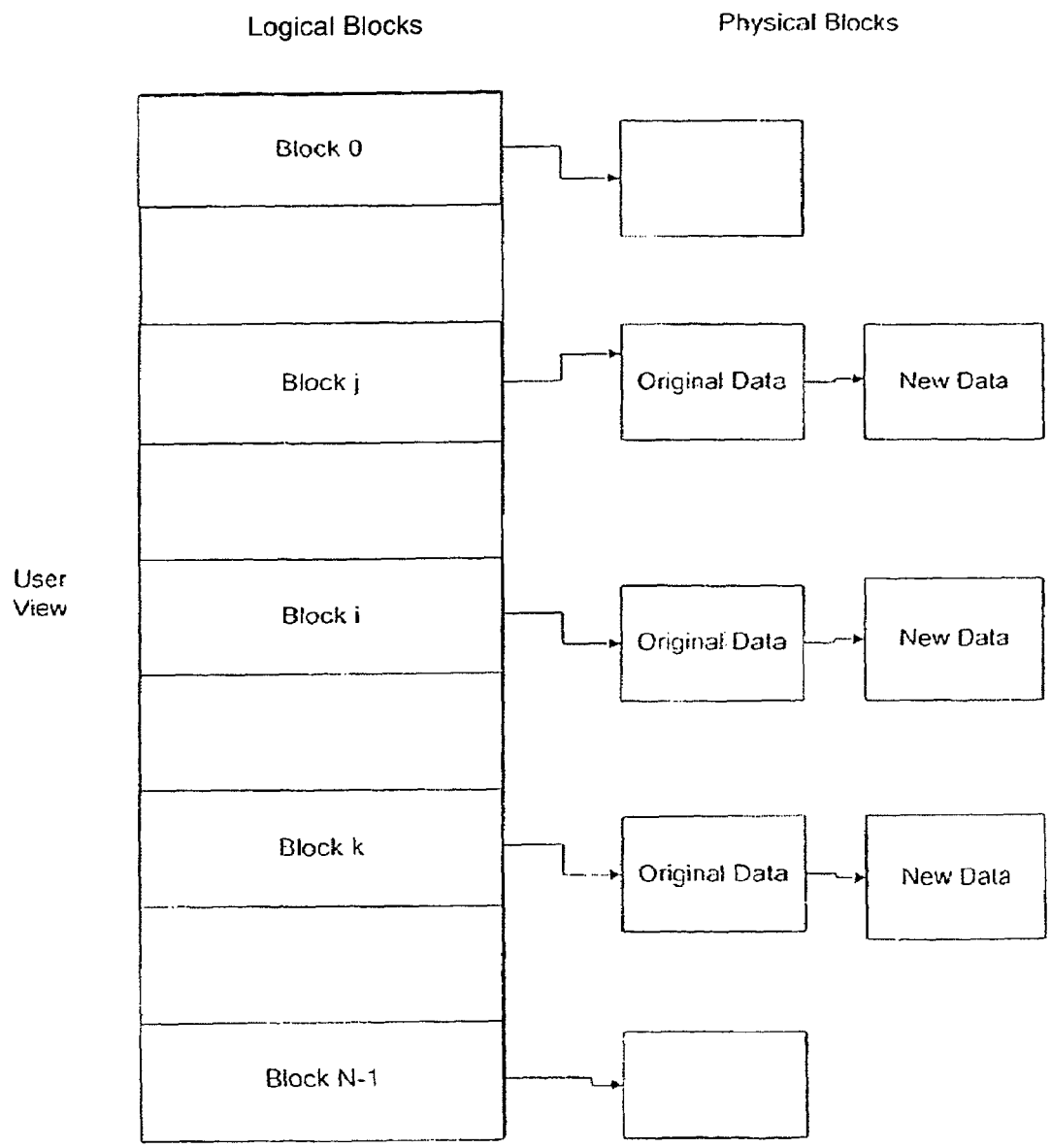

The non-volatile storage device 150 may receive additional write commands from the host 110. As shown in FIG. 4C, the controller 160 processes additional commands to write data to logical block addresses associated with blocks "i" and "k". The controller 160 assigns logical blocks "j" and "k" a second physical block containing the new data specified in the received write command. The three newly written blocks reflected in FIG. 4C may define a useful sequence of commands. For example, the sequence of commands, or the command set, may be for the creation of a new file, the resulting update of a directory structure, and the resulting update of a File Allocation Table. These three operations are typically combined together by a file system 130 in response to a command received at the file system 130 from an application 110 running on the host 110. As stated before, all of these commands in this set can be thought of as an atomic transaction from the perspective of the host 110—all of the commands in the set of commands need to execute, or none of them should execute. A situation where only some of these commands are executed and reflected in the non-volatile memory 180 after a power loss is highly undesirable, as it may cause a corruption of the file system state. Providing support for atomic transactions may require the capability to roll back or "undo" some of the commands of the set, when a power loss or other event prevents all of the commands in the set from executing.

Figure 4D:
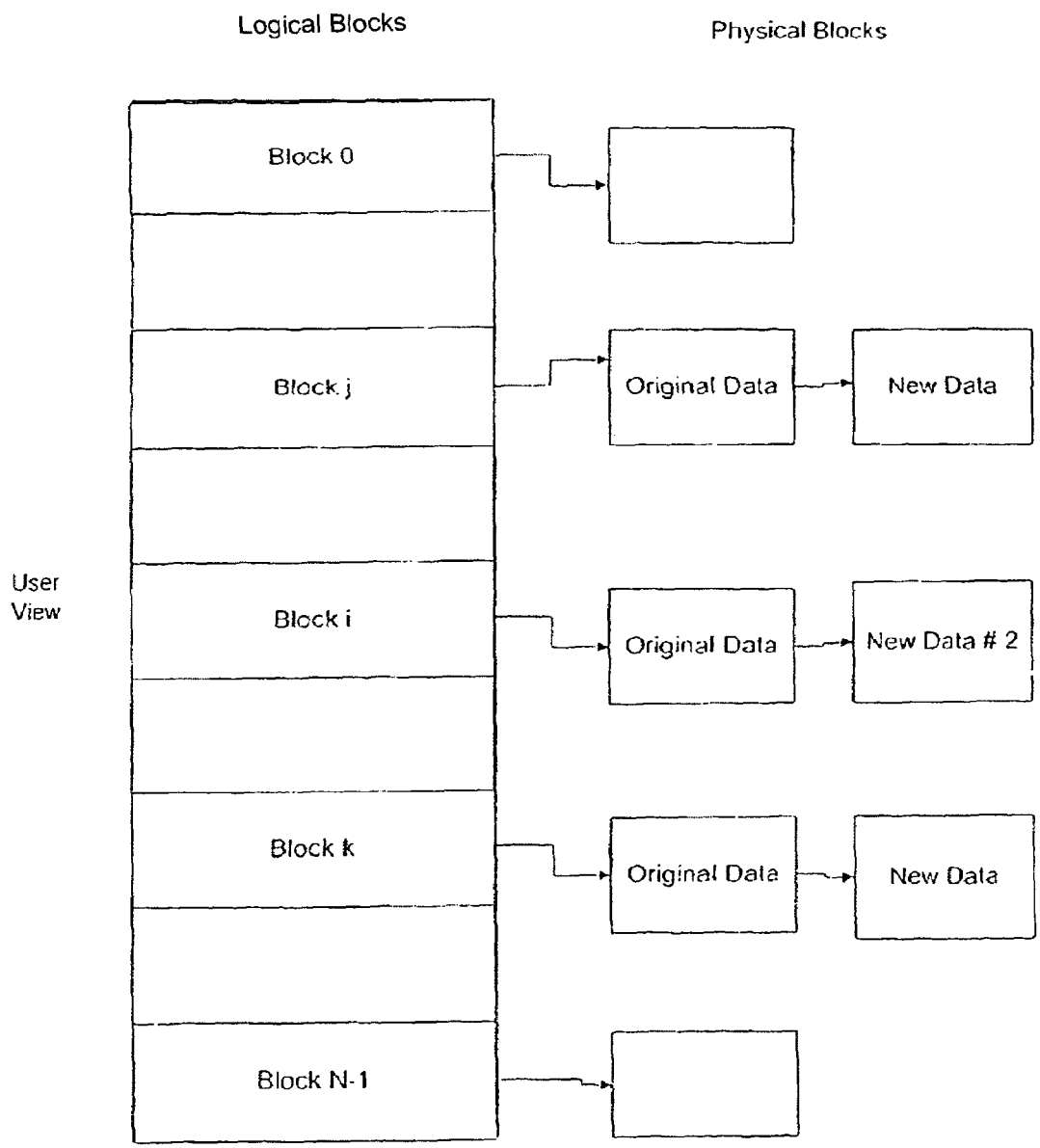

The non-volatile storage device 150 may receive a subsequent request to write data to one logical block address. In FIG. 4D, the controller 160 logical to physical block address mapping state is shown after an additional write request is received, this time a second command to write the logical block address associated with logical block "i" with new data. This second write operation occurs before the host 110 informs the controller 160 that a new consistent data state has been reached. In this case, the controller 160 does not allocate a third physical block to the chain associated with logical block "i" to accommodate the new data. Rather, because alternative physical block already exists (in other words, because the chain length for logical block "i" is already two), the contents of the alternative physical block is overwritten with the newly received data, shown in the figure as "New Data #2". There is no need to store the overwritten data—either the non-volatile storage device 150 is transitioned to the next consistent data state where "New Data #2" is the value of data stored at logical block address "i", or the controller recovers the previous consistent data state where "Original Data" as shown in the figure is the value of data stored at logical block address "i".

Figure 4E:
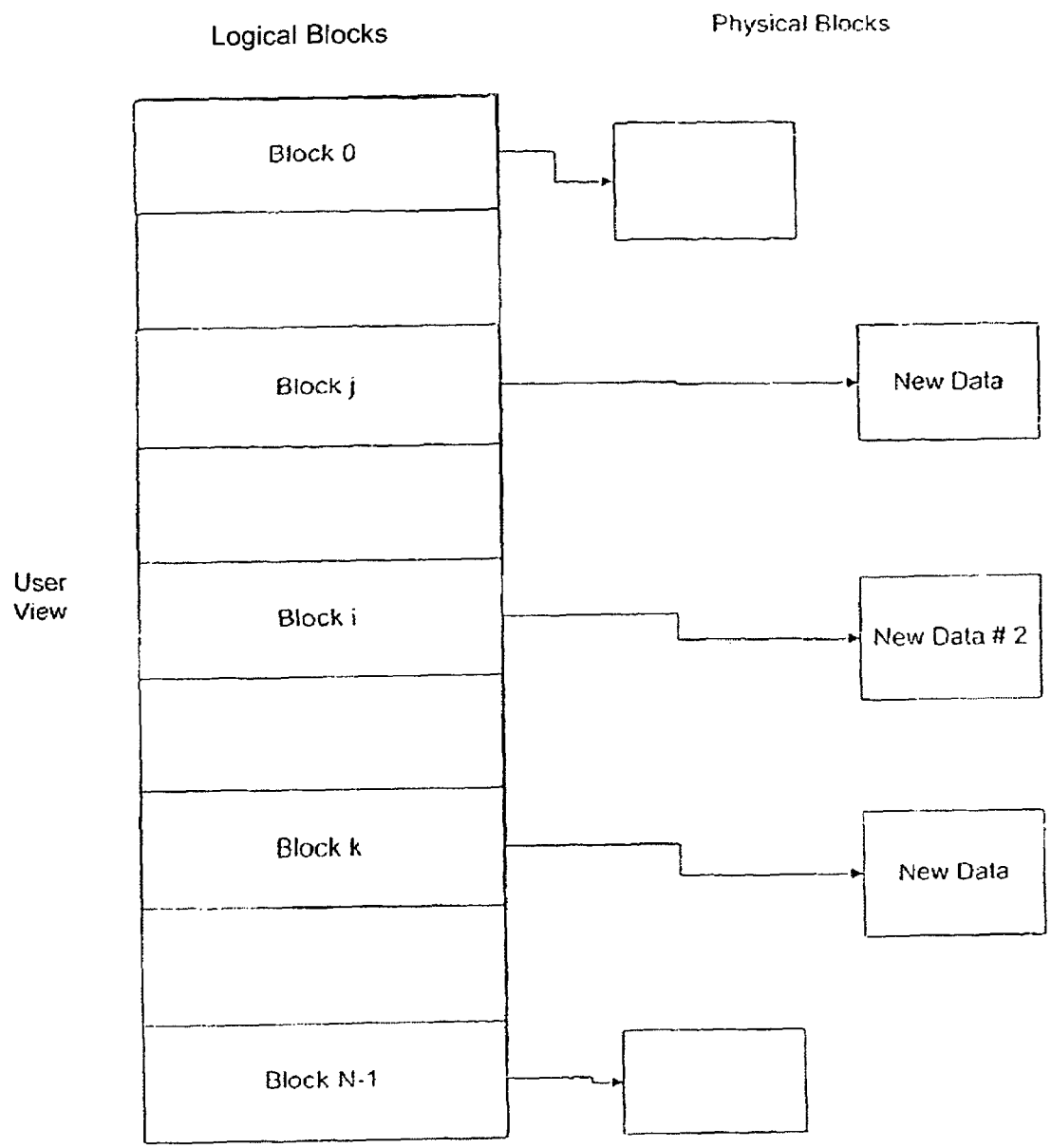

The host 110 may inform the non-volatile storage device 150 that all of the write commands associated with a set of commands have been transmitted and processed, and hence, a new consistent data state can be established. The host 110 may indicate this by transmitting an end of set command to the controller 160 defining a new consistent data state. In FIG. 4E the controller 160 logical to physical block address mapping state is shown after the host 110 informs the controller 160 that a new consistent data state has been reached. In response to this command, the controller 160 examines each logical block address for the existence of a physical blocks chain with a length of two. For each such chain, the controller 160 drops the first physical block (removing the association between it and the logical block address) and keeps only the second one. Thus, the conditional association between the second physical block in the chain and the logical block address becomes an unconditional association. After all of the logical block addresses are examined, a new consistent data state is established, reflecting all of the write command operations performed in transitioning between the old consistent data state and the new consistent data state. By comparing FIG. 4E, and FIG. 4A, it is evident that the logical to physical mapping of blocks has completed a full cycle (transitioned from one consistent data state to the next, where a consistent data state has one physical block associated with a logical block address). The whole sequence of accumulating changes through write commands in a set of commands until the host sends an end of set command to define a consistent data state can be repeated again.

If the non-volatile storage device suffered a power loss during the sequence shown in FIGS. 4A-4E, the controller 160, when supplied with power again, may recover the consistent data state shown in FIG. 4A. When the controller 160 initially starts from a state of being powered off or disconnected from an operating voltage supply, it scans the state of mappings from logical block addresses to physical blocks. In one embodiment, this scanning is performed without receiving any special command or direction from the host 110. Stated another way, the controller 160 performs the scanning operation automatically upon restoration of power to the card. This mapping structure may be stored in non-volatile storage in the controller 160, or in the non-volatile memory 180. Each logical block address is examined for the existence of a physical blocks chain with a length of two. In the case where such a situation is detected, the controller 160 drops the last block in the chain and keeps only the first one. This operation is exactly the opposite of the one described above for creating a next consistent data state. As a result of the recovery procedure, the mapping of logical addresses to physical blocks is recovered to the mapping shown in FIG. 4A, the last consistent data state. If a power loss occurs anywhere in time between the states of FIGS. 4A and 4E (not inclusive), this wake-up procedure will bring the system back to the state of FIG. 4A. However, if the power loss occurs after the state of FIG. 4E is reached, there is no need to go back to the data state shown in FIG. 4A. Any recovery following this point will be to the consistent data state shown in FIG. 4E state, until another consistent data state is created.

If a read operation occurs during the sequence shown in FIGS. 4A-4E, one of two read procedures can be followed. Referring to FIG. 4D, if the host 110 sends a read command to the non-volatile storage device 150 to read data at an address associated with logical block "j", the controller may return the data shown as "Original Data" associated with the last consistent data state, or may return the most recently written data to that address, shown as "New Data" in the figure. In one embodiment, which data the controller 160 returns may be set by a parameter in the controller 160 configurable by the host 110. Once a consistent data state is reached, through recovery back to the last consistent data state shown in FIG. 4A, or to the new consistent data state shown in FIG. 4E, there is no choice of data to return, as only one physical block is associated with the logical block address.

According to a second embodiment, the built-in ruggedized features of a non-volatile storage device 150 can have minimal extra storage requirements on the non-volatile memory 180 for overhead data above what is required for maintaining the chains. In this embodiment, the controller 160 allocates one bit of storage (hereinafter called the "ruggedness" bit or the "R bit" of the block, also referred to as the flag value) for each physical block in the non-volatile storage device 150. In many memory architectures, this is easily implemented. For example, in a flash memory disk based on NAND-type flash devices, each block has a "spare" or "extra" storage space attached to it, which may be used for storing this bit. In such memories each block is contained in a "page" that is the basic unit for writing or reading, where a page contains either one or more physical blocks. An extra area is physically associated with each page, and a portion of this extra area may be allocated to each of the physical blocks in the page, thus providing the space for the R bit. In other types of storage media which do not provide such built-in extra storage, the driver may set aside some portion of the physical storage space 180 for storing the R-bits of all P of the physical blocks that can be mapped to the N logical block addresses.

Figure 5:
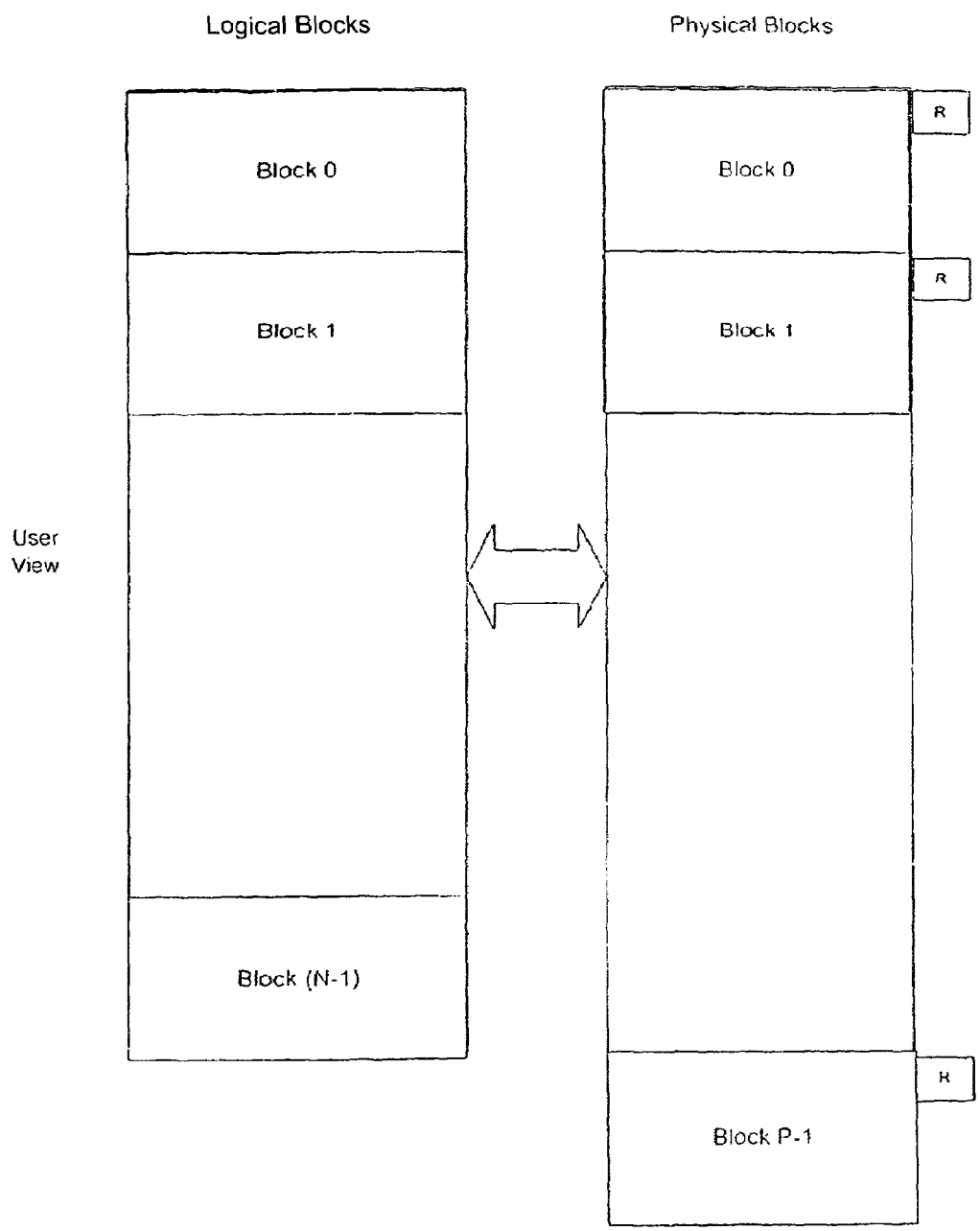
FIG. 5 shows an exemplary non-volatile memory storage organization and address mapping maintained by the controller in a non-volatile storage device.

FIG. 5 shows an exemplary non-volatile memory 180 storage organization and address mapping maintained by the controller 160 in the non-volatile storage device 150 according to this embodiment. The organization and address mapping is identical to FIG. 3, but with the addition of the "R bit" to each physical block.

Figure 6A:
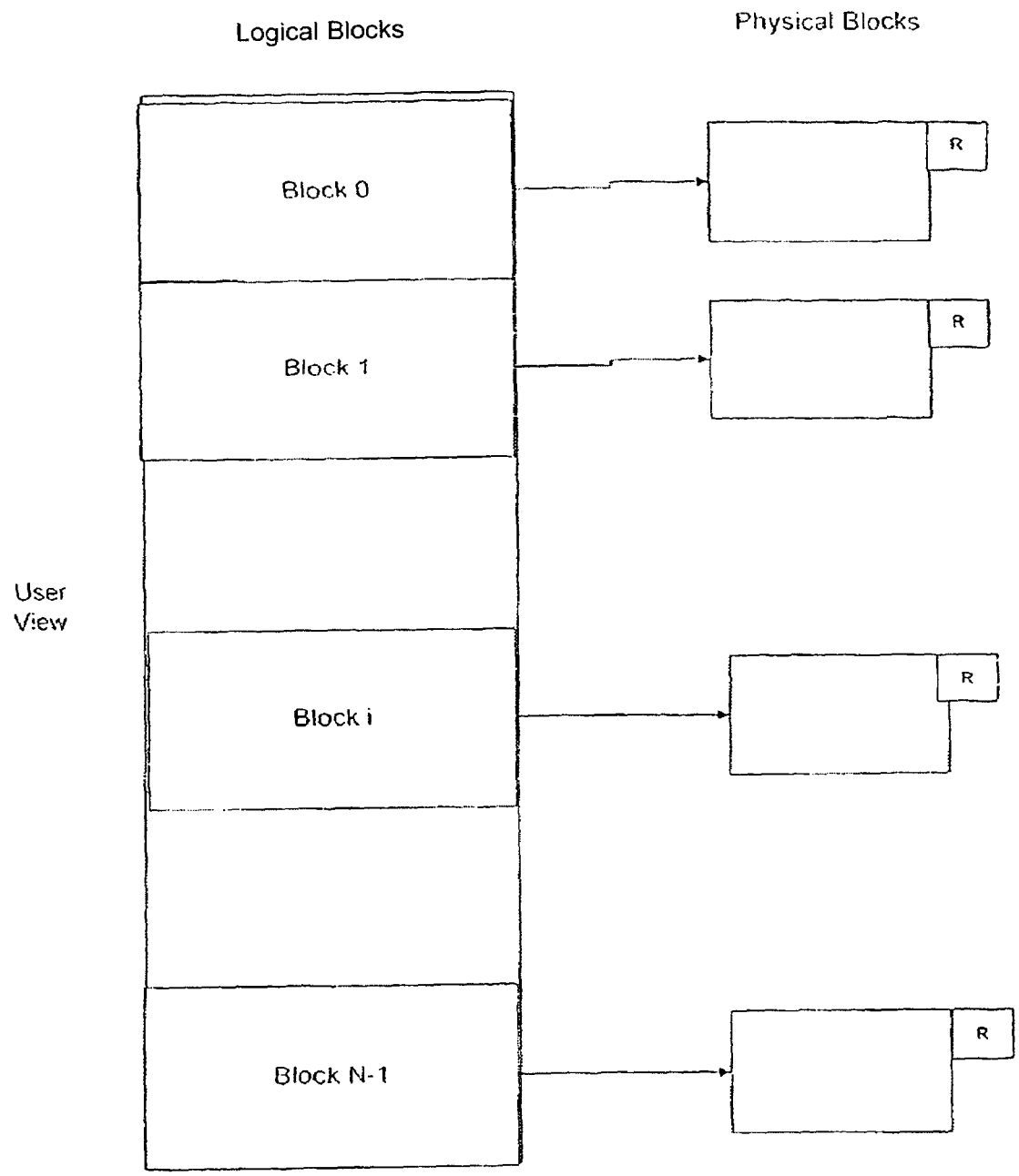
FIGS. 6A-6E are diagrams illustrating an exemplary sequence of logical to physical mapping of memory in a non-volatile storage device when transitioning between two consistent data states.

FIGS. 6A-6E are diagrams illustrating an exemplary sequence of logical to physical mapping of memory in the non-volatile storage device when transitioning between two consistent data states. FIG. 6A shows an initial consistent data state in which the controller 160 maps each logical block to a single physical block. As in FIG. 4A, each physical block shown in FIG. 6A is unconditionally associated with a corresponding logical block address. Because the number of physical blocks exceeds the number of logical block addresses, there are unmapped physical blocks not shown in the figure. As in FIG. 4A, it is assumed that all physical blocks associated with logical block addresses contain data, in other words, that none of them is empty. Additionally, FIG. 6A does not describe the most general case of a consistent data state, as will be described later. Each physical block has its associated R bit. As explained further below, the value of each R bit can be a logic "0" or "1", and the R bit for all of the blocks shown in FIG. 6A does not have to be the same value, so some blocks may have R=1 while others have R=0.

Figure 6B:
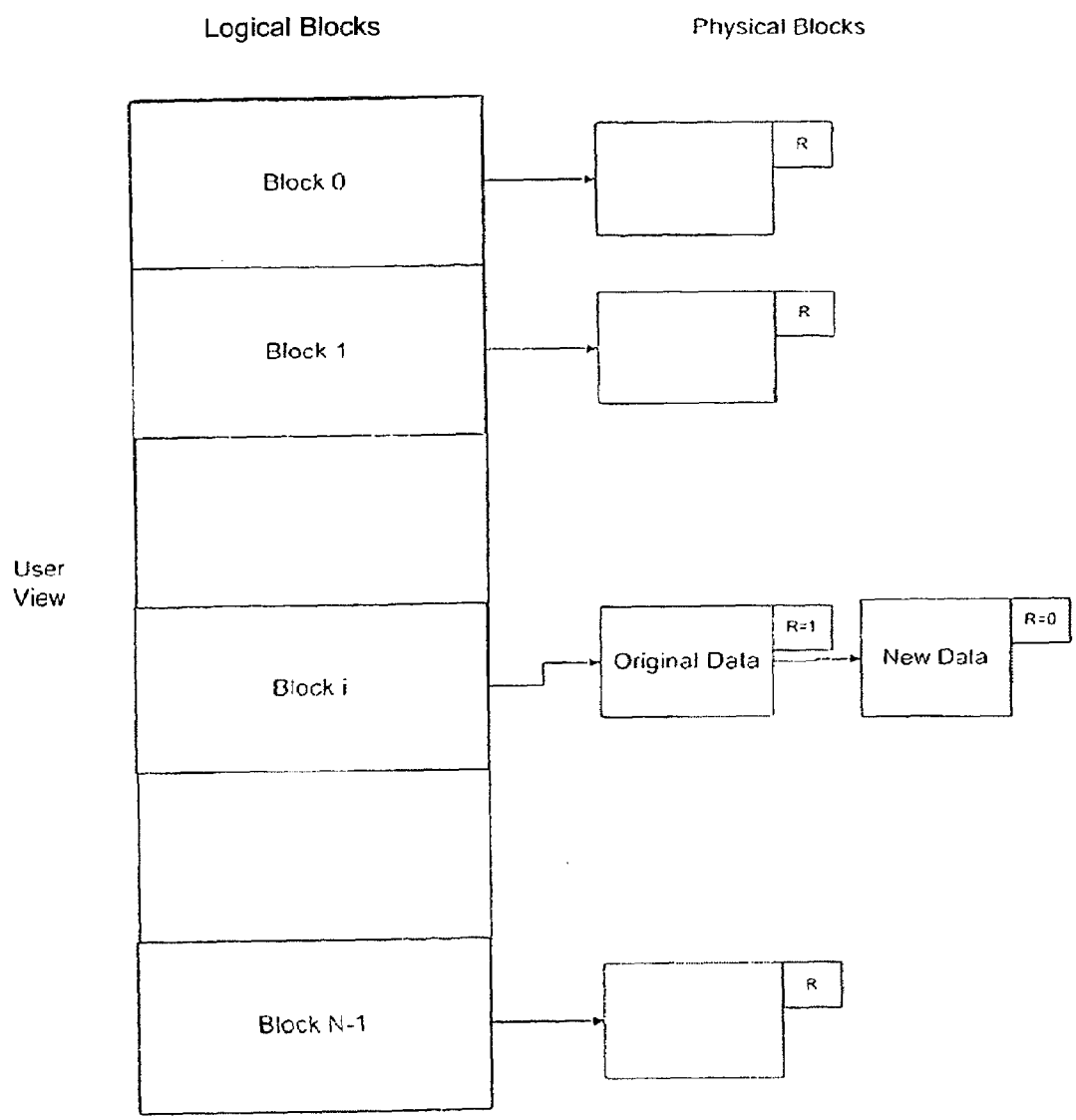

The non-volatile storage device 150 may receive a request to write data to one logical block address. In FIG. 6B the controller 160 logical to physical block address mapping state is shown after the first write request (to the logical block address associated with logical block "i") after a consistent data state is processed. In response to the write request, the controller 160 does not overwrite the original data in the physical block associated with logical block "i", as it may be needed if a power loss or other failure during the set of write commands requires the controller 160 to recover the consistent data state shown in FIG. 6A. Instead, the controller 160 maps a physical block to the list of physical blocks mapped to logical block "i" (that is, to the physical blocks chain of the logical block). Stated another way, this newly added block is conditionally associated with the logical block address for logical block "i" because the association can be eliminated if a recovery to a prior consistent data state is needed. The controller 160 then writes the new data from the received command into the newly added physical block. The R-bit of the block containing the original data is read, and the R-bit or flag value of the newly added physical block is set to the toggled version of R-bit or flag value of the physical block containing the original data. In the example of FIG. 6B, the original block has R=1 and therefore the new physical block is marked with a flag value R=0. In another example not shown in the figure, the original block has R=0 and therefore the new physical block can be marked with a flag value R=1.

Figure 6C:
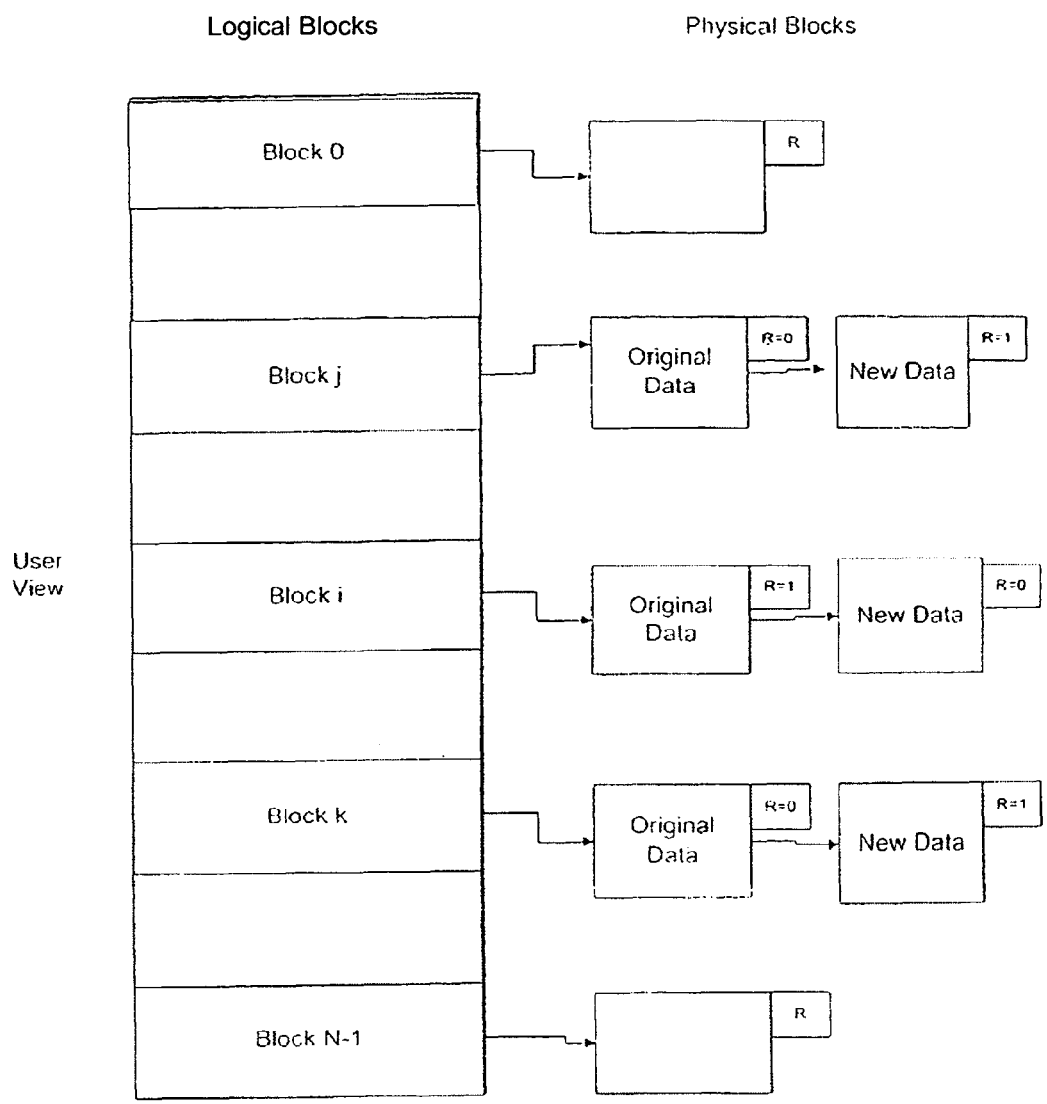

The non-volatile storage device 150 may receive additional write data commands from the host 110. As shown in FIG. 6C, the controller process additional commands to write data to logical block addresses associated with blocks "i" and "k". The controller 160 assigns logical blocks "j" and "k" a second physical block containing the new data specified in the received write command, and again the R bits of the new blocks are the complements of the R bits of the physical blocks they are replacing if a new consistent data state is reached. In FIG. 6C, the R bit or flag values of the new blocks for logical blocks "i" and "j" are different. As was stated above, the R bit value by itself is arbitrary; its importance is in relation to the R bit value of the physical block it potentially replaces.

Figure 6D:
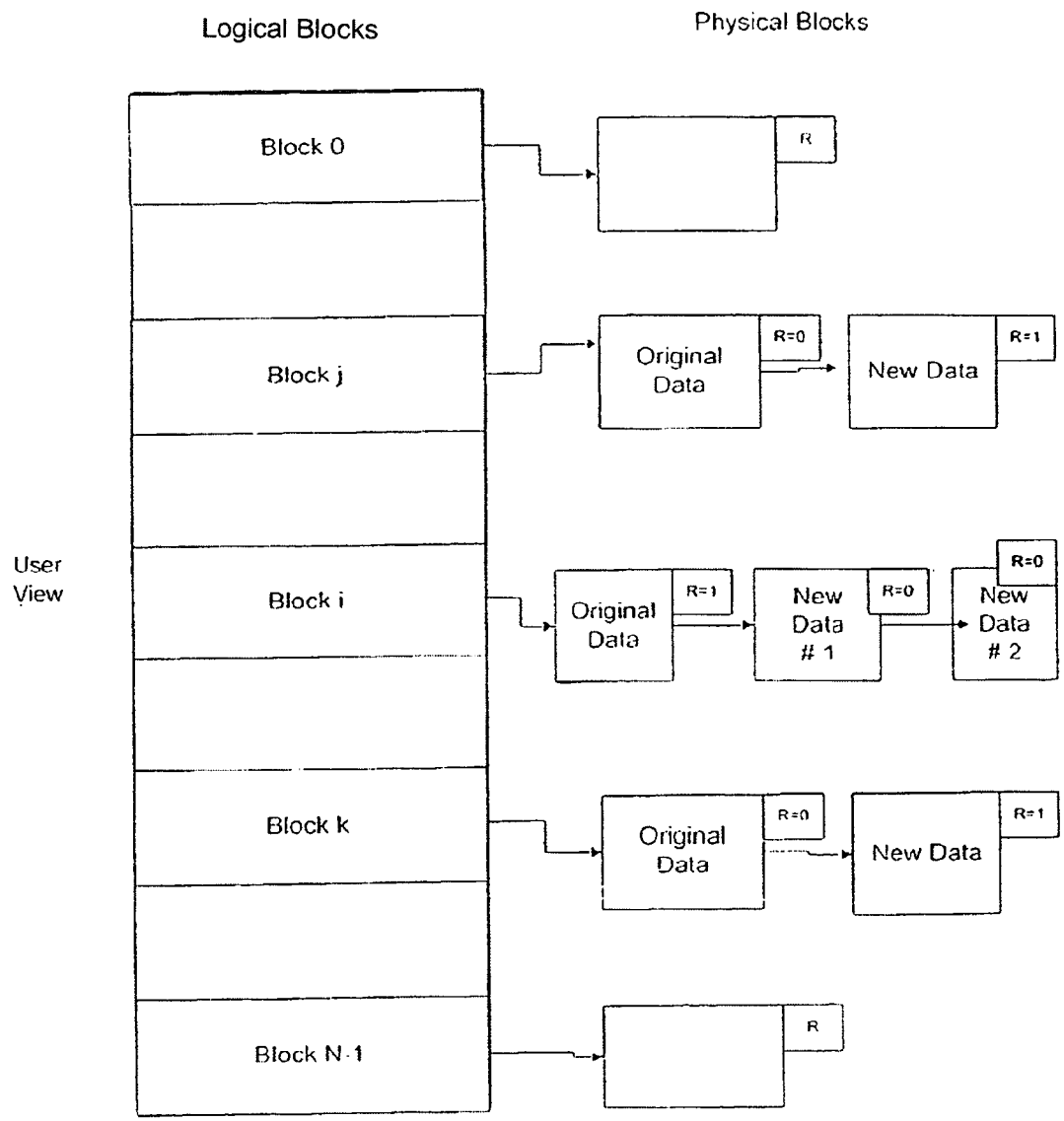

The non-volatile storage device 150 may receive a request to write data to one logical block address. In FIG. 6D, the controller 160 logical to physical block address mapping state is shown after an additional write request is received, this time a second command to write the logical block address associated with logical block "i" with new data. At this point, the host has not informed the non-volatile storage device 150 that a new consistent data state has been reached. In contrast with the first embodiment shown in with FIG. 4D, a new physical block is conditionally associated with the logical block address associated with logical block "i". Thus, three physical blocks are in the chain associated with logical block "i". The controller 160 then writes the data received in the command (shown as "New Data #2" in the figure) to the newly associated physical block. The controller 160 sets the R bit of this newly allocated block 160 to complement the R bit value of the block containing the initial data. In other words, the new R bit is made equal to the R bit of the previous written physical block in its chain. This step in effect extends the chain of blocks mapped to the corresponding logical block, while making sure all blocks in the chain containing data still not committed to a consistent data state have the same R value, which is different than the R value of the first block in their chain.

Figure 6E:
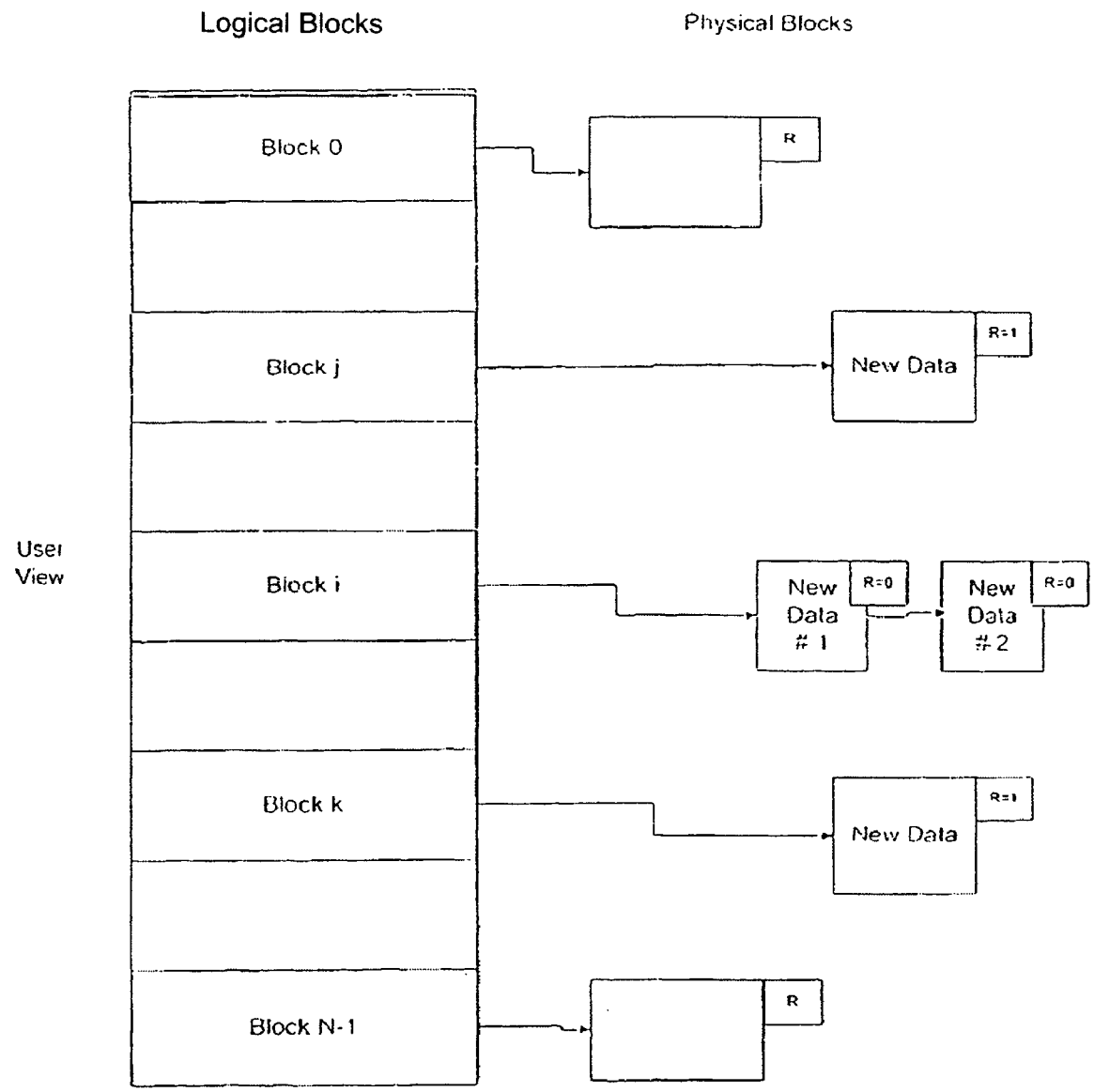

The host 110 may inform the non-volatile storage device 150 that all of the write commands associated with a set of commands have been transmitted and processed, and hence, a new consistent data state can be established. The host 110 may indicate this by transmitting an end of set command to the controller 160 defining a new consistent data state. In FIG. 6E the controller 160 logical to physical block address mapping state is shown after the host informs the controller that a new consistent data state has been reached. The controller 160 examines each logical block for the existence of a physical blocks chain where the R bit value toggles or changes somewhere along the chain. In the case where such a situation is detected, all physical blocks preceding the R value change (to the left of the change point in FIG. 6D) are removed from their chains. The remaining physical blocks are unconditionally associated with the logical block address. In one embodiment, the controller 160 may unconditionally associate the physical blocks with the logical block address without moving the data received in the set of commands that is stored in the physical blocks. As a result, a new consistent data state is established, reflecting all operations performed before this new state. The state shown in FIG. 6E is similar to that of FIG. 6A, and the sequence of accumulating changes through write commands in a set of commands continues until the host defines another consistent data state is defined, can now be repeated.

One noticeable difference between FIGS. 6A and 6E is that in FIG. 6E, one logical block address has more than one physical block assigned to it even after a consistent data state has been established, a condition that does not exist in FIG. 6A. However, as can readily be seen, this has no effect on the process that the controller 160 follows when processing write commands in a command set sequence (the steps leading from FIG. 6A to FIGS. 6B, 6C, 6D and 6E) and the same methods are still applicable even if the data state shown in FIG. 6E is the starting point. FIG. 6E more accurately reflects the general case of a consistent data state in this embodiment, where a logical block may have more than one physical block assigned to it even after a consistent data state has been established. Stated another way, FIG. 6A is a simplified example. In this embodiment, the most general case of a chain of blocks is when the chain has a first group of one or more blocks, all having the same R bit and all written prior to establishing the last consistent data state, followed by zero or more blocks of a second group all having an R bit or flag value which is the complement of the first group R bit, and all written after establishing the last consistent data state. The act of establishing a next consistent data state is achieved (when there are such two groups of blocks) by dropping the physical blocks of the first group and keeping the physical blocks of the second group.

In the event of a power loss (from a power shutdown, or an interruption of power to the non-volatile storage device 150) before a new consistent data state has been established, the controller 160 may recover a prior consistent data state when power is restored. When the non-volatile storage device 150 is powered again with an adequate supply voltage, the controller 160 scans the mapping state of logical blocks to physical blocks. In one embodiment, this scanning is performed without receiving any special command or direction from the host 110. In this case, the controller 160 performs the scanning operation automatically upon restoration of power to the card. Each logical block address is examined for the existence of a physical block chain where the R bit value changes or toggles somewhere along the chain. The controller 160 traverses a physical block chain in the order that the physical blocks were added to the chain, from earliest in time to latest in time. If the controller 160 detects this toggle situation, the physical blocks following the R value change (to the right of the change point in the FIGS. 6B-6D) are removed from the chain. This operation is exactly the opposite of the one described above for creating a next consistent data state. Once the controller 160 has examined all logical block addresses, all changes occurring after the last consistent data state will be removed. If a power loss occurred anywhere in time between the states of FIGS. 6A and 6E, this power-on procedure will restore the non-volatile storage device back to the state of FIG. 6A. As in the first embodiment, if the power loss occurred after the state of FIG. 6E has been reached, there is no need to return to consistent data state shown in FIG. 6A. Rather, if the controller 160 needs to recover a consistent data state, it will recover to the state shown in FIG. 6E, until another consistent data state is established.

If the host 110 sends a read command to the non-volatile storage device during the sequence shown in FIGS. 6A-6E, one of two read procedures can be followed. Referring to FIG. 6D, if the host 110 sends a read command to the non-volatile storage device 150 to read data at an address associated with logical block "i", the controller may return the data shown as "Original Data" associated with the last consistent data state, or may return the most recently written data to that address, shown as "New Data #2" in the figure. In one embodiment, which data the controller 160 returns may be set by a parameter in the controller 160 configurable by the host 110. Once a consistent data state is reached, through recovery back to the last consistent data state shown in FIG. 6A, or to the new consistent data state shown in FIG. 6E, there is no choice of data to return, as only the data associated with the consistent data state will be returned in response to a read from that the logical block address.

According to a third embodiment, the built-in ruggedized features of a non-volatile storage device 150 can have somewhat more storage requirements in the non-volatile memory 180 for overhead data above what is required for maintaining the chains, but is more flexible than the other embodiments. In this embodiment, the controller 160 allocates storage for one numeric field for each physical block (hereinafter called the "version" value or field, or "generation" field or the "gen" field of the block), for storing the consistent data state associated with the physical block. This field may be an 8-bit byte, a 16-bit word, or any other convenient size. The considerations of where to store these fields are similar to the ones mentioned for the R bits or flag values of the previous embodiment. For example, the fields may be stored in the extra storage area of NAND flash blocks or in a specially set-aside portion of the physical storage space. Additionally, the controller 160 maintains a version or generation field that contains a value associated with the current consistent data state of the non-volatile storage device 150. This value may be stored in non-volatile storage in the controller 160, or in the non-volatile memory 180.

Figure 7:
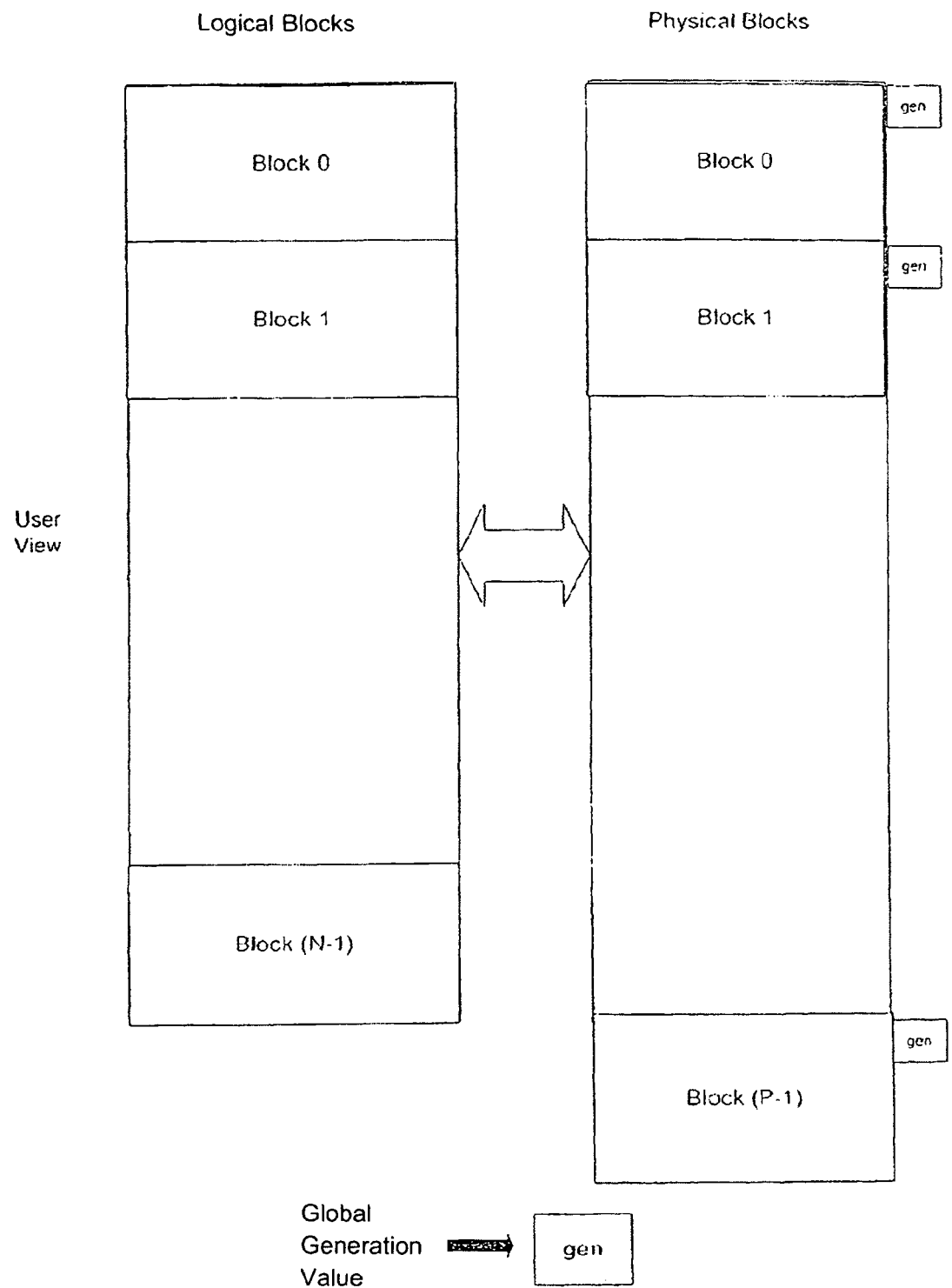
FIG. 7 shows an exemplary non-volatile memory storage organization and address mapping maintained by the controller in a non-volatile storage device.

FIG. 7 shows an exemplary non-volatile memory 180 storage organization and address mapping maintained by the controller in the non-volatile storage device 150 according to the third embodiment. The organization and address mapping is identical to FIG. 3, but with the addition of the generation or version field to each physical block. The global generation or version state maintained by the controller 160 is also shown in FIG. 7.

Figure 8A:
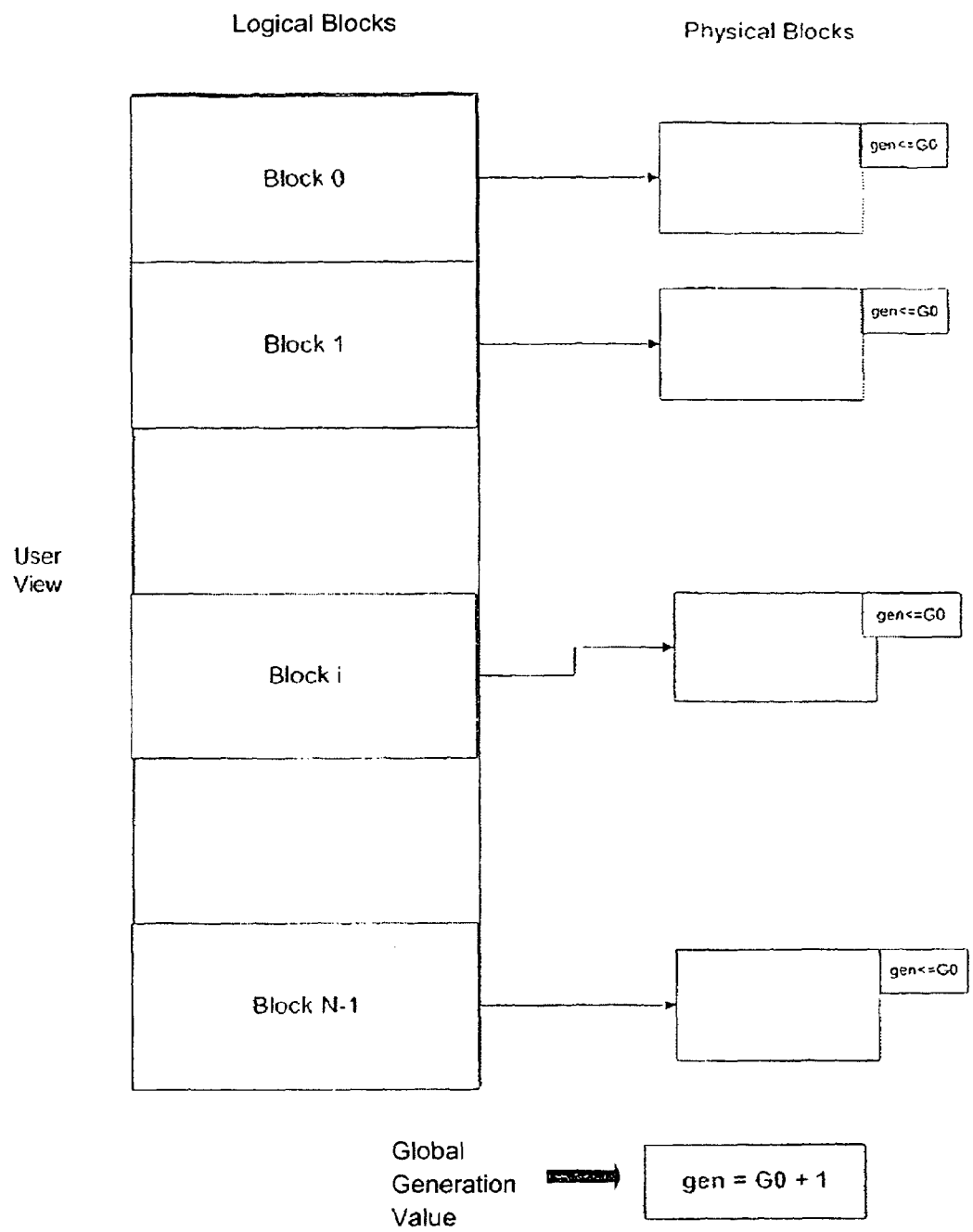
FIGS. 8A-8E are diagrams illustrating an exemplary sequence of logical to physical mapping of memory in a non-volatile storage device when transitioning between two consistent data states.

FIGS. 8A-8E are diagrams illustrating an exemplary sequence of logical to physical mapping of memory in the non-volatile storage device 150 when transitioning between two consistent data states. FIG. 8A shows an initial consistent data state in which the controller 160 maps each logical block to a single physical block. The same simplifying assumptions as listed in FIG. 4A are also made in this example. In other words, FIG. 8A does not show the most general case of a consistent data state, which will be described later. Each physical block has an associated generation field. All of the physical blocks are not required to have the same generation value. In the example, the currently highest value of all block generation fields has the value $G_0$. This implies that for all physical blocks shown, the relation "generation<=$G_0$" is true. As shown in FIG. 8A, the driver's global generation state is $G_0$30 1, which implies that for all blocks the relation "generation<global generation" is also correct. In one embodiment, the generation fields are regular numeric fields that follow intuitive arithmetic relationships. Other generation field numbering systems are also possible. For example, the generation field for each physical block may be an 8-bit value, and the global generation counter may be an 8-bit value that can increment from 255 to 0, stated another way, a modulo 256 value. In this case, a value of zero is considered larger than the maximal value of 255.

Figure 8B:
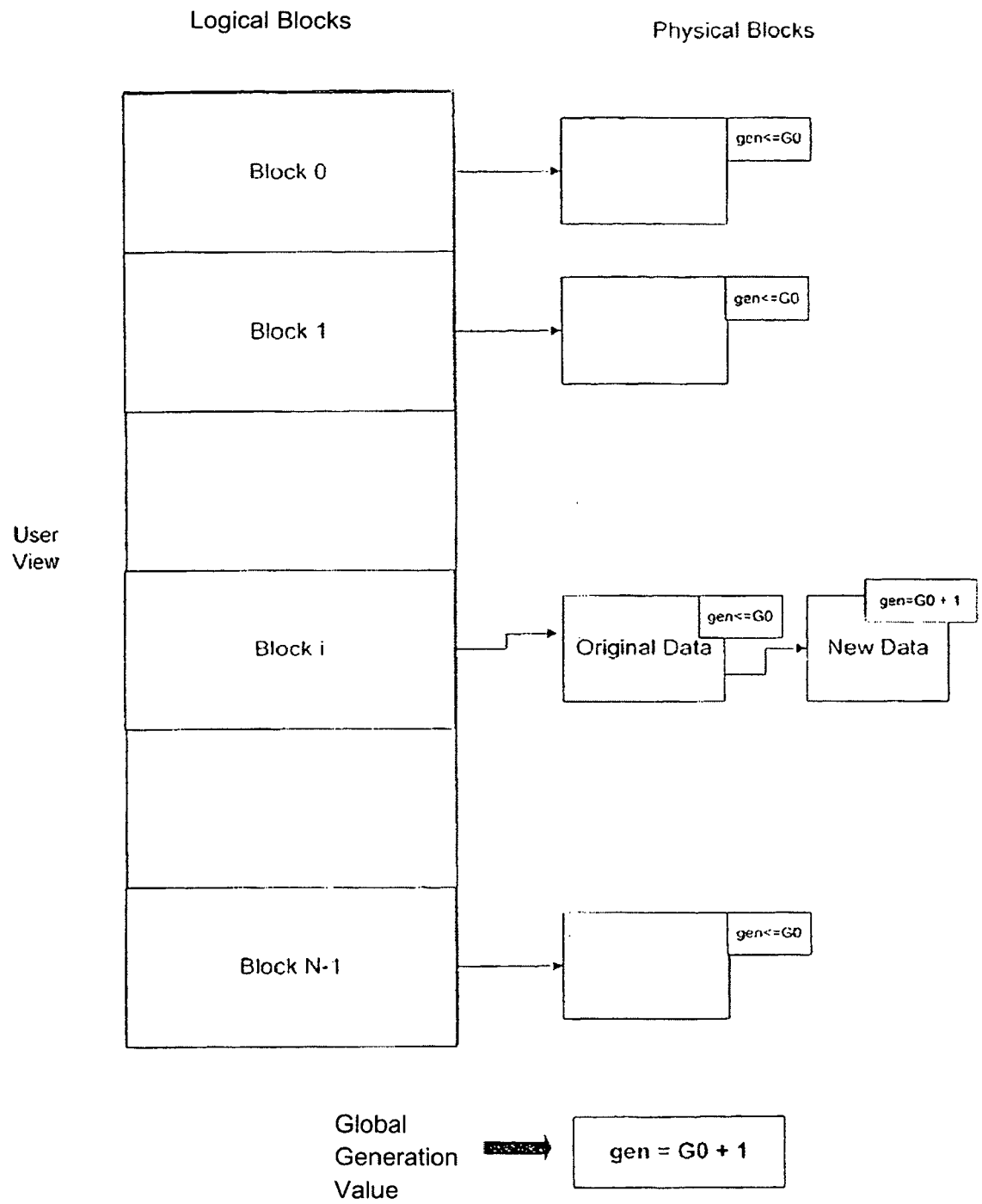
Figure 8C:
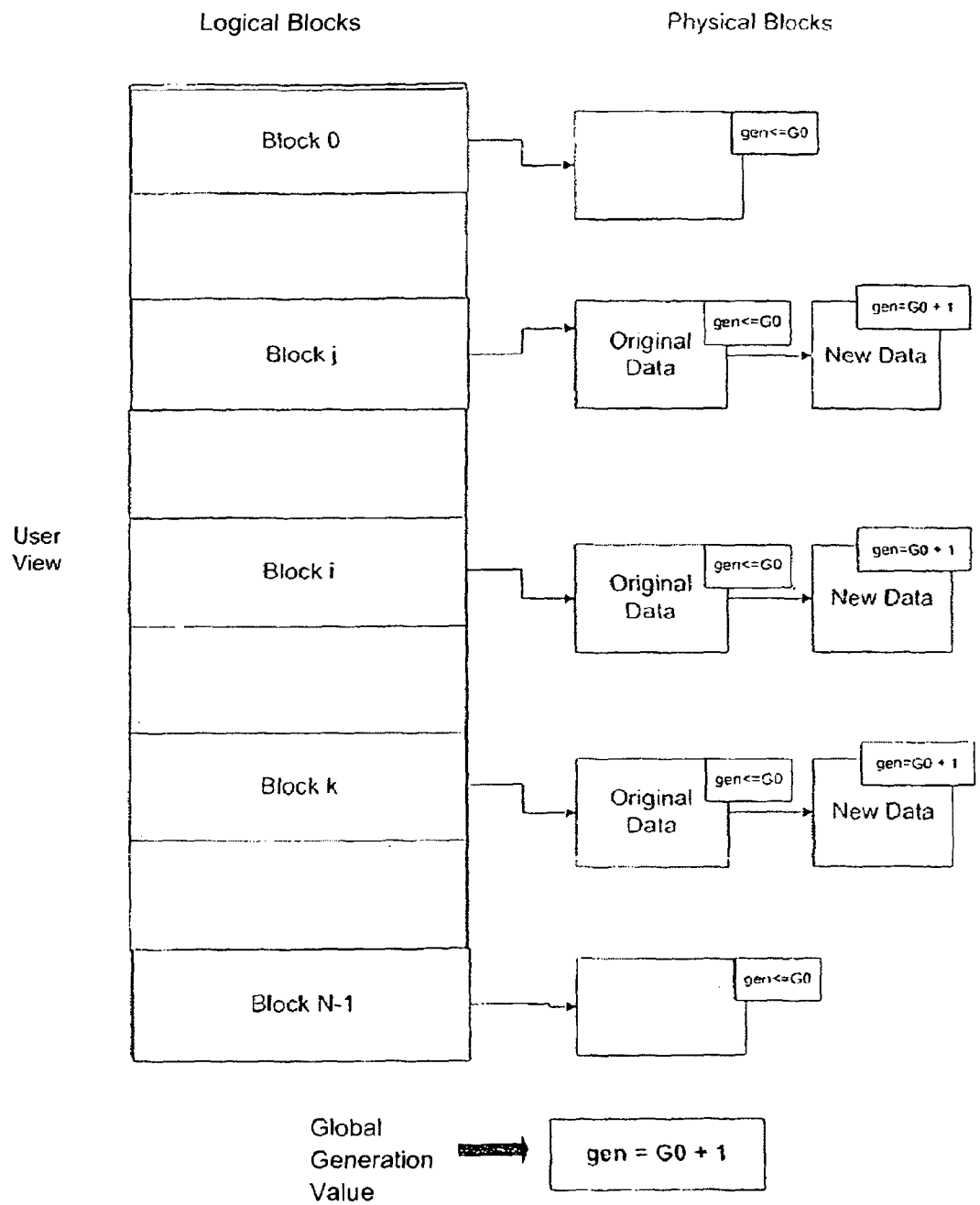

In FIG. 8B the controller 160 logical to physical block address mapping state is shown after the first write request (to the logical block address associated with logical block "i") following a consistent data state is processed. As in the other embodiments, the original data associated with logical block address "i" is not overwritten, as the value may be needed if the controller 160 recovers a consistent data state in the event of a power loss during the transition between consistent data states. Instead, the controller 160 conditionally associates a free physical block to the logical block address by mapping the logical block to the newly associated physical block (that is, to the physical blocks chain of the logical block). The data received in the write request is written to the newly associated physical block, and its generation field is set to the current value of the global generation, which in this case is $G_0$+1. The global generation is not changed at this stage, causing block "i" to have a generation value equal to the global generation counter value.

The non-volatile storage device 150 may receive additional write commands from the host 110. As shown in, FIG. 8C, the controller process additional commands to write data to logical block addresses associated with blocks "j" and "k". The controller 160 assigns each logical block "j" and "k" a second physical block containing the new data specified in the received write command. The generation fields of the new conditionally associated physical blocks are set to the current value of the global generation counter.

Figure 8D:
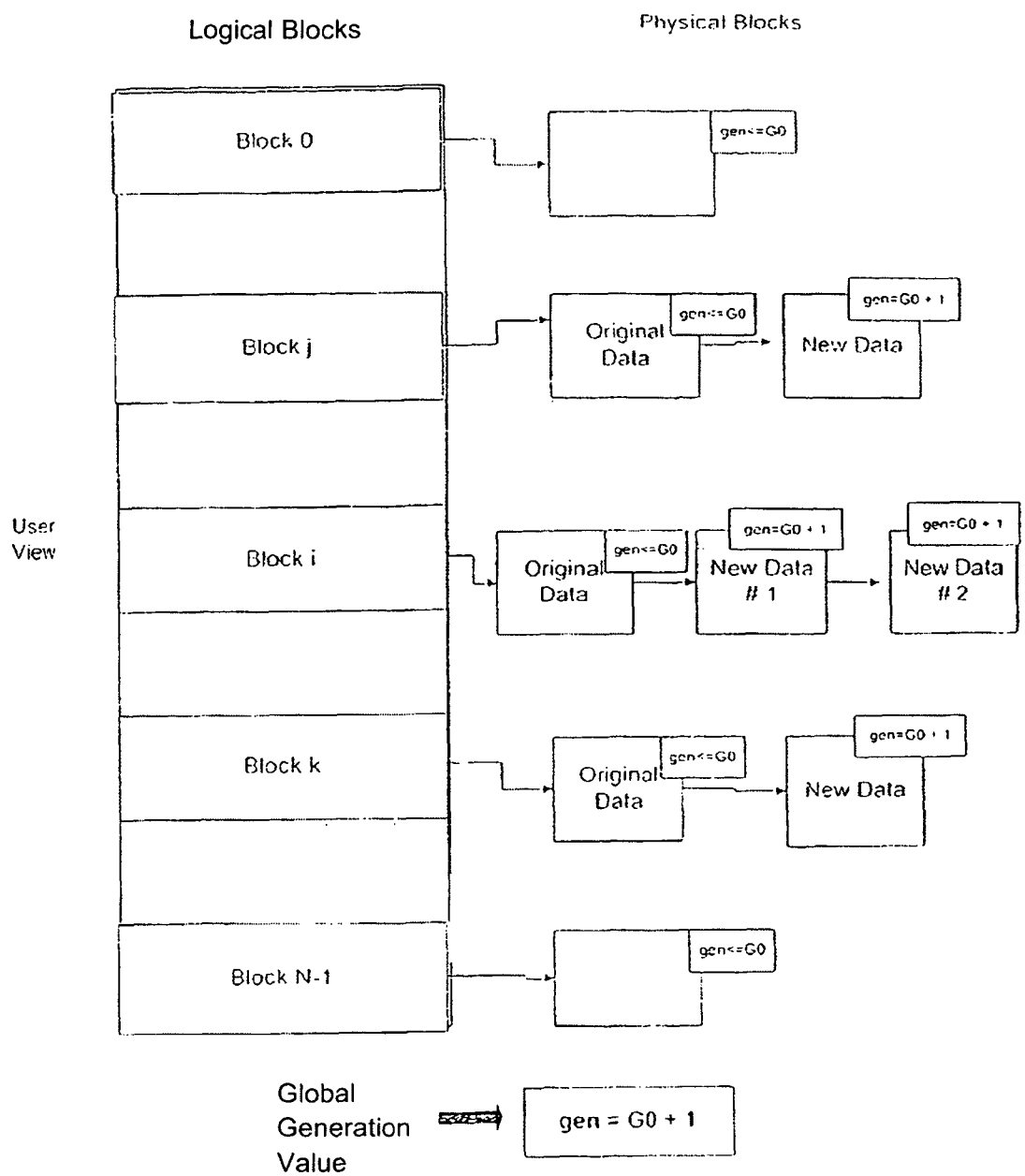

The non-volatile storage device 150 may receive another request to write data to one logical block address. In FIG. 8D, the controller 160 logical to physical block address mapping state is shown after an additional write request is received, this time a second command to write the logical block address associated with logical block "i" with new data. As in the second exemplary embodiment, a new free physical block is added to the mapping of the logical block (extending its chain to more than two blocks), and the newest data, shown as "New Data #2" in the figure, is written into it. The generation field of this newly allocated block is again set to the current value of the global generation counter. In other words, the new generation field is made equal to the generation field of the previously written block in its chain. This step in effect extends the chain of blocks mapped to the corresponding logical block, while making sure all blocks containing data still not committed to a consistent data state have the same generation value, equal to the current global generation counter value, but different than the generation of the first block in the chain.

Figure 8E:
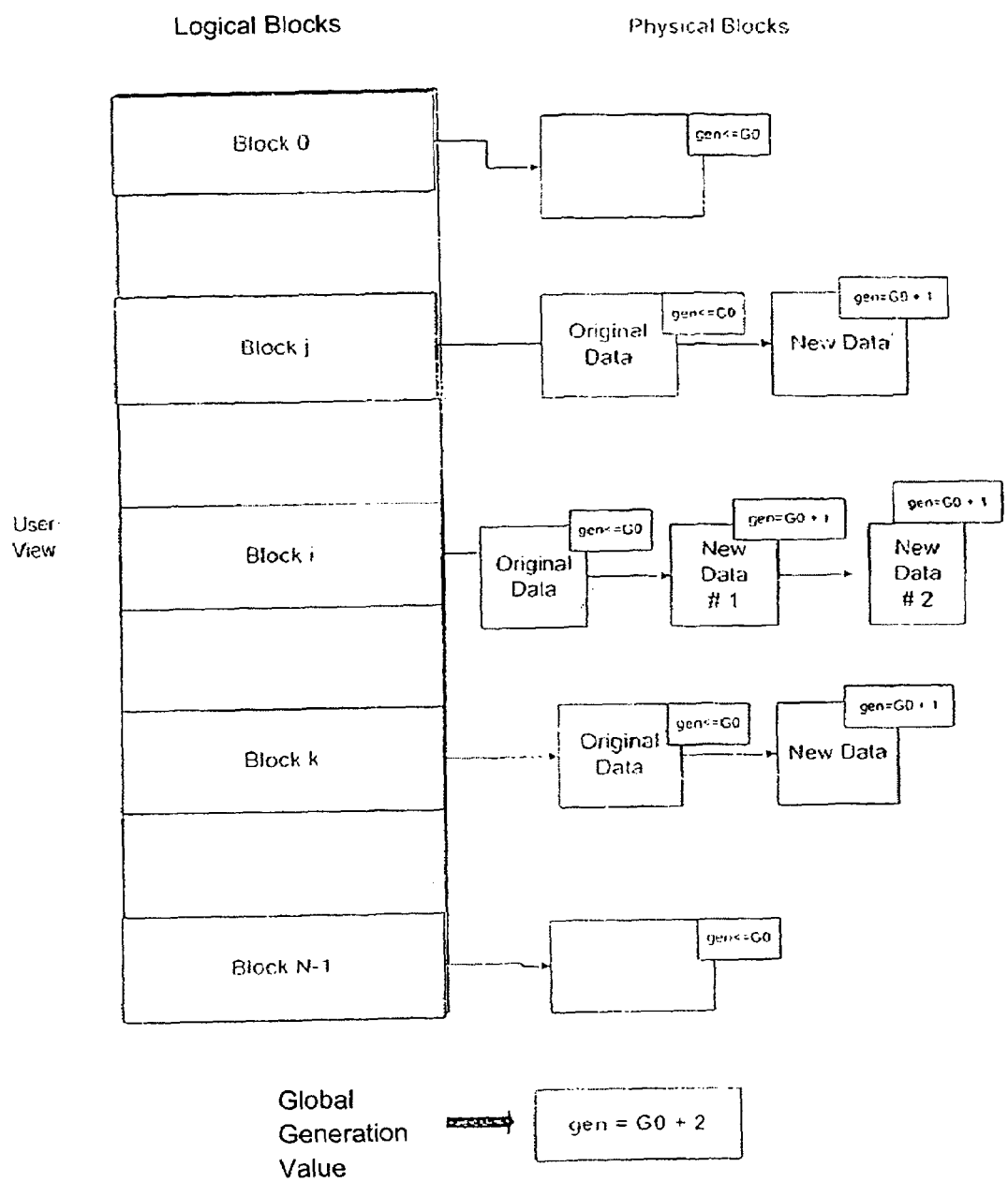

The host 110 may inform the non-volatile storage device 150 that all of the write commands associated with a set of commands have been transmitted and processed, and hence, a new consistent data state can be established. The host 110 may indicate this by transmitting an end of set command to the controller 160 defining a new consistent data state. In FIG. 8E the controller 160 logical to physical block address mapping state is shown after the host informs the controller that a new consistent data state has been reached. In response to the end of set command from the host 110, the controller 160 simply increments the controller's global generation value by one, such that the global generation value will now equal $G_0$+2, as can be seen in the FIG. 8E. The chain of blocks for each logical block address remains unchanged. As a result, a new consistent data state is established that reflects all operations performed before this new state was reached. The data state shown in FIG. 8E is similar to that of FIG. 8A, as again the relationship "generation<driver's global generation" is satisfied by every physical block, in accordance with a consistent data state. The sequence of accumulating changes until another consistent data state is defined can now repeat itself.

FIGS. 8A and 8E differ because a few logical block addresses in FIG. 8E are unconditionally associated with more than one physical block. However, as can readily be seen, this has no effect on the steps the controller 160 follows in transitioning from one consistent data state to another by processing write commands in a command set sequence, as shown in FIGS. 8A-8E and the accompanying text. FIG. 8E more correctly reflects the general case of a consistent data state starting point where a logical block may have more than one physical block associated with it. In this respect, FIG. 8A represents a simplified version of the general case depicted in FIG. 8E. In other words, the most general case of a chain of blocks is when the chain has one or more blocks, with their generation fields constituting a non-decreasing sequence with the last value in the sequence (and consequently all values in the sequence) being smaller than the global generation value, followed by zero or more blocks all having their generation fields equal to the global generation value maintained by the controller 160. All blocks in the first part of the chain were written prior to establishing the last consistent data state, whereas all blocks in the second part of the chain (if it is not empty) were written after establishing the last consistent data state. The act of establishing a next consistent data state is achieved by incrementing the global generation value, thus causing all blocks in the chain to become part of the first group, with the second group becoming empty.

If the an unexpected power loss occurs (such as a shutdown, or an interruption of power to the non-volatile storage device 150) in the middle of a sequence of write commands in a command set to transition the non-volatile storage device 150 between consistent data states, the controller 160 may subsequently recover the last consistent data state once power is restored to the non-volatile storage device 150. The controller 160 will do this by first reading the global generation value, and then scanning each logical block address for the existence of physical block chains with at least one block having a generation value equal to the global generation value. If this situation is detected, all conditionally associated physical blocks having that generation value are removed from the respective chains. When this process is completed for all logical block addresses, a consistent data state has been recovered, because the controller 160 has removed all of the change data written to physical blocks after the last consistent data state by removing the conditional association between these physical blocks and the corresponding logical block address. If a power loss occurs anywhere in time between the states of FIGS. 8A and 8E (not inclusive), this procedure will recover the consistent data state of FIG. 8A. However, if the power loss occurred after the state of FIG. 8E was reached, there is no longer a need to return to the consistent data state shown in FIG. 8A. Any recovery following this point will be to the consistent data state shown in FIG. 8E, until another consistent data state is created. In one embodiment, this recovery process is initiated by the controller 160 without receiving any special command or direction from the host 110. In other words, the controller 160 performs the scanning operation automatically upon restoration of power to the card.

As in the other embodiments, if the host 110 sends a read command to the non-volatile storage device during the sequence shown in FIGS. 8A-8E, one of two read procedures can be followed. Referring to FIG. 8D, if the host 110 sends a read command to the non-volatile storage device 150 to read data at an address associated with logical block "i", the controller may return the data shown as "Original Data" associated with the last consistent data state, or may return the most recently written data to that address, shown as "New Data #2" in the figure. In one embodiment, which data the controller 160 returns may be set by a parameter in the controller 160 configurable by the host 110. Once a consistent data state is reached, through recovery back to the last consistent data state shown in FIG. 8A, or to the new consistent data state shown in FIG. 8E, there is no choice of data to return, as only the data associated with the consistent data state will be returned in response to a read from that the logical block address.

This embodiment has a few characteristics that differentiate it from the previous embodiments. First, as previously mentioned, this embodiment requires the generation state (the global generation value) to be stored in non-volatile memory in the non-volatile storage device 150, with updates to this state value taking place in an atomically safe way. Methods for accomplishing this update task in a safe, atomic manner are well known in the prior art. For example information can be safely updated on the media by using two copies of the data to be protected, plus checksum fields, plus a field that is incremented per update. This method is fully safe against any possibility of power loss. While this method achieves ruggedness in a file system (and not in variables maintained by the controller, as is the case here), it may be used by the controller 160 to update the generation count value. Second, in order for the embodiment to keep working correctly for long periods of time and long sequences of consistent data states, it will eventually require a "clean-up" operation. This will happen when the global generation value will no longer be able to be incremented without violating the arithmetic assumptions of the model. For example, if an eight bit field is used to store the generation count value, the global generation value might wrap around from 255 to zero, making comparisons with the generation value stored in the physical blocks difficult, if not impossible, to perform correctly. As a result, when the controller 160 attempts to recover an inconsistent data state, physical blocks may be removed from a chain because of an incorrect comparison result between a physical block generation value and a "wrapped around" global generation value. The "clean up" operation may be performed in many ways, such as bringing all chains to the generation of the currently highest generation of any existing chain, thus making the relation "generation=global generation-1" correct for all blocks. This can simply be achieved by extending each chain with a copy of its last block. In the example of an 8-bit counter, such procedure will give the controller 160 the freedom to run through 255 (the maximal number) of generations before having to perform another clean-up. Obviously, the more bits used to store the generation value (globally, and in each physical block), the less frequent is the need for clean up.

It was mentioned above that the number of logical blocks N is less than the number of physical blocks P available in the storage device, in order to provide storage space (P-N total physical blocks) for data written to the non-volatile storage device when transitioning between consistent data states. For the exemplary embodiments described thus far, it may be possible to receive a write command that cannot be processed because all of the (P-N) physical blocks available for transitioning between consistent data states are already in use. As the updating of physical blocks following the establishment of a consistent data state requires storage space for storing both the previous and new data, it is possible that if the host 110 sends too many write commands before sending a command establishing the next consistent data state, the number of available physical blocks will be exhausted. There is a trade-off for the controller 160 design in deciding how many logical block addresses are exported compared to the amount of physical blocks in the non-volatile memory 180. With fewer logical blocks N, more space is set aside for chaining and the more operations can be accommodated when transitioning between consistent data states. On the other hand, holding a large number of physical blocks (P-N) in reserve for this purpose limits the logical space available to the host 110 for actual storage of data. On the other hand, if P-N is a relatively small number of physical blocks hidden to the host 110, the storage device 150 will have more available storage capacity as viewed by the host, but will be able to accommodate fewer write commands/data when transitioning between consistent data states. If the controller 160 detects that all (P-N) physical blocks available for rugged write operations are in use, and another write is received before a new consistent data state is established, the controller 160 may reject the write operation, indicate an error condition to the host 110, and recover the prior consistent data state. In response to receiving this error, the host 110 may reattempt the sequence of write commands, but reduce the size of the set of commands, proceeding in smaller steps between consistent data states, possibly after making more room on the media by deleting unneeded data and initiating whatever compacting tools the system provides.

As mentioned above, all explanations so far assume that a physical block can be read, written, erased or allocated independently of any other physical block. While this assumption is correct for magnetic disks, it is not necessarily correct for all types of storage media. For example, in NAND-type flash memory, the minimal size for an erase command is not a single block but a group of many adjacent ones (hereinafter called a "unit"), with typically 128 or 256 blocks in a single unit. (As mentioned above, care should be taken to avoid confusion in terms, as in flash memory data sheets it is common to use the term "page" for what we call "block" here or for a group of a few of our "blocks" that are written and read together, while the term "block" in those data sheets refers to what we call "unit"). Consequently, in such devices it is not efficient to make storage allocations for single blocks but only for complete units. However, any of the exemplary embodiments shown above are equally applicable to the case where allocation of blocks must be done in groups, with simple adaptations that will be obvious to those skilled in the art. In the embodiment that follows, the applicability of the second embodiment described above (toggling an R-bit value associated with a physical block to indicate the data changes during transitions between consistent data states) is demonstrated for this type of storage device. Hereinafter, such non-volatile storage device in which erasing must be done in units rather than single blocks is called a "unit-based" device.

Figure 9:
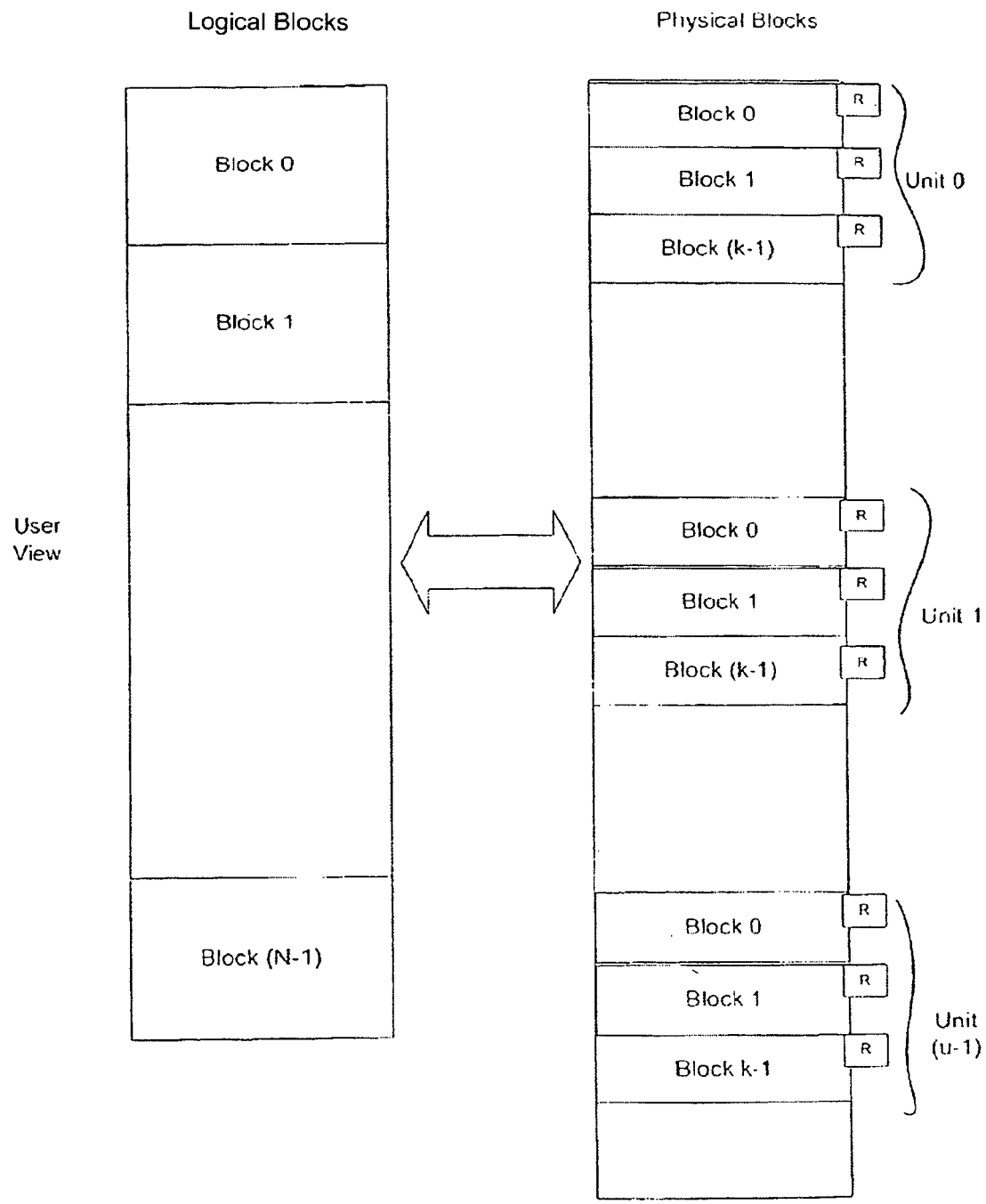
FIG. 9 shows an exemplary non-volatile memory storage organization and address mapping maintained by the controller in a unit-based non-volatile storage device 150.

FIG. 9 shows an exemplary non-volatile memory storage organization and address mapping maintained by the controller in a unit-based non-volatile storage device. This figure is the equivalent of FIG. 5, except that instead of having P independently allocated and accessible physical blocks, the figure shows U physical units, each containing K physical blocks, where a unit is the minimal allocation size.

Figure 10A:
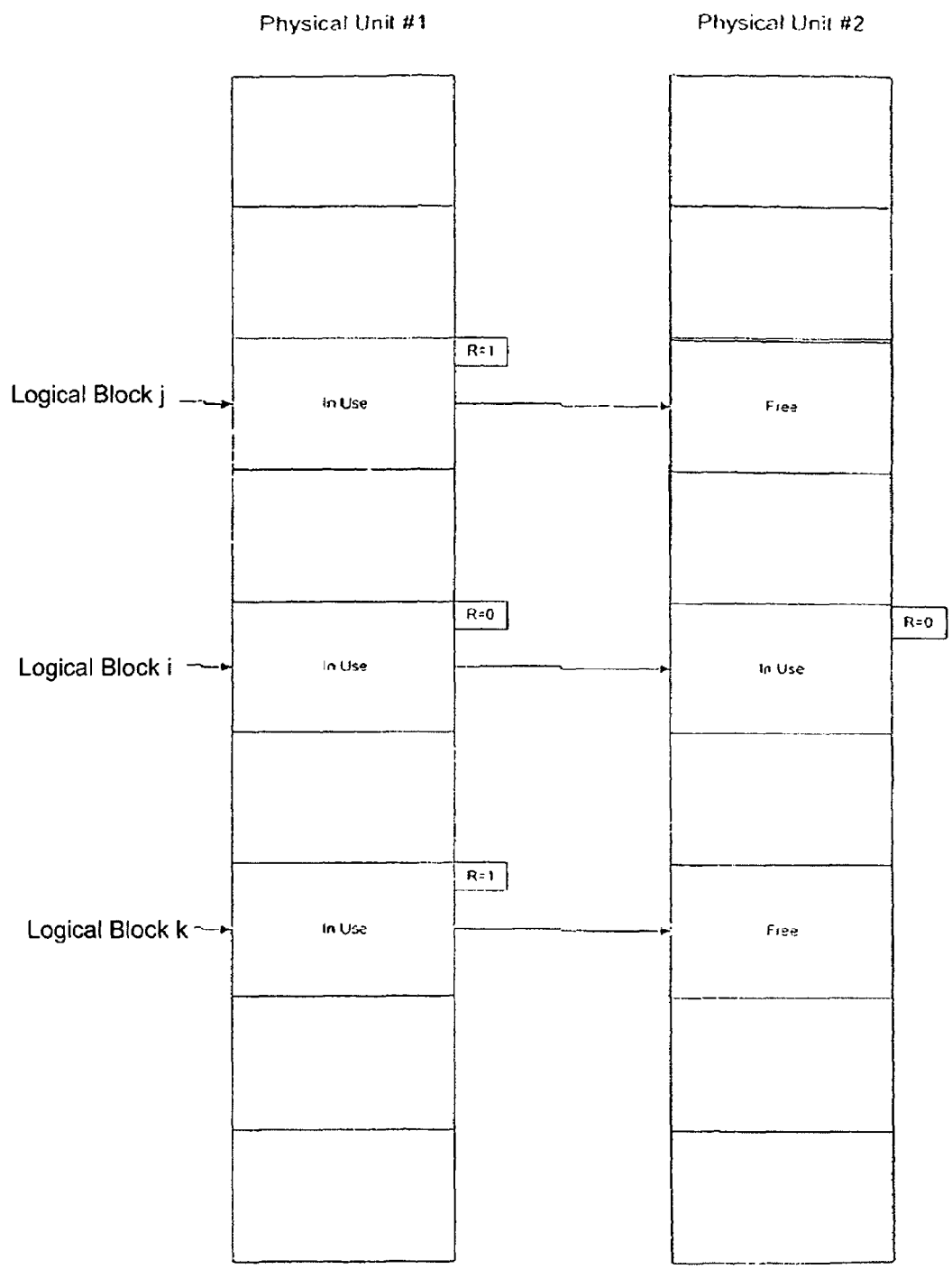
FIGS. 10-10E are diagrams illustrating an exemplary sequence of logical to physical mapping of memory in a unit-based non-volatile storage device when transitioning between two consistent data states.

FIGS. 10A-10E are diagrams illustrating an exemplary sequence of logical to physical mapping of memory in the non-volatile storage device 150 when transitioning between two consistent data states. For simplicity, each of those figures shows only K logical blocks (the number of blocks in a unit), but the same methods apply to all units in the media. FIG. 10A shows an initial consistent data state in which the controller 160 maps each logical block to a single physical block, which is equivalent to the initial consistent data state depicted in FIG. 6E. Unlike in the sequence of FIGS. 6A-6E where the initial consistent data state of FIG. 6A is a special case of an initial consistent data state, with only one physical block associated with a logical block address, FIG. 10A shows the more general case in which some logical block addresses have a chain longer than one physical block assigned to it. As before, each physical block has its associated R bit or flag value. Additionally, each physical block has a field that stores logical state, including at least the states of "Free", "In Use" and "Ignore". It should be understood that such a state field may already be typically available to a controller 160 of a unit-based media such as the non-volatile storage device 150 of FIG. 1. As can be seen in FIG. 10A, some logical block addresses, such as those associated with logical block "j" and logical block "k", have two physical blocks assigned to each address even though the second block is unused (shown as "Free" in the figure). This allocated but unused storage is a consequence of a unit-based media architecture. Stated another way, if logical block "i" needs an additional physical block, a complete physical unit (#2) is allocated and added to the chain, giving all neighbors of logical block "i" in the unit an additional physical block not needed for storage of data.

Figure 10B:
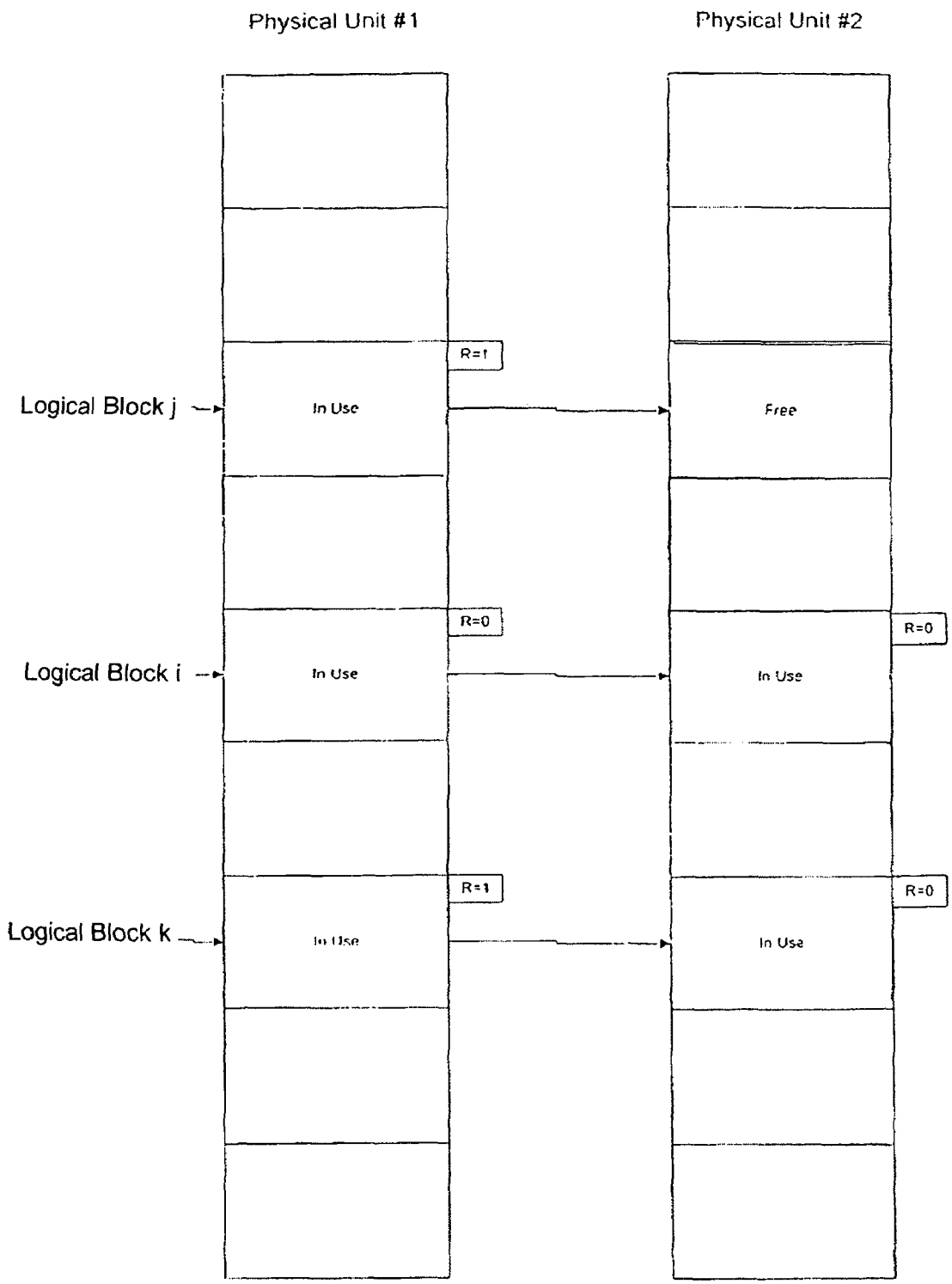

The non-volatile storage device 150 may receive a request to write data to one logical block address. In FIG. 10B the controller 160 logical to physical block address mapping state is shown after the first write request (to the logical block address associated with logical block "k") following a consistent data state is processed. In typical response to the write request, the controller 160 may add a physical block to the chain of physical blocks associated with logical block "k", and set the new physical block's R-bit accordingly. However, in this case, there is no need to make additional physical block allocation, as a free physical block is already available in the chain and can readily be used for the purpose. As shown in the figure, the state of this physical block is changed from "Free" to "In Use" to indicate that now it contains valid data.

Figure 10C:
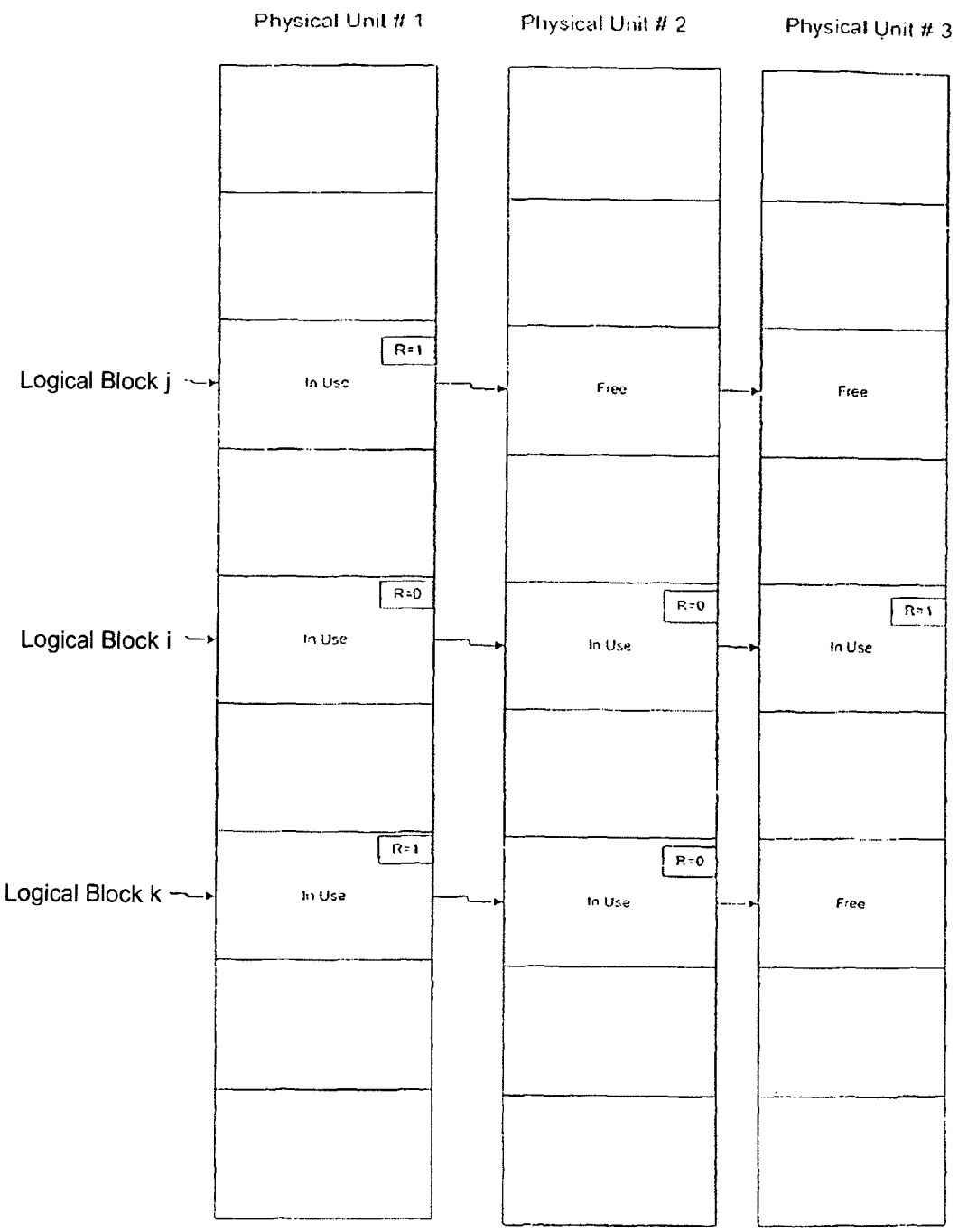

The non-volatile storage device 150 may receive another request to write data to a logical block address where all conditionally associated physical blocks are in use. In FIG. 10C the controller 160 logical to physical block address mapping state is shown after the second write request (to the logical block address associated with logical block "i") following a consistent data state is processed. This is very similar to the mapping shown in FIG. 10B, except that a free physical block is not available for logical block "i" and a new physical unit (shown in the figure as physical unit #3) is conditionally associated by allocating the physical block and adding it to the chain. The physical blocks chain of logical block "i" gets its new physical block with its associated R-bit and "In Use" state field, but all other blocks sharing the same unit also get extra physical blocks marked as "Free" added to their chains.

Figure 10D:
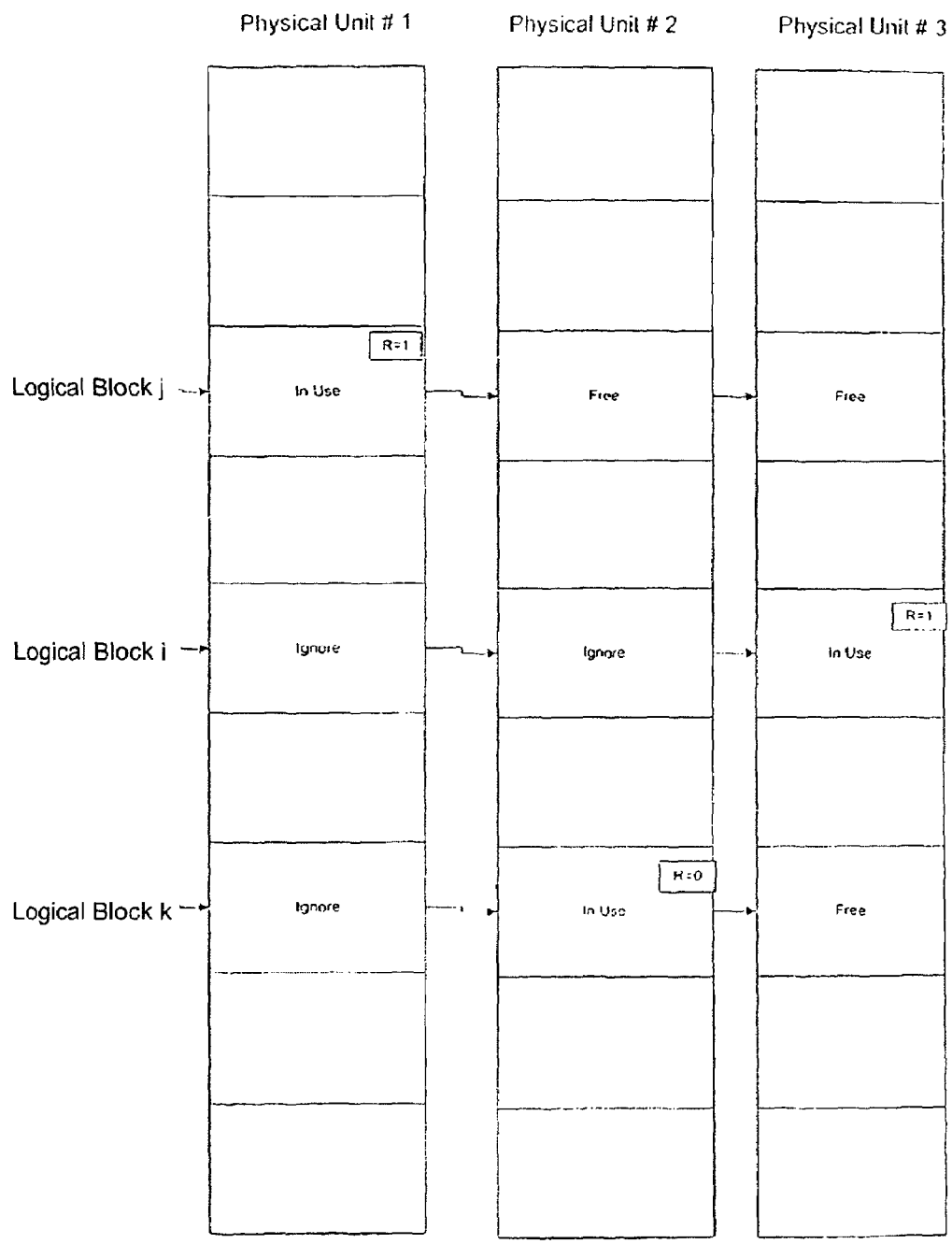

The host 110 may inform the non-volatile storage device 150 that all of the write commands associated with a set of commands have been transmitted and processed, and hence, a new consistent data state can be established. The host 110 may indicate this by transmitting an end of set command to the controller 160 defining a new consistent data state. In FIG. 10D the controller 160 logical to physical block address mapping state is shown after the host informs the controller that a new consistent data state has been reached. As previously explained, the controller 160 establishes a new consistent data state by looking for R-bit value changes along the physical block chains, and dropping the blocks left of those change points. FIG. 10D shows how this is implemented in unit based media. In this case, the action of "dropping" a physical block in a physical unit (two blocks in chain "i" and one block in chain "k") involves setting the state of that physical block to "Ignored". Such a state means the controller 160 should ignore the existence of the block when traversing the chain for subsequent operations. After each logical block address is examined by the controller 160 to perform this process, a new consistent data state is established, reflecting all operations performed in transitioning to the new consistent data state.

Figure 10E:
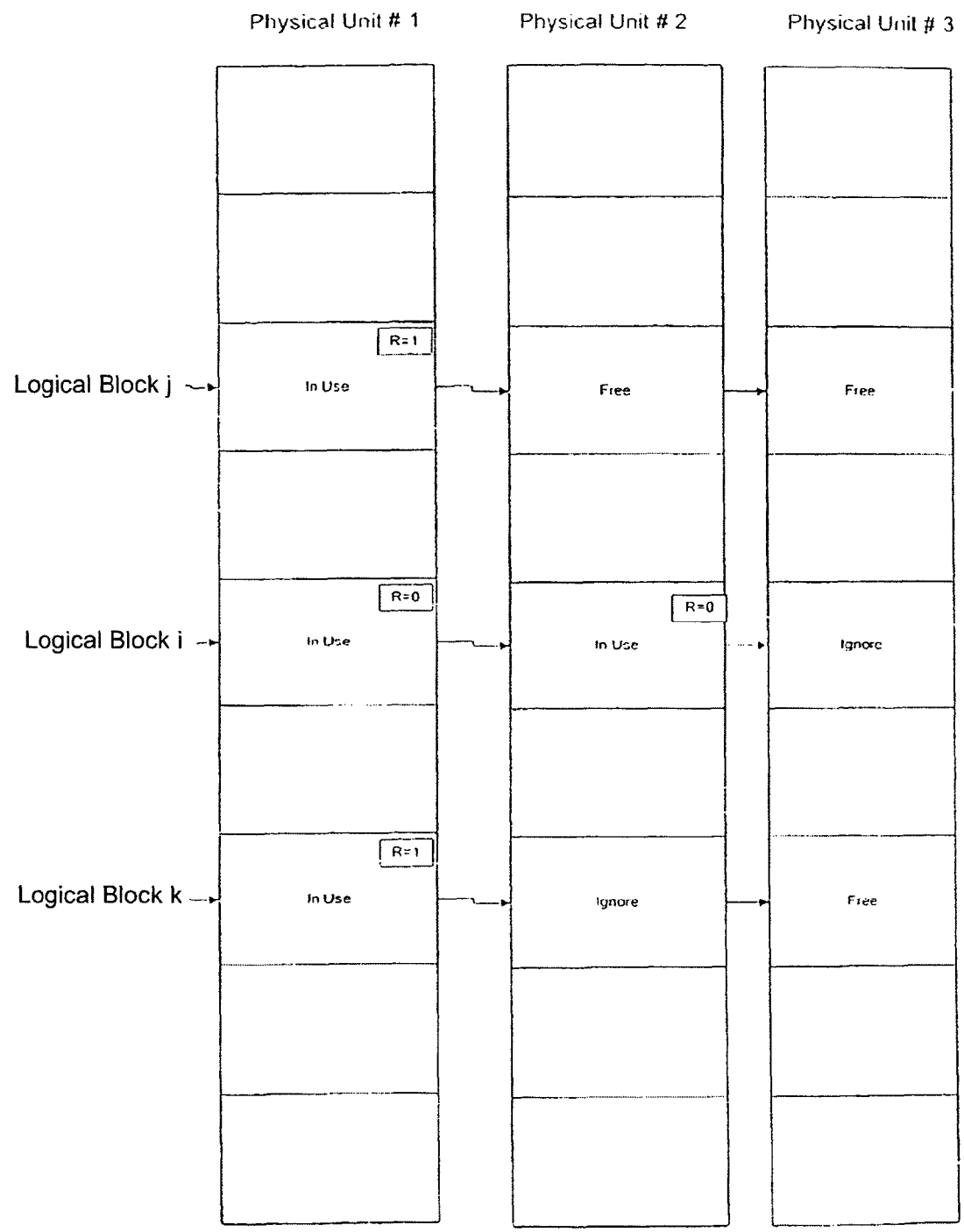

As in the previous embodiments, the controller 160 in a unit-based non-volatile storage device 150 may be required to recover a consistent data state when a sudden power loss or other power interruption takes place during a sequence of write commands that transition the device between consistent data states. FIG. 10E shows the controller 160 logical to physical block address mapping state the controller 160 recovers a consistent data state. As previously explained in the second exemplary embodiment, controller 160 recovers a consistent data state by looking for R-value changes along the chains associated with each logical block address, this time dropping the blocks to the right of the change points in the R-value bits. As shown in the figure, the physical blocks to be dropped (one block in chain "i" and one block in chain "k") again are assigned to a state of "Ignored". The end result is logically equivalent to the state of FIG. 10A, which is the previous consistent data state. Even though there is one more physical unit already allocated in FIG. 10E, from the point of view of the controller 160, and the host 110, the two figures represent identical data states.

As in the other embodiments, if the host 110 sends a read command to the non-volatile storage device during the sequence shown in FIGS. 10A-10D, one of two read procedures can be followed. Referring to FIG. 10C, if the host 110 sends a read command to the non-volatile storage device 150 to read data at an address associated with logical block "i", the controller may return the data contained in one of two physical blocks shown as "In Use"—the one associated with the last consistent data state, or the one containing most recently written data to that address. In one embodiment, which data the controller 160 returns may be set by a parameter in the controller 160 configurable by the host 110. Once a consistent data state is reached, through recovery back to the last consistent data state shown in FIG. 10A, or to the new consistent data state shown in FIG. 10D, there is no choice of data to return, as only the data associated with the consistent data state will be returned in response to a read from that the logical block address. Stated another way, there is only one physical block with the state "In Use" associated with a logical block address when a consistent data state is reached, and all of the other physical blocks may be ignored by the controller 160 because they are marked "Free" or "Ignore."

As illustrated in FIGS. 10A-10D and the accompanying text, the second embodiment (toggling an R-bit value associated with a physical block to indicate the data changes during transitions between consistent data states) can be utilized in unit-based non-volatile storage devices. The first exemplary embodiment (allocating only one extra physical block per logical block address written to during transitions between consistent data states) and the third exemplary embodiment (generation field for each physical block) may be similarly adapted to unit-based non-volatile storage devices. Thus, all adaptations to accommodate unit-based media are considered to be within the scope of the embodiments.

Relative Advantages and Disadvantages of the Embodiments:

a. Storage of logical control state information on the storage media: The first two embodiments are effectively "stateless", in the sense that there is no global (not block-specific) logical control state information written to the storage media when establishing a consistent data state, and the controller 160 does not rely on such information for restoring the media contents during start-up. The third embodiment (generation field for each physical block) does not share this feature, as it updates the global "generation" field for each subsequent consistent data state. The implementation of the controller 160 supporting a stateless ruggedization may provide a simpler and safer solution, as it is usually the case that the updating of control state information is a vulnerability point in any storage management system, and special measures must be taken to avoid data corruption in case a power loss occurs when writing such information.

b. Amount of accumulated changes: The first embodiment (using one extra physical block per modified logical block address to store changes while transitioning between consistent data states) allows the accumulation of an unlimited number of changes to the non-volatile storage device when transitioning between consistent data states while retaining the ability to roll back to a previous consistent data state. This can be achieved by making the number of logical blocks N equal to half the number of the available physical blocks P. In such a case, there are enough physical blocks to provide each logical block address with one physical block storing the current consistent data state, and a conditionally associated physical block storing data received after the current consistent data state has been established. In the extreme case, all logical block addresses in the non-volatile storage device 150 can be written after a consistent data state has been established, and the full contents of the non-volatile storage device 150 may then still be rolled back to its previous state. In this configuration, the controller 160 can theoretically accommodate an unlimited sequence of commands and should never return a "Not Enough Space" error response because the number of physical blocks (P-N) available for the storage of data during the transition between consistent data states has been exhausted. Achieving such a feature may be much more difficult in the other embodiments which allow for chains longer than two blocks.

c. Ability to overwrite in-place: The first embodiment (using one extra physical block per modified logical block address to store changes while transitioning between consistent data states) is applicable only to storage devices which support overwriting blocks in-place. While this is acceptable in magnetic disks, this is not the case in most solid-state memory devices, such as flash memory disks. The other embodiments have no such limitation.

d. Amount of effort in establishing a consistent data state: The first two embodiments require the controller 160 to "clean-up" the block chains whenever a new consistent data state is defined. This is so because these embodiments require the removal of any trace of previous consistent data states, before the new consistent data state is "safe" in the sense that controller 160 will recover a consistent data state on the next power-up. If many chains have accumulated changes, the clean-up operation may be a lengthy operation, because they all accumulated changes since the previous consistent data state. The third embodiment (generation field for each physical block), on the other hand, allows leaving older generation data on the non-volatile storage device 150 without clean-up, and therefore makes the establishment of a new consistent data state very fast. This advantage is especially useful when many consistent data states are created during a session without the time to take down and "clean up" the system when a new state is established, a scenario that is very common in most file systems.

e. Support for more than one last consistent data state: As mentioned above, the third embodiment (generation field for each physical block) is unique in that it allows keeping older generation consistent data states. This makes it possible to do a roll-back not just to the last consistent data state but to some older one. Therefore it is possible for the controller 160 to provide the host 110 with a command to roll-back N generations from a current consistent data state, after which the driver will decrement its global generation value by N and simulate a power-up sequence which will delete all traces of the last N generations. The other embodiments do not support this functionality.

The non-volatile storage device 150 containing a controller 160 implemented according to an exemplary embodiment can be accessed by applications 120 on a host 110 in several different ways:

1. A new file system may be implemented, or an existing file system may be modified, to take advantage of the special commands provided by the controller 160 for rugged operation. This can easily be done inside the file system software by surrounding each sequence of non-volatile storage device access operations that should be an atomic transaction (i.e. creating a file, adding its directory entry, updating the file allocation tables) with calls to the special commands supported by the non-volatile storage device 150 to establish a consistent data state. This will assure that all host command sequences will end with either all operations completed (and thus a new consistent data state) or none completed (and thus a recovery to the existing consistent data state). This makes the file system commands into atomic transactions (as seen by application programs 120), making it a ruggedized file system.

2. A host software application 120 can effectively achieve file system ruggedness even if the file system 130 it is using does not support it and cannot be modified. This can be done by the application 120 surrounding the calls to the file system 130 (i.e. "create file") by calls directing the device driver 140 to send commands to the non-volatile storage device 150 to establish a consistent data state (before and after the call to the file system) or to indicate the start and end of a new set of commands that will transition the non-volatile storage device 150 to a new consistent data state. In this way, even though the file system 130 is not even aware of the ruggedness properties of the non-volatile storage device 150, its operations become atomic. This approach puts the burden on the application programs 120, but it can advantageously be applied to any existing file system without modification. In this approach, the host 110 operating system must allow the application 120 the ability to transfer its commands to the device driver 140, but such mechanism is quite commonly available in many existing file systems. For example the Input/Output Control (IOCTL) command is available in many host systems, which enables the passing of driver-specific commands through the file system 130 to a device driver 140. It should be noted that some file systems employ buffering techniques, in which case they might not immediately generate all device driver commands upon processing a file system command, thus potentially jeopardizing the atomicity property achieved by the method described above. However, this risk can be eliminated if the host application 120 always issues a "flush" command to the file system 130 (to copy the contents of the host buffers to the non-volatile storage device 150) before sending the command to the device driver 140 for establishing a consistent data state. All file systems that employ buffering also provide some support for a flushing command. Therefore, it should be understood whenever a command for establishing a consistent data state is sent, it may be preceded by a flush command if file system buffering is employed.

3. A software application 120 can avoid utilizing a file system 130 and instead interact directly with the device driver 140 in order to utilize the ruggedness features of the controller 160 exported through the interface 190 to the non-volatile storage device 150. This approach, even though possible, may be very inconvenient to use, and thus, will most probably be used very rarely, if at all.

Ruggedization Techniques for Multithreaded Host Systems

The ruggedization embodiments presented so far are mainly applicable to systems using a single thread of execution, where during system operation the file system 130 goes through a series of easily-identified states. Some of those states are not consistent, while others are fully consistent, in the sense that no application-level operation is partially complete. Such a model of software operation is quite common in simple system applications, making the previous embodiments very useful. On the other hand, the ruggedization embodiments described above may not be applicable to more advanced models of software operation, such as to systems employing multi-threading or multi-tasking. As will be apparent from the explanation below, in such systems the concept of a consistent data state is not as useful as before, and the definition we used so far for a ruggedized system must be modified to fit the particular requirements of such systems.

An example of a multi-tasking system with two independent tasks running concurrently is used to illustrate this, each of them interacting with the device driver (whether through the file system or directly). For the purpose of this example it is assumed that the controller 160 employs the methods of the second embodiment (toggling an R-bit value associated with a physical block to indicate the data changes during transitions between consistent data states) as shown in FIGS. 6A-6E and the accompanying text), but the conclusions from the example are applicable to all other embodiments presented above.

FIGS. 11A-11E are diagrams illustrating an exemplary sequence of logical to physical mapping of memory in a non-volatile storage device that may occur when two tasks, each unaware of the operations of the other, are modifying the storage device contents.

Figure 11A:
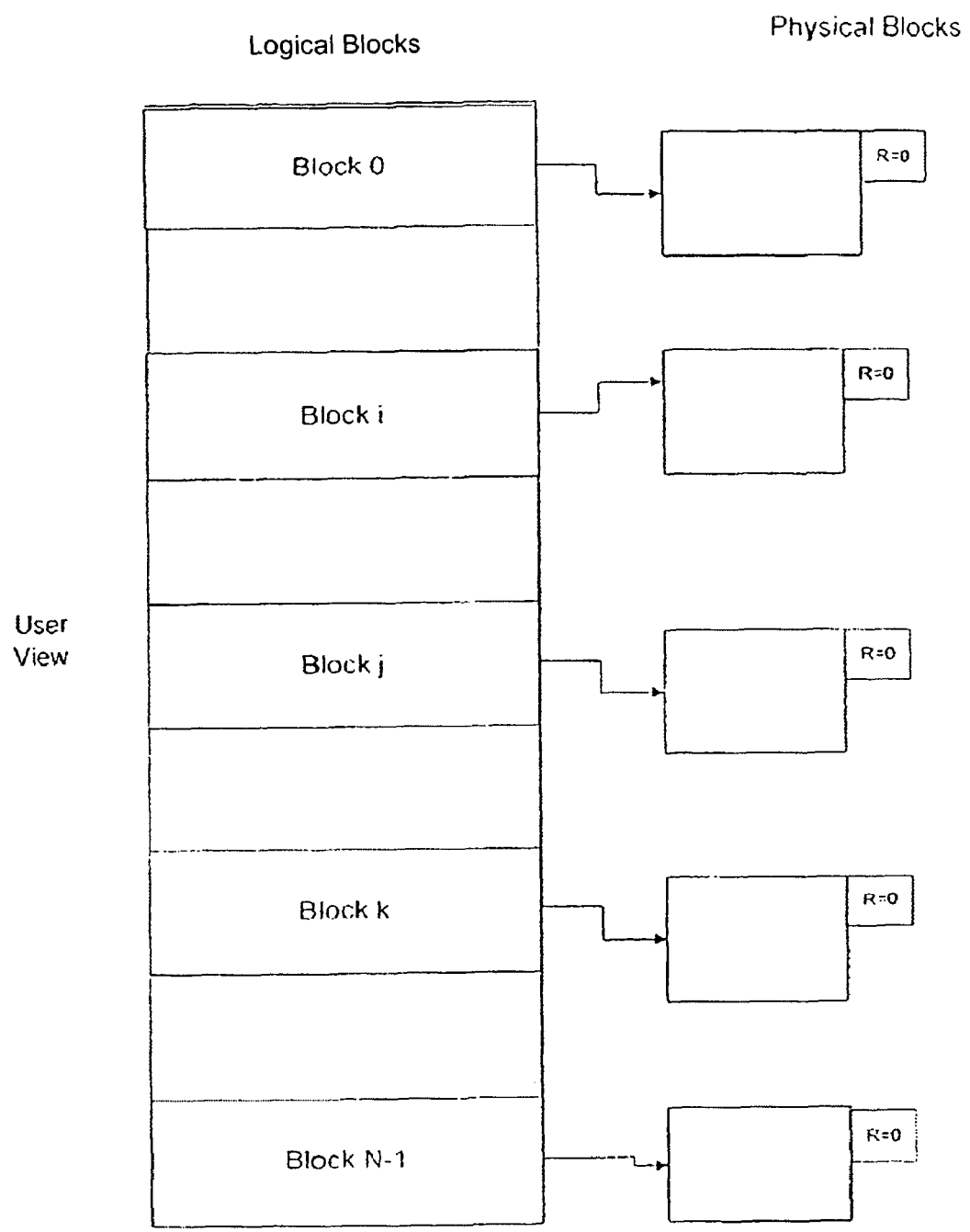
FIGS. 11A-11E are diagrams illustrating an exemplary sequence of logical to physical mapping of memory in a non-volatile storage device that may occur when two tasks, each unaware of the operations of the other, are concurrently modifying the storage device contents.

FIG. 11A shows the controller 160 initial logical to physical block address mapping state. Logical blocks "i", "j" and "k" are each mapped into some physical block. For simplicity, FIG. 11A shows a state where all logical blocks are mapped to single blocks rather than to chains of blocks, but this has no significance on the foregoing discussion. Also, FIG. 11A shows the R-bit values of all physical blocks to be zero in this initial state, but this is arbitrary and has no special significance to the foregoing discussion of multithreaded operation. For simplicity, it is assumed that both tasks considering the state shown in FIG. 11A to be a consistent data state, and had previously issued commands to the controller 160 of the non-volatile storage device 150 to define this state as a consistent initial data state.

Figure 11B:
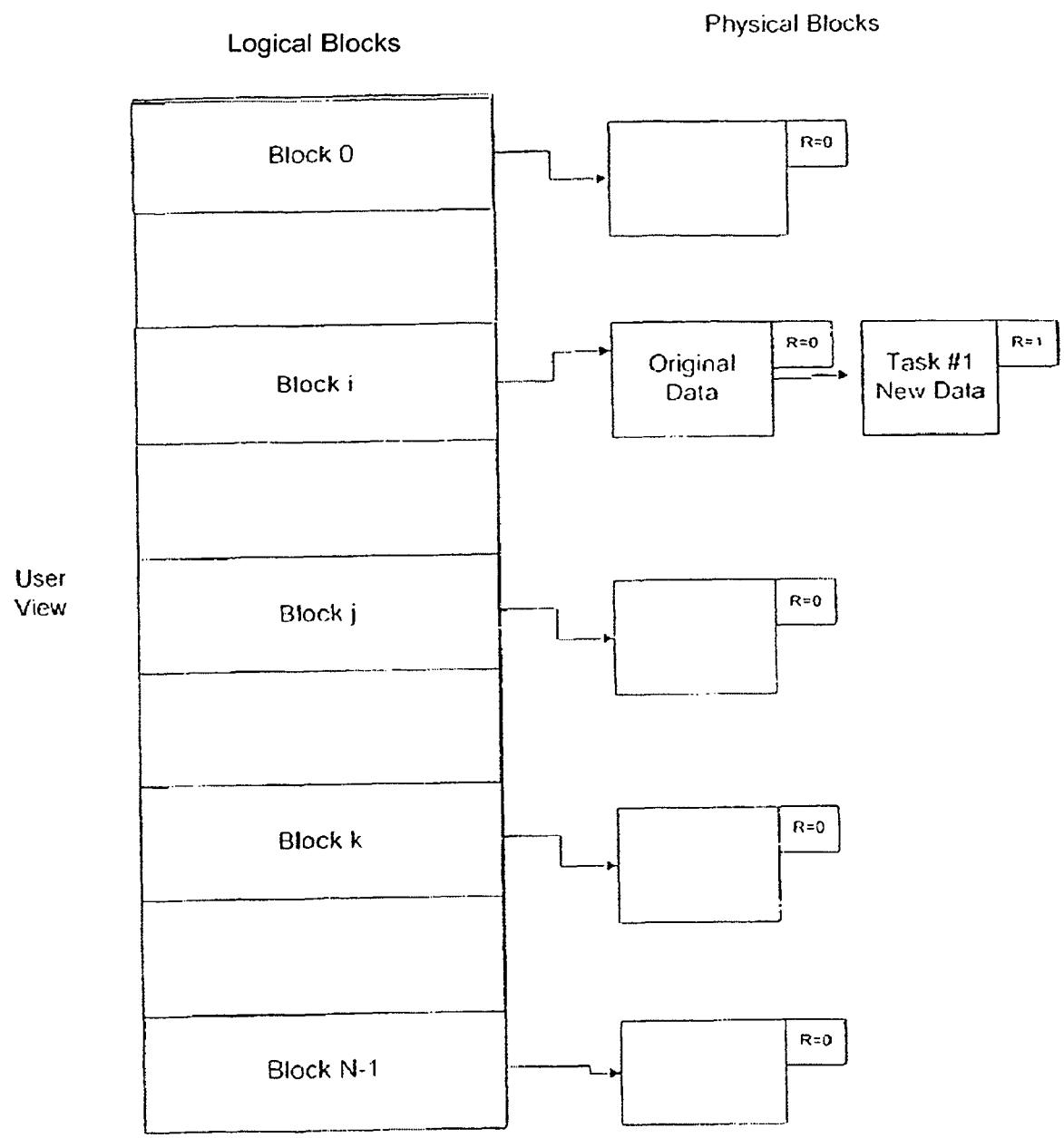
Figure 11C:
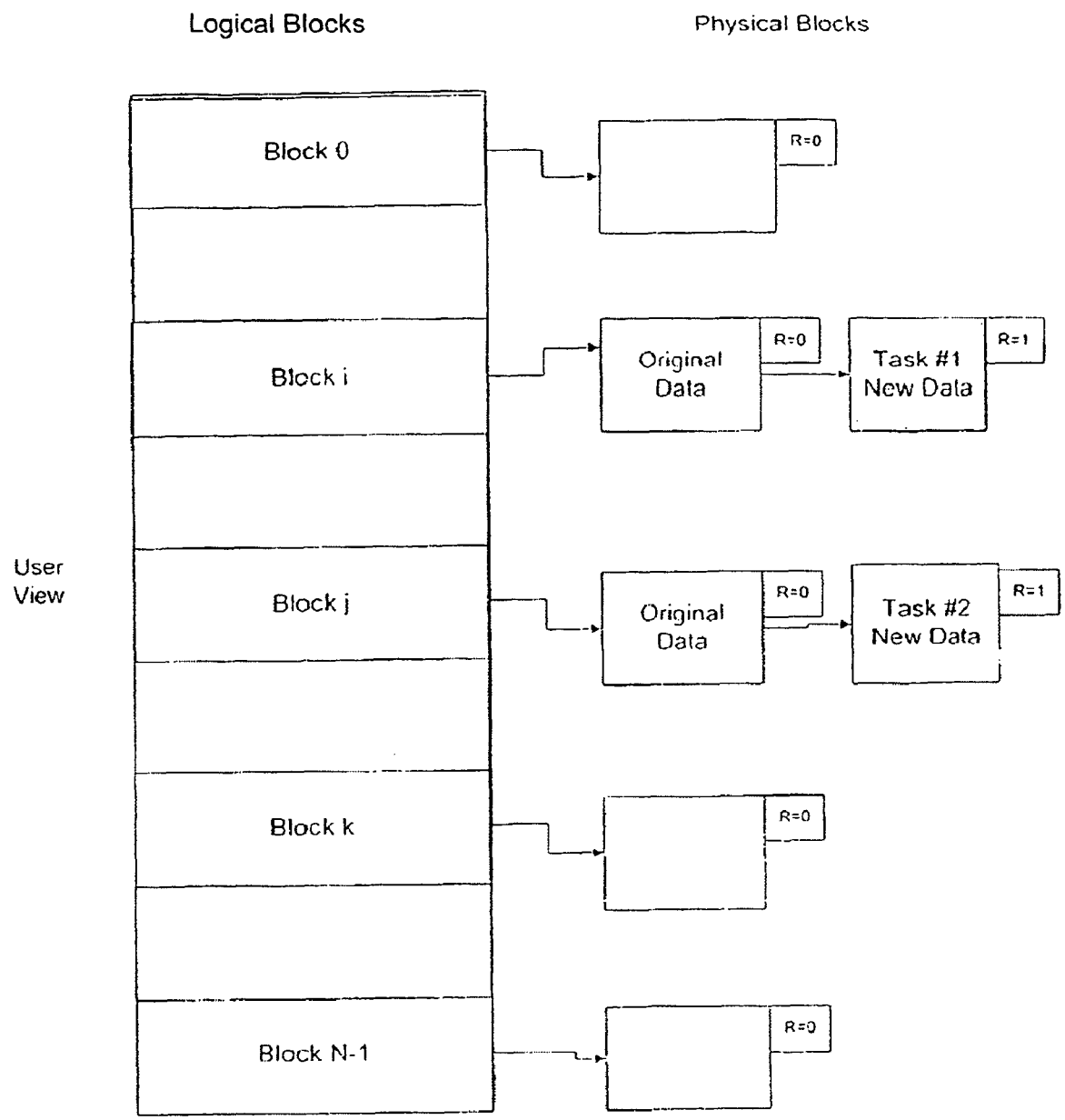

FIG. 11B shows the state of the controller 160 mapping of logical blocks to physical blocks after task #1 moves out of its consistent data state by writing block "i". This extends the physical block chain assigned to logical block "i" from one physical block to two blocks, the second of which contains data which is conditionally associated with the logical block address, in the sense that the controller might still roll-back and delete this physical when recovering a consistent data state in case of a power loss. In FIG. 11C the controller 160 logical to physical block address mapping state is shown after task #2 moves out of its consistent data state by writing to logical block address "j". Multithreaded operating systems allow the intermixing of multiple tasks (for example, two file write operations by two software applications 120), so that the sequence write commands in one set generated by a first task might be separated by write commands by other tasks to the non-volatile memory device 150. This write command initiated by task #2 extends the physical block chain assigned to logical block "j" to have two blocks, the second of which contains task #2 conditionally associated .

Figure 11D:
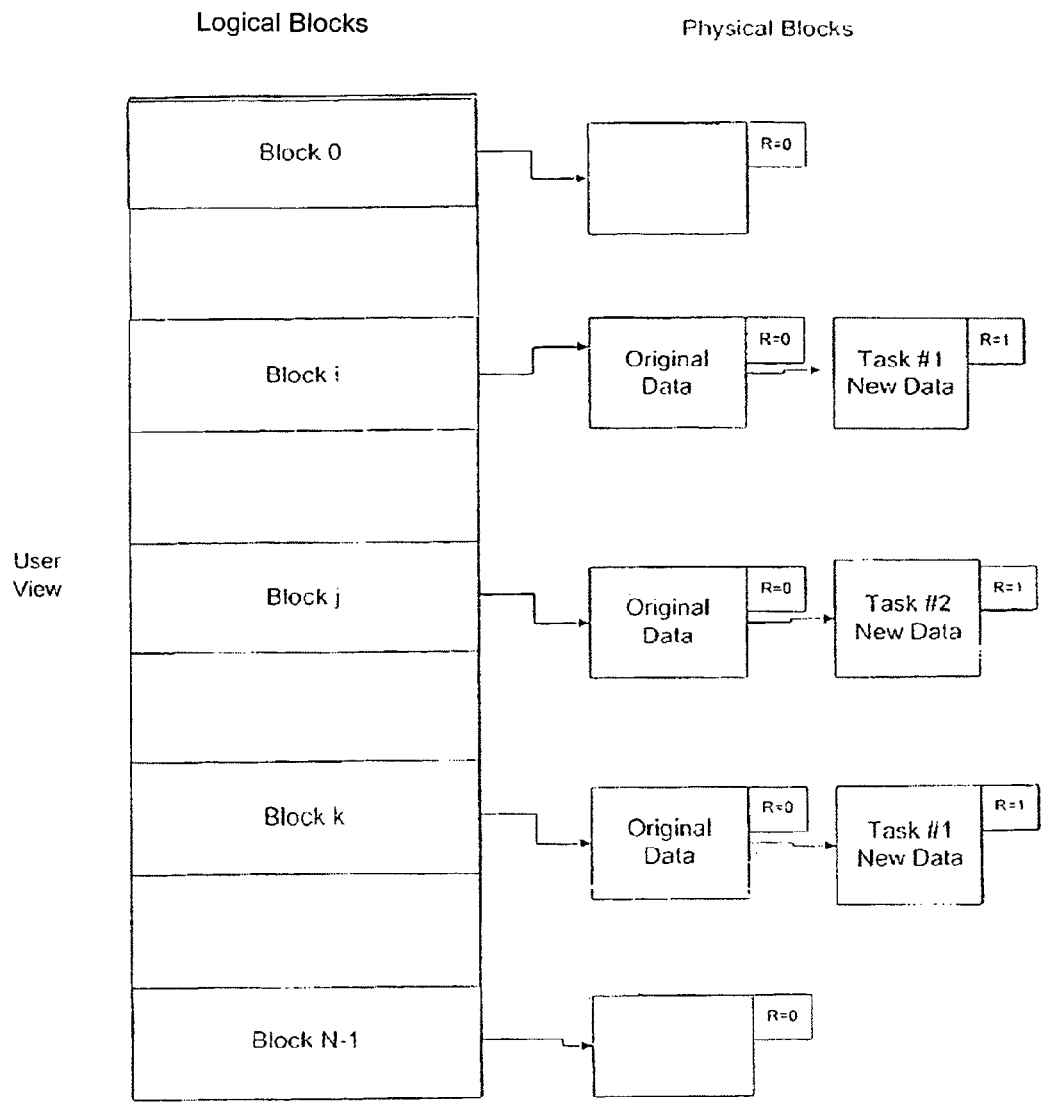

In FIG. 11D the controller 160 logical to physical block address mapping state is shown after task #1 writes to logical block address "k". Again, this write command results in extending the physical block chain associated with logical block "k" with data that is conditionally associated with the logical block address.

Figure 11E:
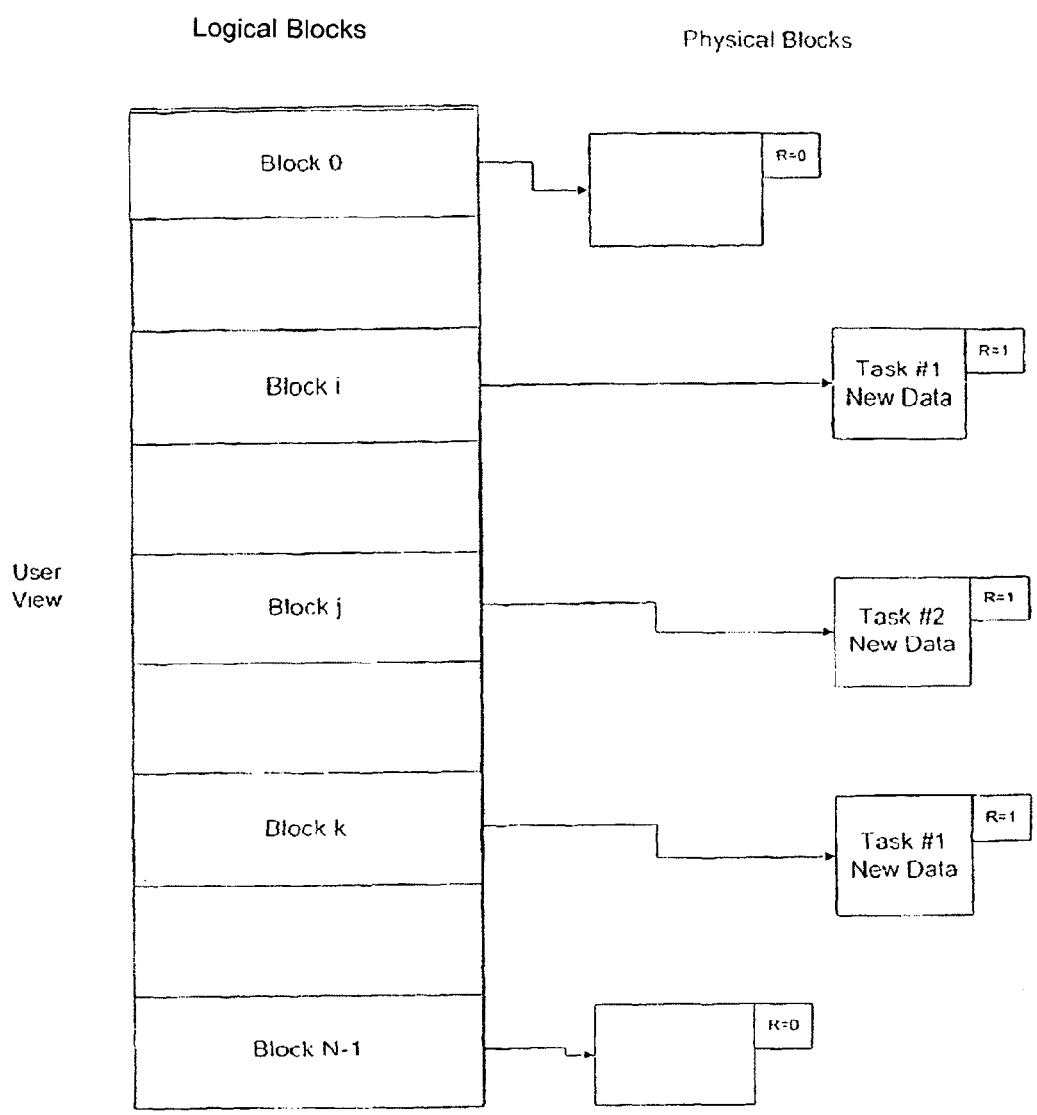

The host 110 may inform the non-volatile storage device 150 that all of the write commands associated with the set of commands from task #1 has been transmitted and processed, and hence, a new consistent data state can be established. The host 110 may indicate this by transmitting an end of set command to the controller 160 defining a new consistent data state. In FIG. 11E the controller 160 logical to physical block address mapping state is shown after the host informs the controller that a new consistent data state has been reached because task #1 has been completed. Upon receiving such command the driver removes all blocks that are to the left of an R value change point in their chain. In this example, this will result in the original data being removed from physical block chains associated with logical block addresses "i", "j" and "k", leaving each of them with only the new data. While this operation is correct for task #1 and its data (blocks "i" and "k"), the command incorrectly caused the controller 160 to associate data written by commands in the unfinished set of commands from task #2 by unconditionally associating the new data of logical block "j" and making it part of the newly defined consistent data state. This is an undesired effect that can readily be seen by considering what would happen if a power failure occurred before all of the write commands associated with task #2 were received, and before task #2 reached a new consistent data state. The controller 160 cannot recover logical block address "j" from the state in FIG. 11E to the consistent data state in FIG. 11A. The end result is an incorrect recovery to a consistent data state, and an inconsistent data state for task #2.

One possible approach for avoiding the difficulties of the multithreaded example would be to allow only one task to be active at any point in time. This is equivalent to allowing only one task access to the device, with all other tasks locked out until the current task completes its sequence of operations and releases the device. While such approach is common with other computer peripherals that cannot support multitasking (such as modems and many types of I/O devices), it is totally unacceptable for a storage device that may be simultaneously accessed by multiple host applications 120, as this would effectively lock out a software application from its data and files for extended periods of time (as might happen when the current task has to complete a long transaction).

Thus, a limitation of the previous embodiments is evident, and must be addressed, when the non-volatile storage device 150 is in communication with a multi-threaded host system. While in a single threaded system, ruggedness can be thought of in terms of consistent data states, where it is assumed that a set of write commands moves the non-volatile storage device contents from one consistent data state to another one. The example of FIGS. 11A to 11E shows the limitations of this model when multitasking systems are accessing the non-volatile storage device 150. Even though each task considers itself as moving between consistent data states, the non-volatile storage device 150 as a whole might not have consistent data states at all, because at any point in time there might be one or more tasks which are not at a consistent data state, and there is no guarantee that all tasks will define consistent data states at the same time.

Therefore, another embodiment that operates in the more complex multitasking case must necessarily incorporate a different definition for ruggedness. In a multithreaded environment, a transaction is a sequence of commands that are preferably logically grouped together into one atomic operation. There is no necessity for the operations of a transaction to be contiguous. In other words, other operations that are not part of that same transaction may occur in the middle of the sequence, between the operations that make up a transaction. These other operations may be parts of other transactions. Because of this possibility that the non-volatile storage device 150 may receive intermixed or interleaved commands associated with multiple transactions, there is a need for a way for the controller 160 to associate an operation (such as a received write command) with a specific transaction. This is preferably achieved by associating each transaction with a "transaction handle" or "transaction identifier", which may simply be a numeric value used by the controller 160 for identifying the transaction. Thus, a controller 160 capable of ruggedized operation in a multithreaded environment can be defined as having the capability to execute sets of commands grouped into transactions, and guaranteeing the atomicity of each transaction. Such a controller guarantees that any interruption (such as a sudden power-loss) will cause a "roll-back" of any transaction open at the time of interruption (an open transaction is defined as a transaction which was started but was not yet declared completed by the host), canceling the effects of each such open transaction. In other words, a transaction may end up fully completed or fully cancelled, but never in between. In still other words, the controller 160 can recover from a sudden power loss and never leave the storage contents of the non-volatile storage-device reflecting the product of a partially completed transaction.

The general concept of a transaction is well known in the prior art. For example, transactions have been used to maintain data integrity in large and distributed databases. However all known prior art technologies use transactions that are at the higher software layers of database applications, file systems, or device drivers. In contrast, the embodiments explained below employ transaction identifiers within the controller 160 of the non-volatile storage device 150, thus achieving much better efficiency. Other methods of recovering from power failure and for backtracking in time to previous "safe" points disclose an application where there is an automatic software engine running in the background of a host software system which can roll back the state of a storage device in time, with a blurred border line between the file system and the engine.

In the embodiments below, a controller 160 within a non-volatile storage device 150 receives a request from a host 110 for a transaction identifier. In response, the controller 160 issues an unused transaction identifier. The host 110 then uses this transaction identifier when sending write commands associated with a set of commands that define a transaction. The controller may utilize the transaction identifier to distinguish data received from different tasks or threads. At the end of a task or set of commands, the host 110 may transmit a command to the controller 160 indicating that the set of commands associated with the transaction identifier are complete. In response, the controller 160 may unconditionally associate the data received in write commands having that transaction identifier with their corresponding logical block addresses. In the event of a power loss, the controller 160 may consult a list of unfinished transactions, and remove conditionally associated data stored in physical blocks assigned to logical block addresses in unfinished transactions.

In another embodiment, a controller 160 may provide ruggedized operation when in communication with a host 110 that allows multithreaded operation. The controller in this embodiment maintains one numeric field per physical block in the non-volatile memory 180. This field is hereinafter called the "transaction" field of the block, or the "T" field, and stores the transaction handle or identifier with which the physical block is associated. This field may be of any convenient size, as long as it is large enough for representing as many different transaction handles as it is desired to be able to be concurrently open. The considerations of where to store these fields are similar to the considerations for storing the control fields of the previous embodiments, such as the R-bit or generation field values. In one implementation, the extra area of NAND flash blocks may be used to store the transaction identifier. Additionally, the controller must maintain a global data structure which lists all currently open transactions.

In order to use the multitasking-ruggedness capability of the non-volatile storage device 150, the host 110 must perform several steps. First, the host 110 must ask the controller 160 to open a new transaction. In response, the controller 160 adds the transaction identifier to the list of open transactions, and returns the transaction identifier to the host 110. Second, the host 110 sends a series of commands to the non-volatile storage device 150 that may each change the contents of the non-volatile memory 180. Each command is associated with the assigned transaction identifier. Finally, the host 110 sends a command to the controller 160 to close the open transaction identifier. In response, the controller 160 unconditionally associates the data received in commands having that identifier with their corresponding logical addresses, and removes the transaction identifier from the list of open transactions. In one embodiment, the controller 160 unconditionally associates the data by unconditionally associating the physical blocks storing the data with the logical block address. During this process, the data received in the set of commands is not moved or copied between physical blocks. Following the above procedure guarantees that a storage device implemented according to the methods of the embodiment, presented below, provides multitasking-ruggedized operation to the host 110.

Figure 12:
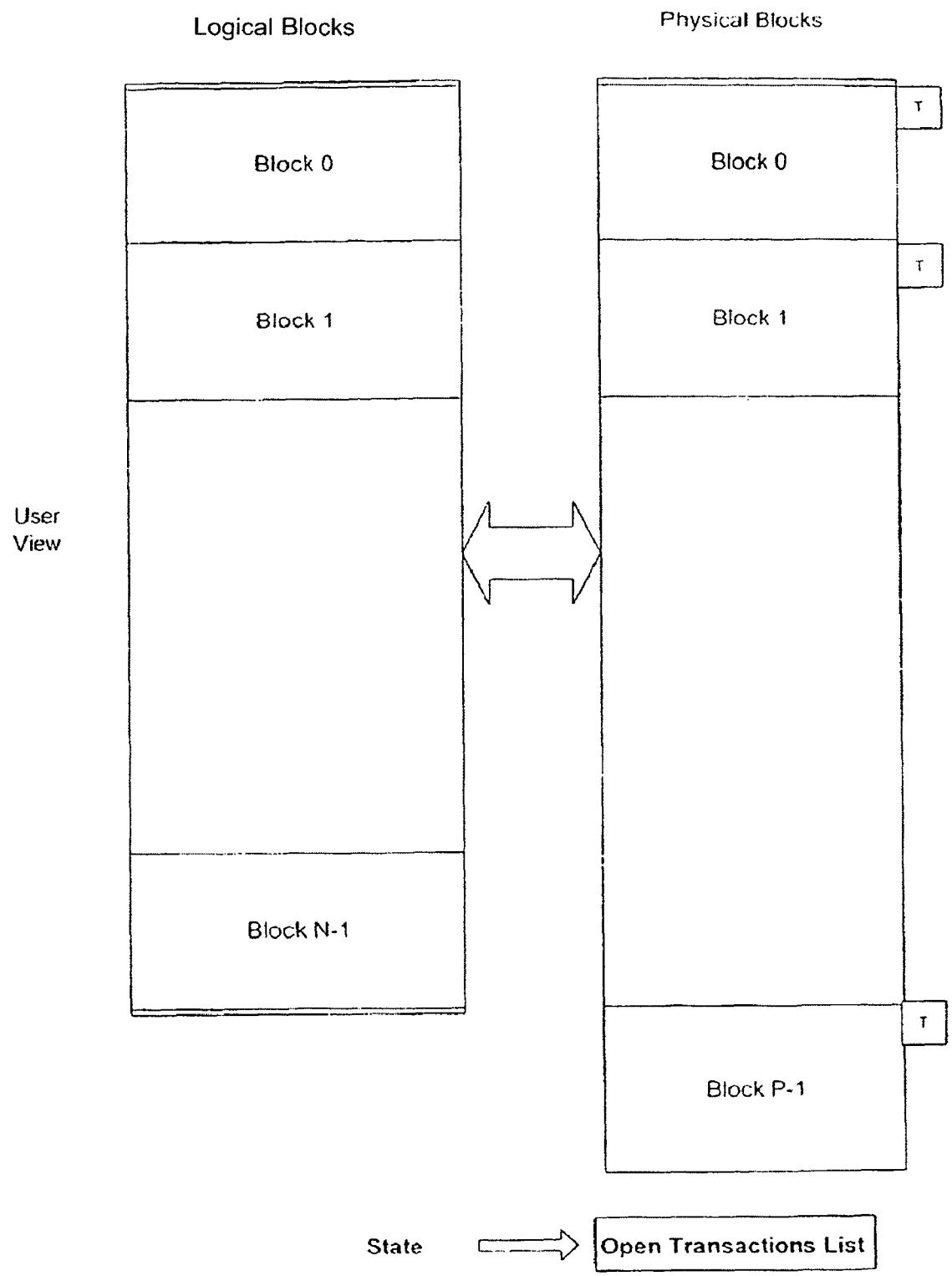
FIG. 12 shows an exemplary non-volatile memory storage organization and address mapping maintained by the controller in a non-volatile storage device.

FIG. 12 shows an exemplary non-volatile memory storage organization and address mapping maintained by the controller in a non-volatile storage device. Each physical block has a transaction identifier field, and the controller 160 maintains a current state through a global transactions list of transactions in progress. This list may be stored in non-volatile memory in the controller 160, or in the non-volatile memory 180 of the storage device 150.

Figure 13A:
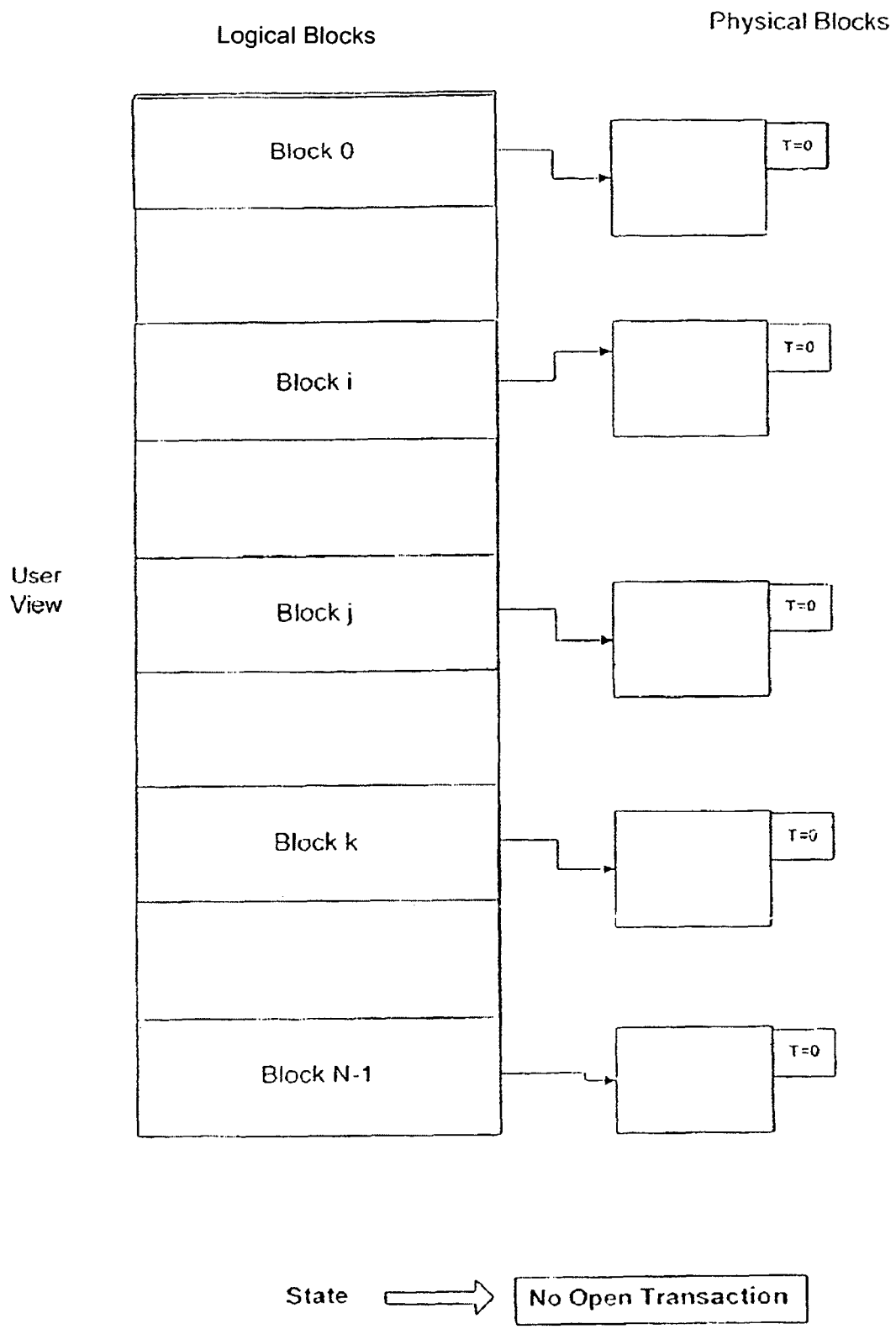
FIGS. 13A-13F are diagrams illustrating an exemplary sequence of logical to physical mapping of memory in a non-volatile storage device while the controller processes write commands associated with a single transaction in a multithreaded system.

FIGS. 13A-13F are diagrams illustrating an exemplary sequence of logical to physical mapping of memory in a non-volatile storage device while the controller processes write commands associated with a single transaction in a multithreaded system. FIG. 13A shows an initial state of the mapping by the controller 160 of logical blocks to physical blocks. In the figure, no transactions are open. Each physical block has its associated transaction field set to a null value (such as zero), indicating that no transaction is associated with the block. The open transactions list indicates that no transaction is currently open.

Figure 13B:
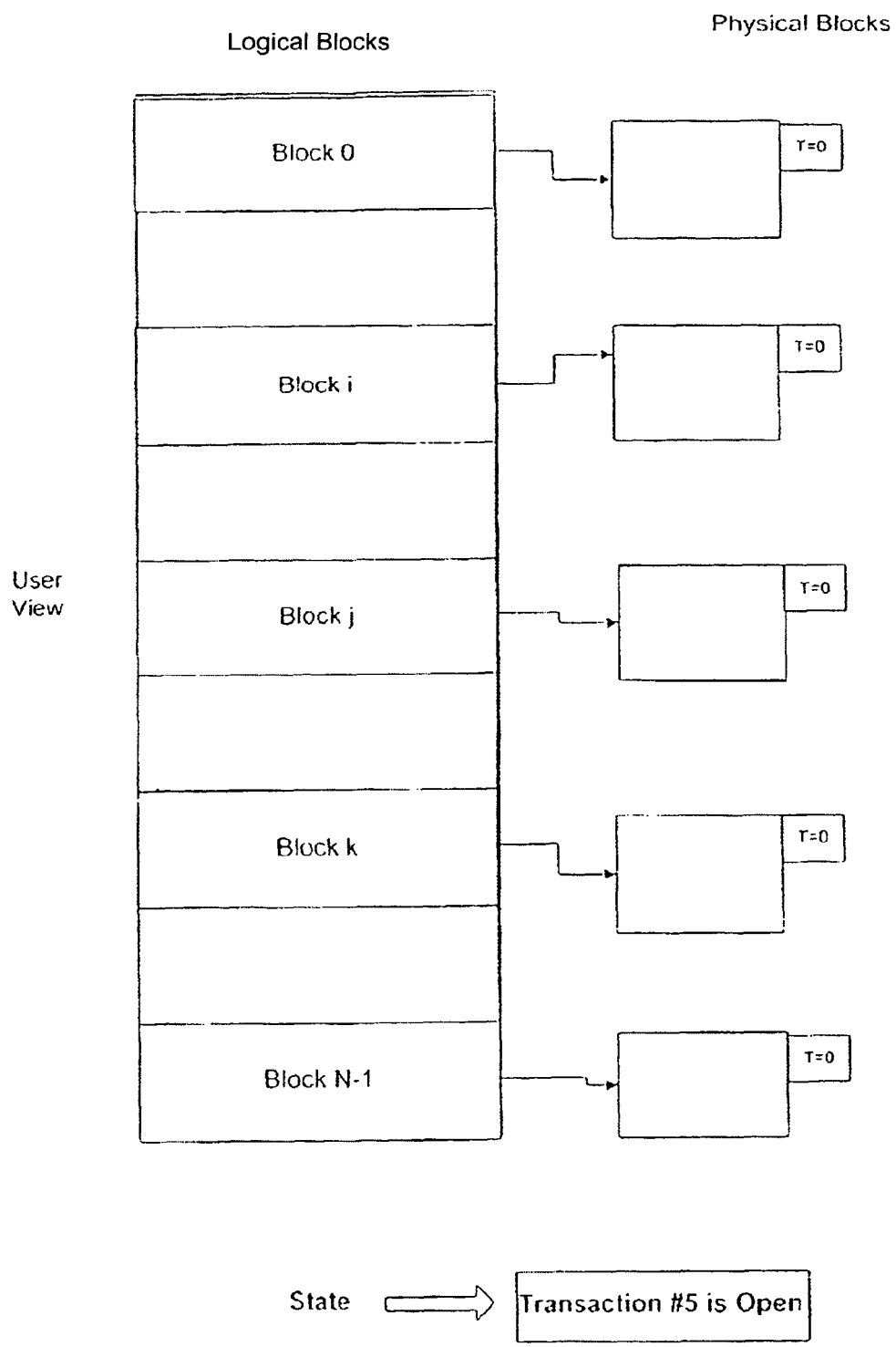

In FIG. 13B the controller 160 logical to physical block address mapping state is shown after the host 110 sends a request for a transaction identifier to the controller 160. In response to the request, the controller 160 assigns to the host 110 transaction identifier #5, and adds the transaction identifier to the list of open transactions. The transaction identifier number chosen is arbitrary, except that it should be different from the value representing "null" shown in FIG. 13A, and the value chosen should be different from the transaction identifier of any other open transactions. The transaction identifier #5 should be used by the host 110 when sending subsequent write commands associated with this atomic transaction. As shown in the figure, the only change caused by the start transaction command is the indication in the open transaction list that transaction #5 is now open.

Figure 13C:
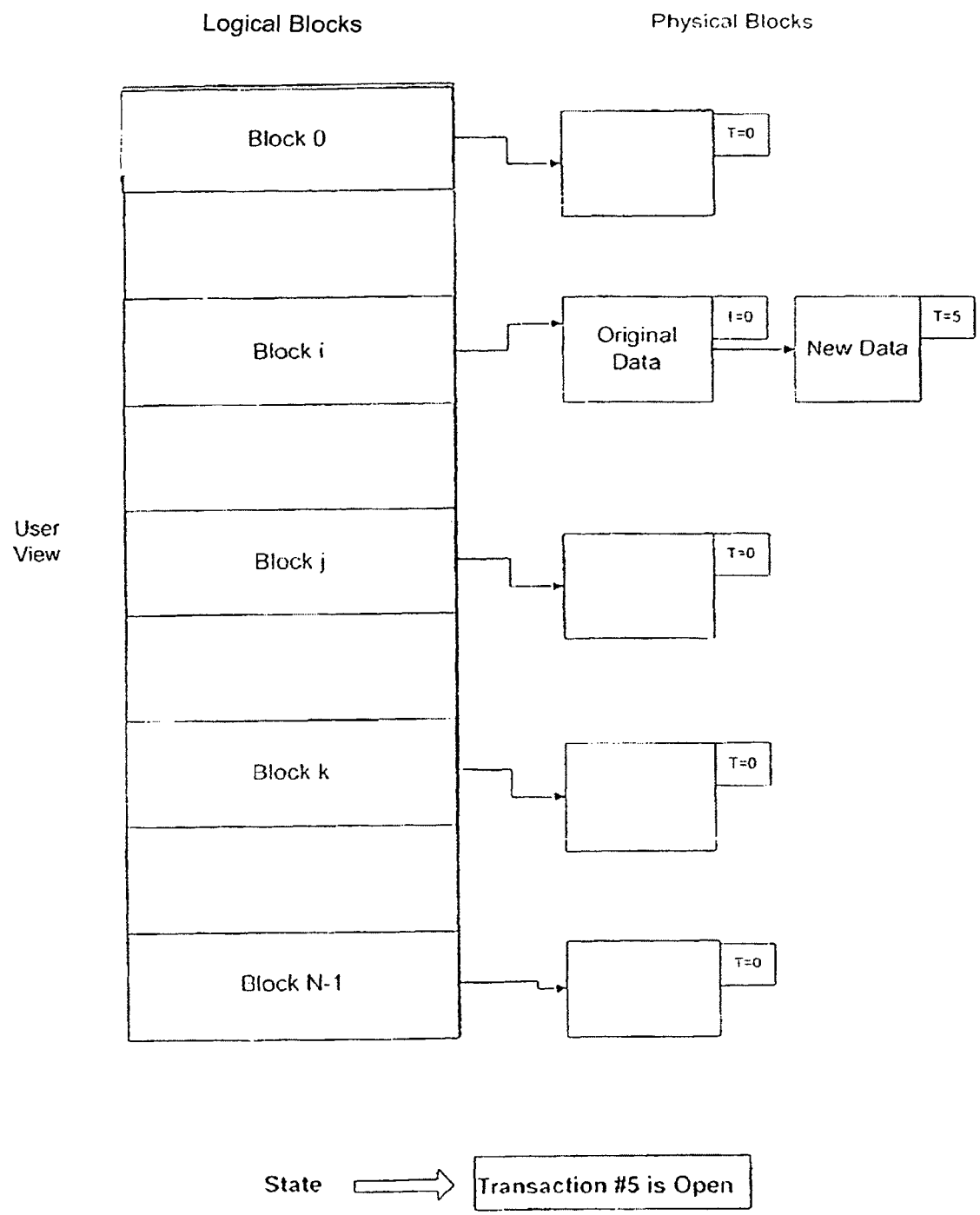

In FIG. 13C, the controller 160 logical to physical block address mapping state is shown after the first write request (to the logical block address associated with logical block "i") associated with transaction #5 is processed. As the figure shows, the original data associated with logical block address "i" is not overwritten, as the controller 160 may need this data to recover the state of the non-volatile memory device 150 before the changes introduced by transaction #5. Instead, a free physical block is conditionally associated with the logical block address by adding the physical block to the chain. The newly received data is written in the conditionally associated physical block, and its transaction identifier field is set to the transaction identifier, which in this example is #5. Because the transaction is still open, the open transaction list remains unchanged.

Figure 13D:
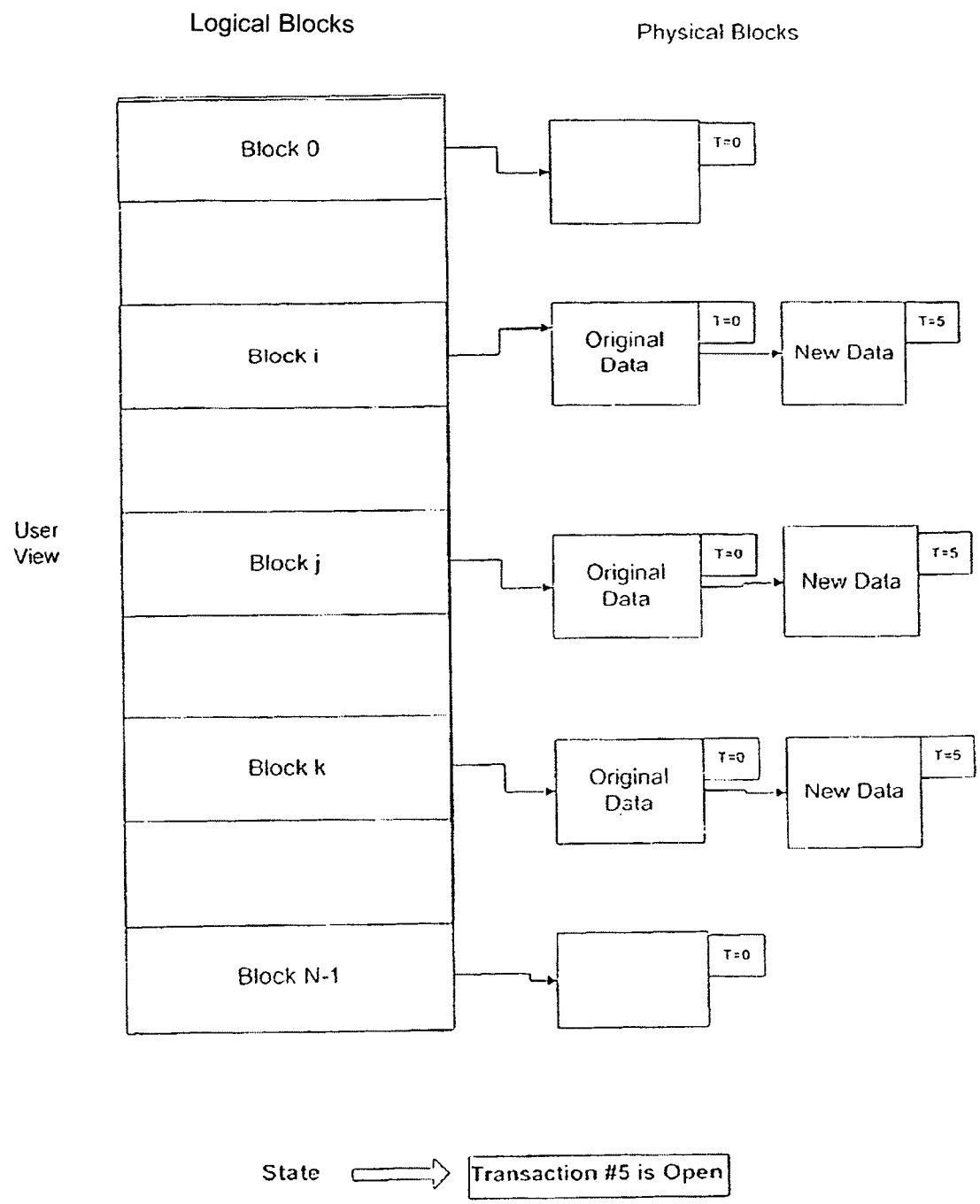
Figure 13E:
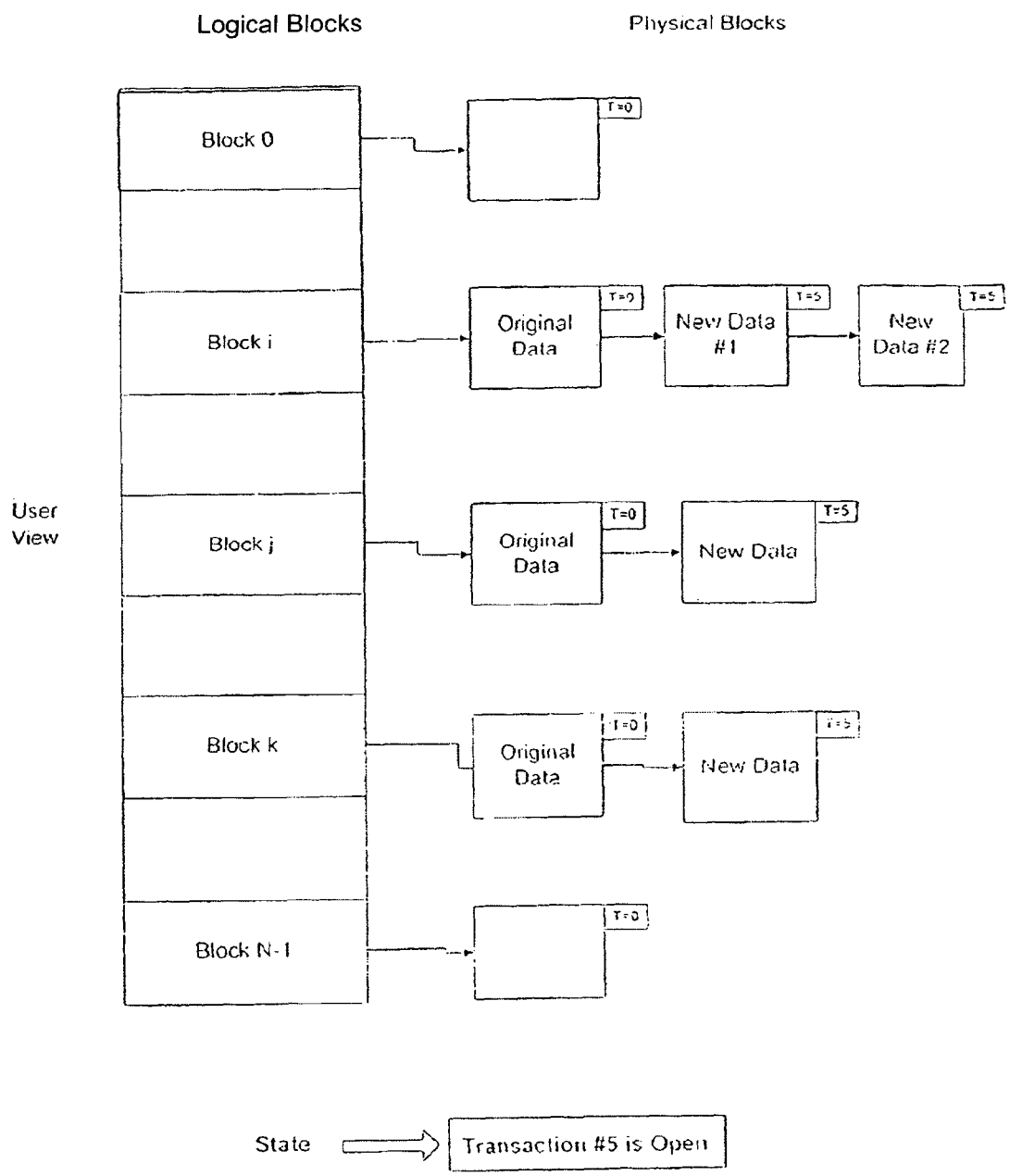

As shown in FIG. 13D, the controller 160 processes additional commands (associated with transaction identifier #5) to write data to logical block addresses associated with blocks "j" and "k". Now the logical block addresses "j" and "k" are also each assigned a second physical block containing the data received in the write commands, and again the transaction fields of the new physical blocks are set to the transaction handle of #5. The open transaction list remains unchanged. In FIG. 13E, the controller 160 logical to physical block address mapping state is shown after an additional write request associated with transaction #5 is received, this time a second command to write the logical block address associated with logical block "i" with new data. A new physical block is conditionally mapped to the logical block address associated with logical block "i" (extending its chain to three blocks), and the newest data, shown as "New Data #2" in the figure is written into it. The transaction identifier of this newly allocated block is again set to the transaction identifier #5, and the open transaction list remains unchanged.

Figure 13F:
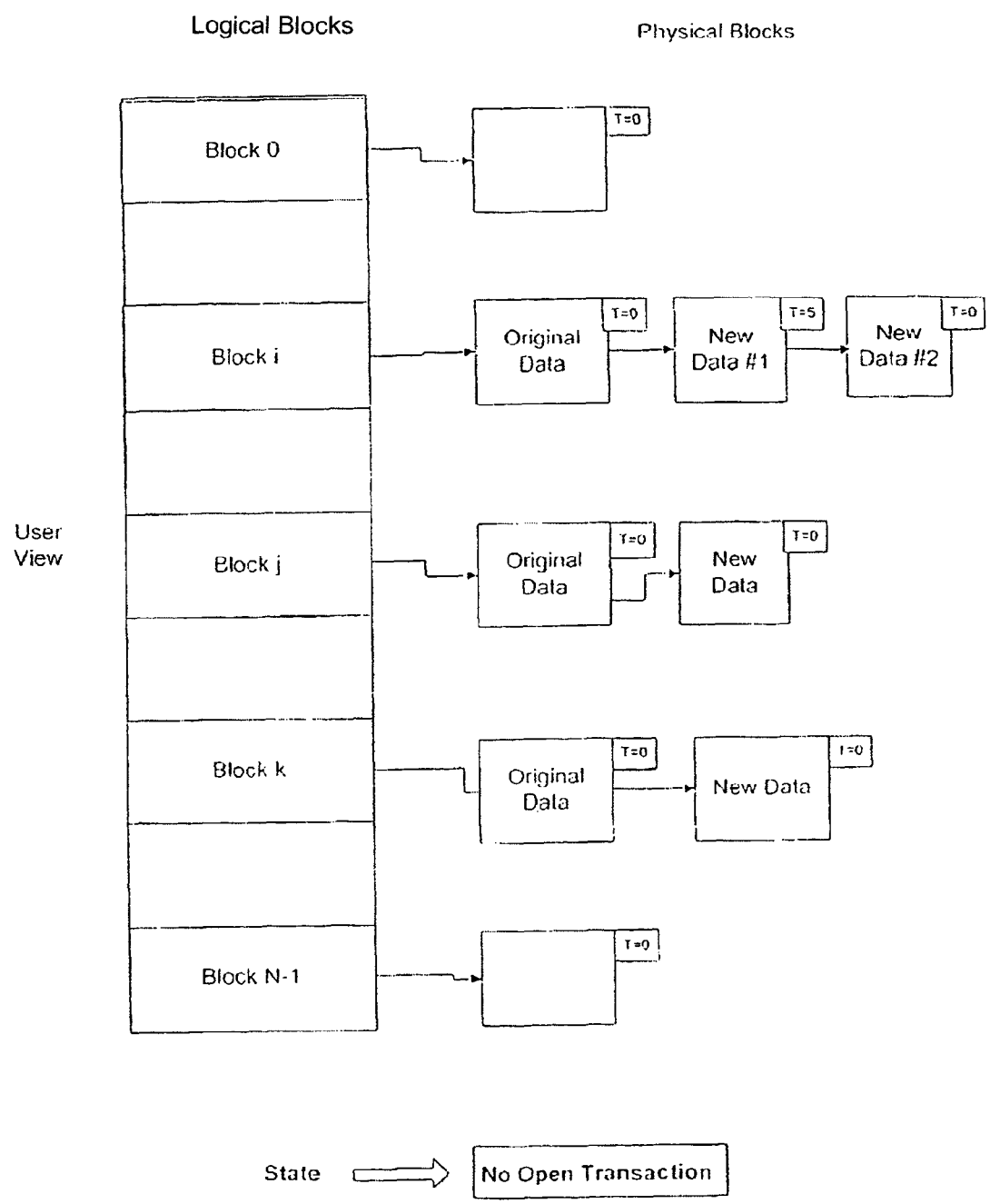

In FIG. 13F the controller 160 has processed a request from the host 110 to close transaction #5. In response to the request, the controller 160 first nullifies the transaction identifier field of any physical block having a transaction field of 5. In one implementation, it is sufficient to nullify only the latest such physical block transaction identifier field in each chain, so that in the chain for logical block "i", there is no need to nullify the transaction block identifier field in the physical block containing the data marked "New Data #1". Second, the controller 160 removes transaction identifier #5 from the open transactions list.

As a result, the non-volatile storage device 150 is in a state in which all of the operations included in transaction #5 are committed, and the data written to the device in transaction #5 is unconditionally associated with its corresponding logical block address. This state is similar to the state shown in FIG. 13A where there are no open transactions. The sequence of events of opening a new transaction, writing data associated with a transaction, and closing a transaction can now be repeated.

At first glance, FIGS. 13A and 13F do not appear similar, because in FIG. 13F, some logical block addresses have more than one physical block associated with them, a condition which does not exist in FIG. 13A. However, as can readily be seen, this has no effect on the sequence of steps the controller 160 takes in processing a set of commands for one transaction between FIG. 13A to 13F. FIG. 13F reflects the general case of an initial state (no open transaction) where a logical block may have more than one physical block assigned to it. FIG. 13A is a simplification of the general case. Stated another way, the most general case of a physical block chain is when it has zero or more blocks at its end, having their transaction fields set to non-null values, preceded by a block with a null transaction field, and possibly by additional blocks whose transaction fields are not important. The rightmost block with null transaction field contains the latest unconditionally associated data, while all newer blocks contain still conditionally associated data that was written during transactions that are still open. The act of closing a transaction is achieved by nullifying the transaction fields of the newest physical blocks of the chains associated with that transaction, thus unconditionally associating that data with its corresponding logical block addresses.

In the event of a sudden power loss or other interruption of power to the non-volatile storage device 150 (such as if a storage card is suddenly disconnected from the host by the user), the controller 160 will have to recover a consistent data state by "rolling back" or removing physical blocks data associated with transactions that were open when the power was interrupted. When a power supply is restored to the non-volatile storage device 150, the controller 160 will check the list of open transactions, and then will scan the logical block addresses in the non-volatile memory 180 for the existence of physical blocks chains with a physical block at their end (to the right of any block with a null transaction field) having a transaction field which appears in the open transactions list. If such a physical block is detected, it is removed from the chain. The removal may be implemented directly, or may be effected by extending the chain with another physical block that overrides it. When the controller 160 completes this scan for all logical block addresses, the non-volatile storage device 150 is recovered to a state that reflects only the write operations of transactions that completed, with all data changes occurring through partially completed transactions being removed. For example, if a power loss occurred anywhere in time between the states shown in FIGS. 13A and 13F (not inclusive), the controller 160 would restore the data state of the non-volatile storage device to the state shown in FIG. 13A. However, if a power loss occurs after the state of FIG. 13F is reached, in other words, after transaction #5 is closed, there is no longer a need to return to the state shown in FIG. 13A, as another atomic transaction (#5) has successfully completed. Thus, any recovery following this point will be to the state shown in FIG. 13F, until another transaction successfully completes. In one embodiment, this recovery process is initiated by the controller 160 without receiving any special command or direction from the host 110. Stated another way, the controller 160 performs the scanning, detection, and removal operations automatically upon restoration of power to the card.

The above description presented the methods of this embodiment in the context of a single transaction. In the next example, the use of transaction identifiers in a multi-tasking case is illustrated by demonstrating how their use addresses the problem highlighted in FIGS. 11A-11E. FIGS. 14A to 14H describe this sequence of events.

Figure 14A:
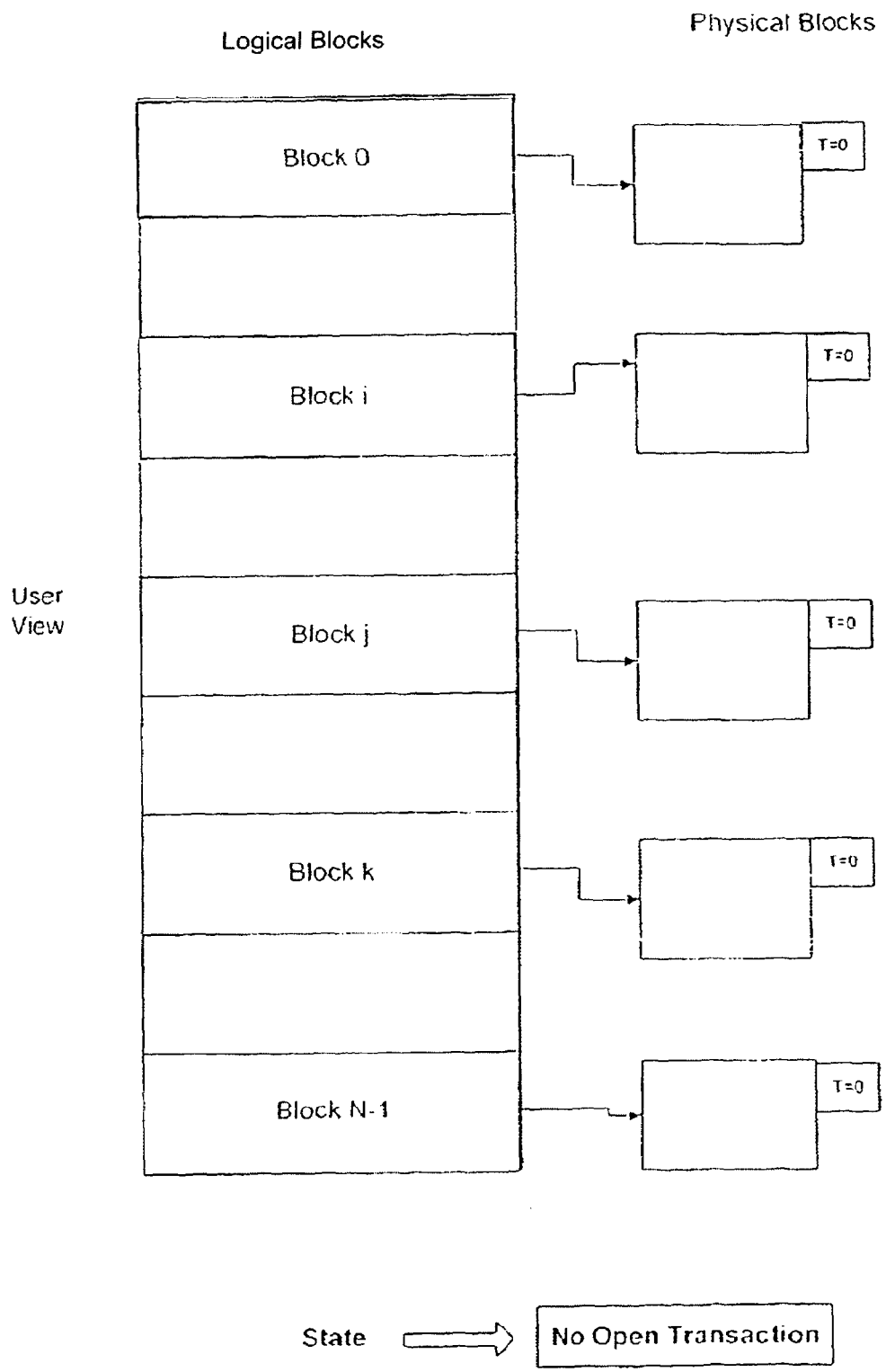
FIGS. 14A-14H are diagrams illustrating an exemplary sequence of logical to physical mapping of memory in a non-volatile storage device that may occur when two tasks, each unaware of the operations of the other, are concurrently modifying the storage device contents using commands that contain transaction identifiers.

FIG. 14A is the equivalent of FIG. 11A and shows the controller 160 initial logical to physical block address mapping state. There are no open transactions, and all block chains end with a block having a null transaction field.

Figure 14B:
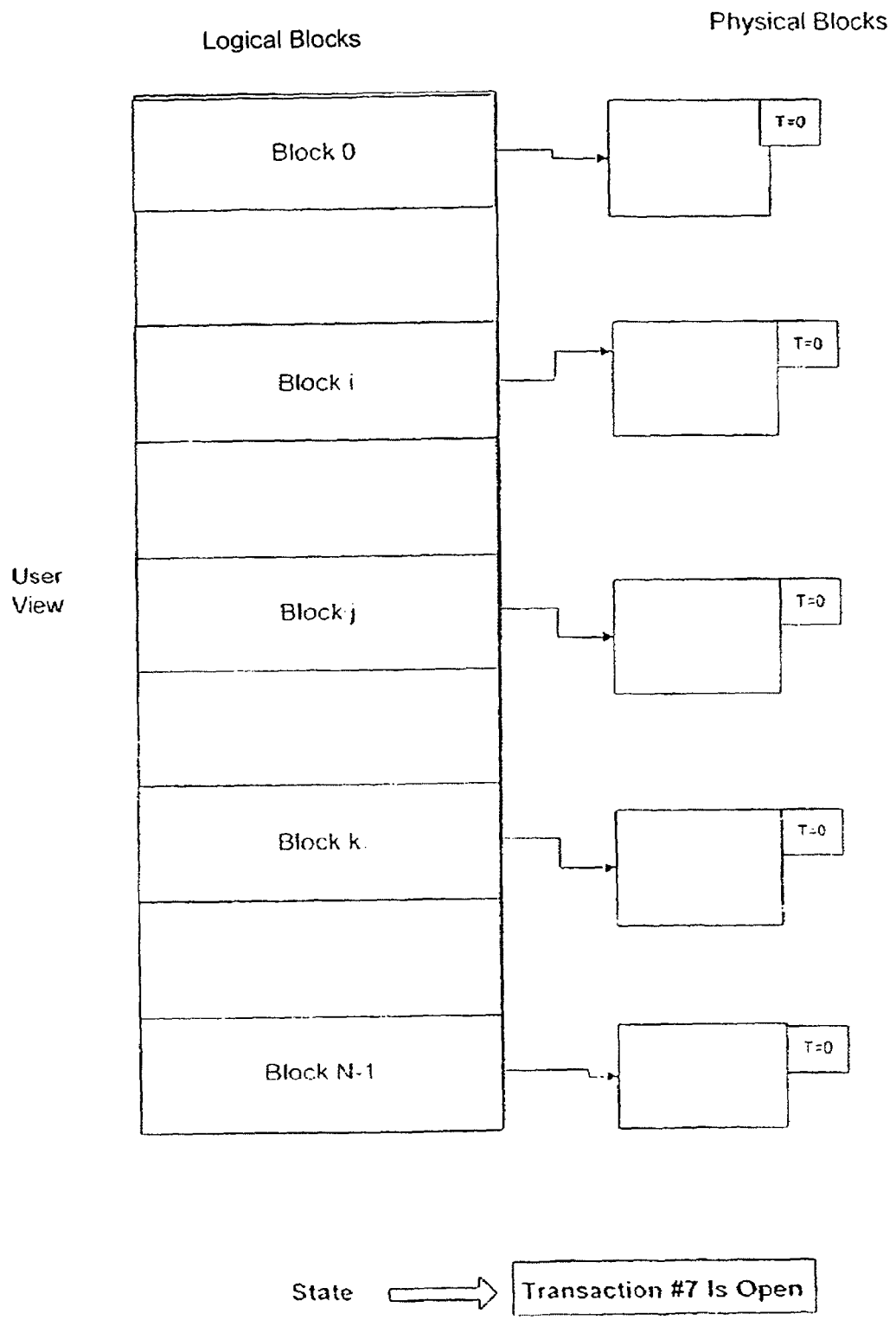

FIG. 14B shows the controller 160 state after task #1 directs the controller 160 to start a transaction. The controller 160 assigns a transaction identifier (#7 in the example), adds the transaction identifier to the global open transactions list, and returns the transaction identifier to the host application 120 requesting task #1.

Figure 14C:
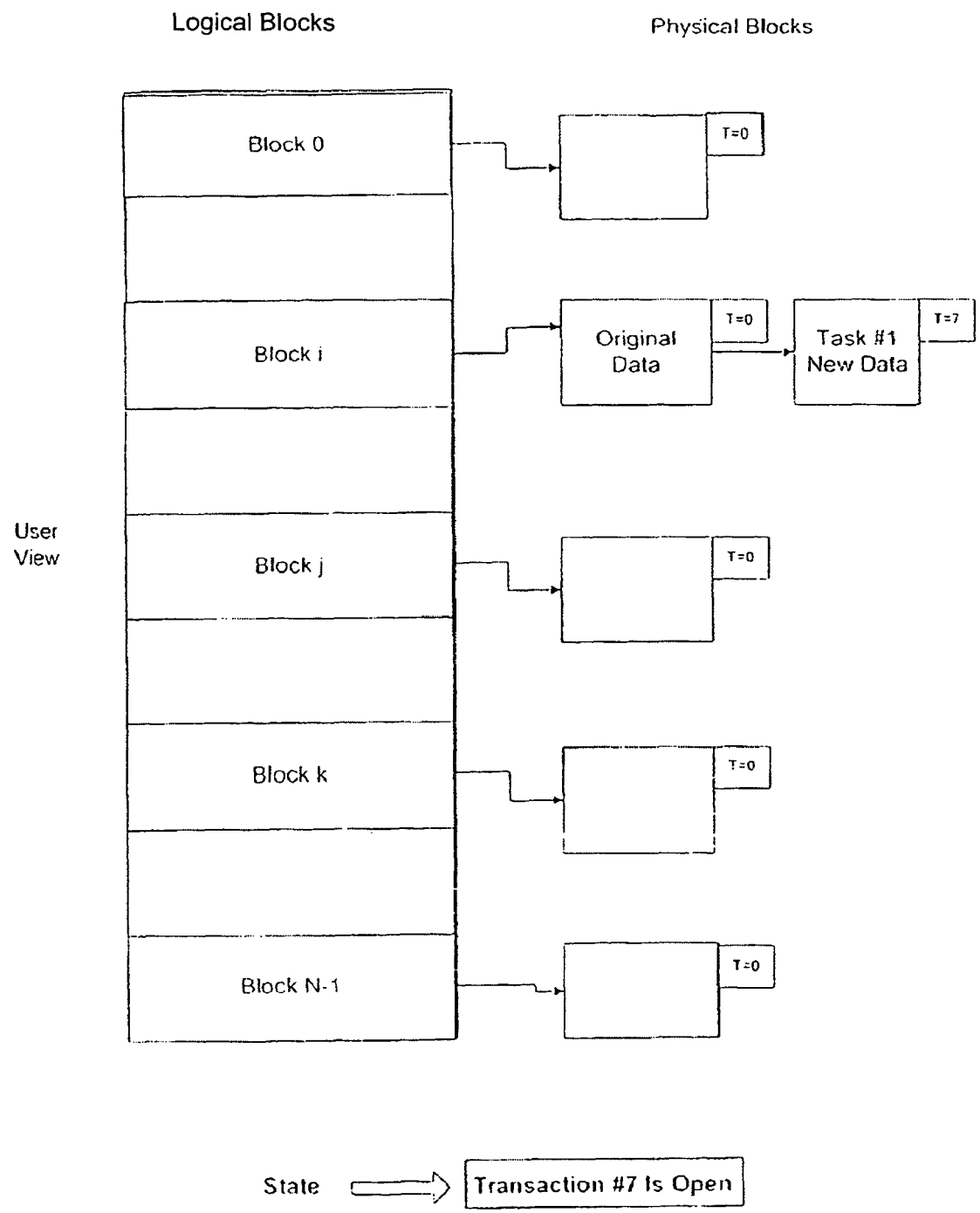

FIG. 14C is the equivalent of FIG. 11B and shows the state of the controller 160 mapping of logical blocks to physical blocks after the controller 160 processes a request from task #1 to write block "i". As shown in FIG. 14C, a new physical block is allocated to store the newly received data, conditionally associated with logical block address "i", and associated transaction #7. In comparison with FIG. 11B, the physical blocks chain of logical block "i" is extended to accept the new data, but now the block containing the new data is given a transaction field of #7, making it possible to identify its "owning" transaction.

Figure 14D:
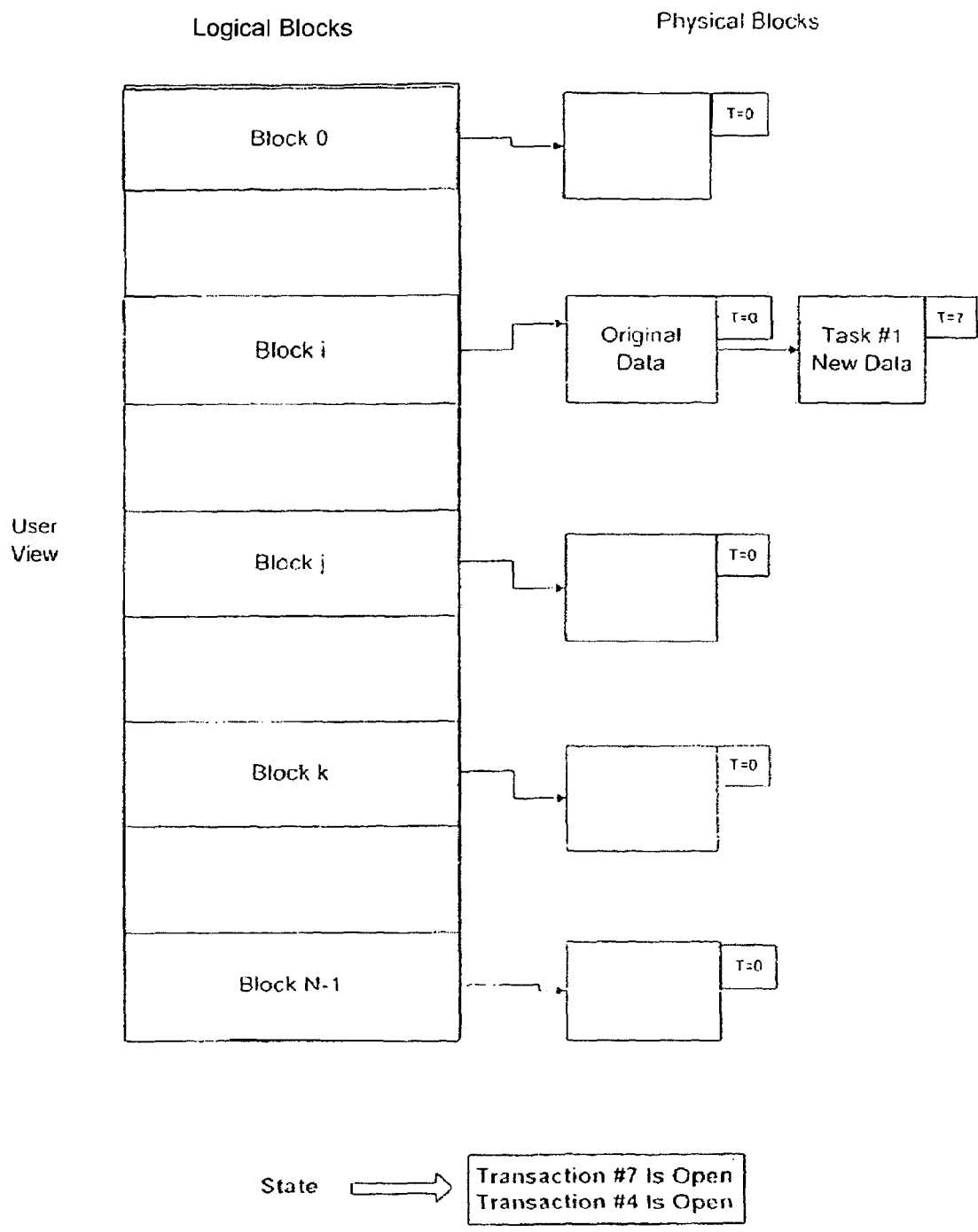

FIG. 14D shows the controller 160 state after task #2 directs the controller 160 to start a transaction. The controller 160 assigns a transaction identifier (#4 in the example), adds the transaction identifier to the global open transactions list, and returns the transaction identifier to the host application 120 requesting task #2.

Figure 14E:
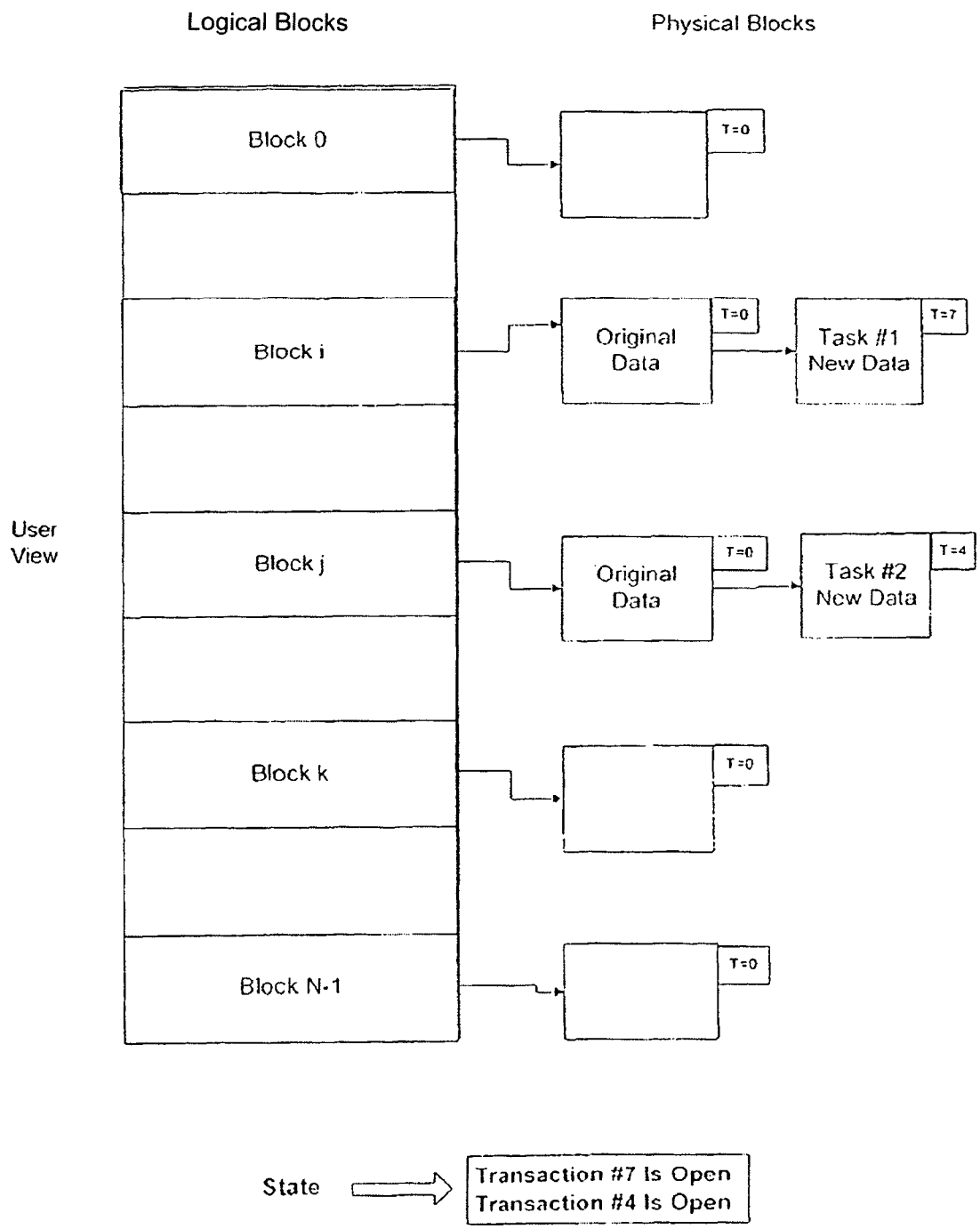

FIG. 14E is the equivalent of FIG. 11C and shows the controller 160 logical to physical block address mapping state after task #2 moves out of its consistent data state by writing to logical block address "j". As before, the physical blocks chain of logical block "j" is extended to accept the new data, but now the block containing the new data is given a transaction field of 4, making it possible to identify its "owning" transaction.

Figure 14F:
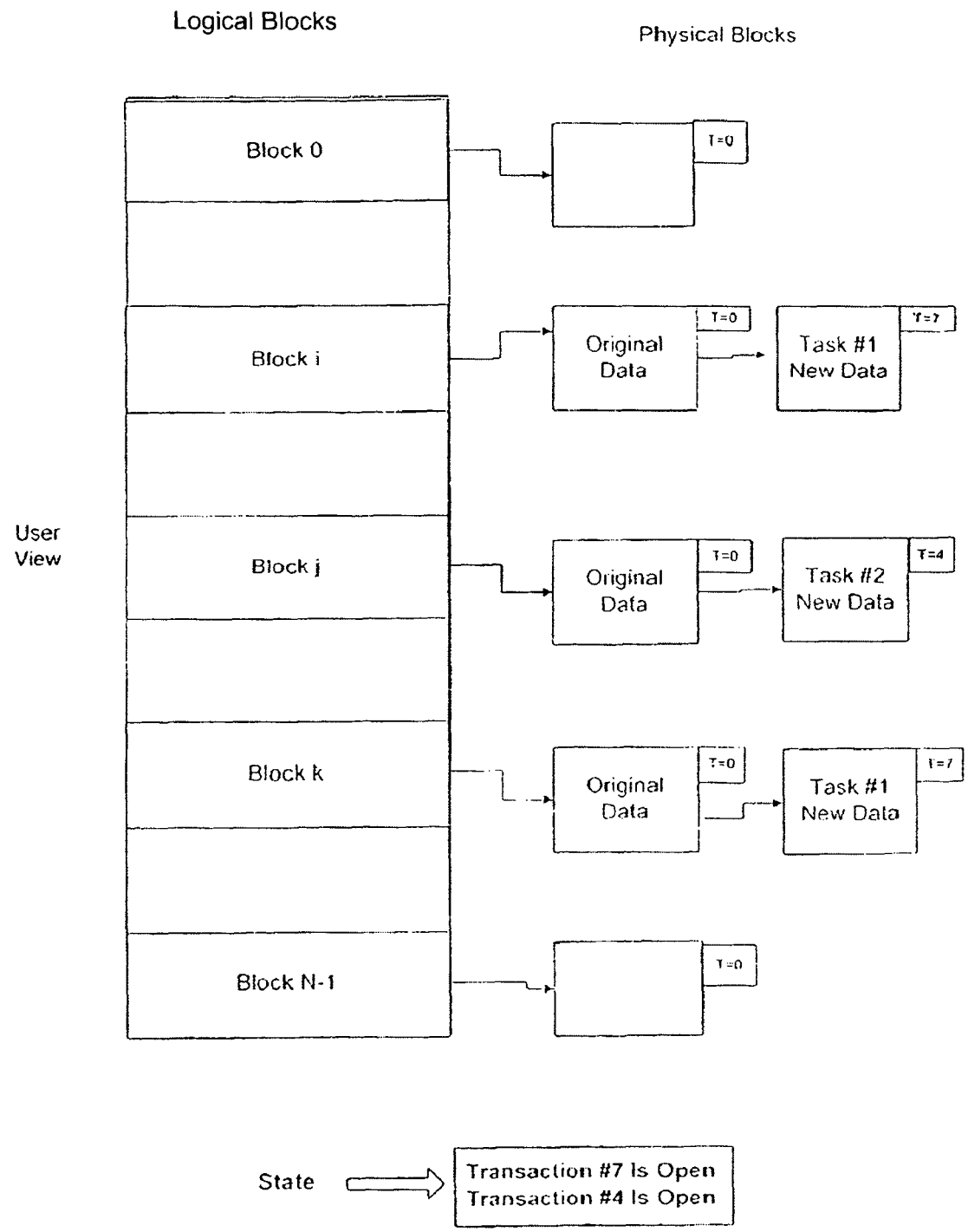

FIG. 14F is the equivalent of FIG. 11D and shows the controller 160 logical to physical block address mapping state after task #1 writes to logical block address "k". Again, a chain is extended and the new data is "identified" with transaction #7.

Figure 14G:
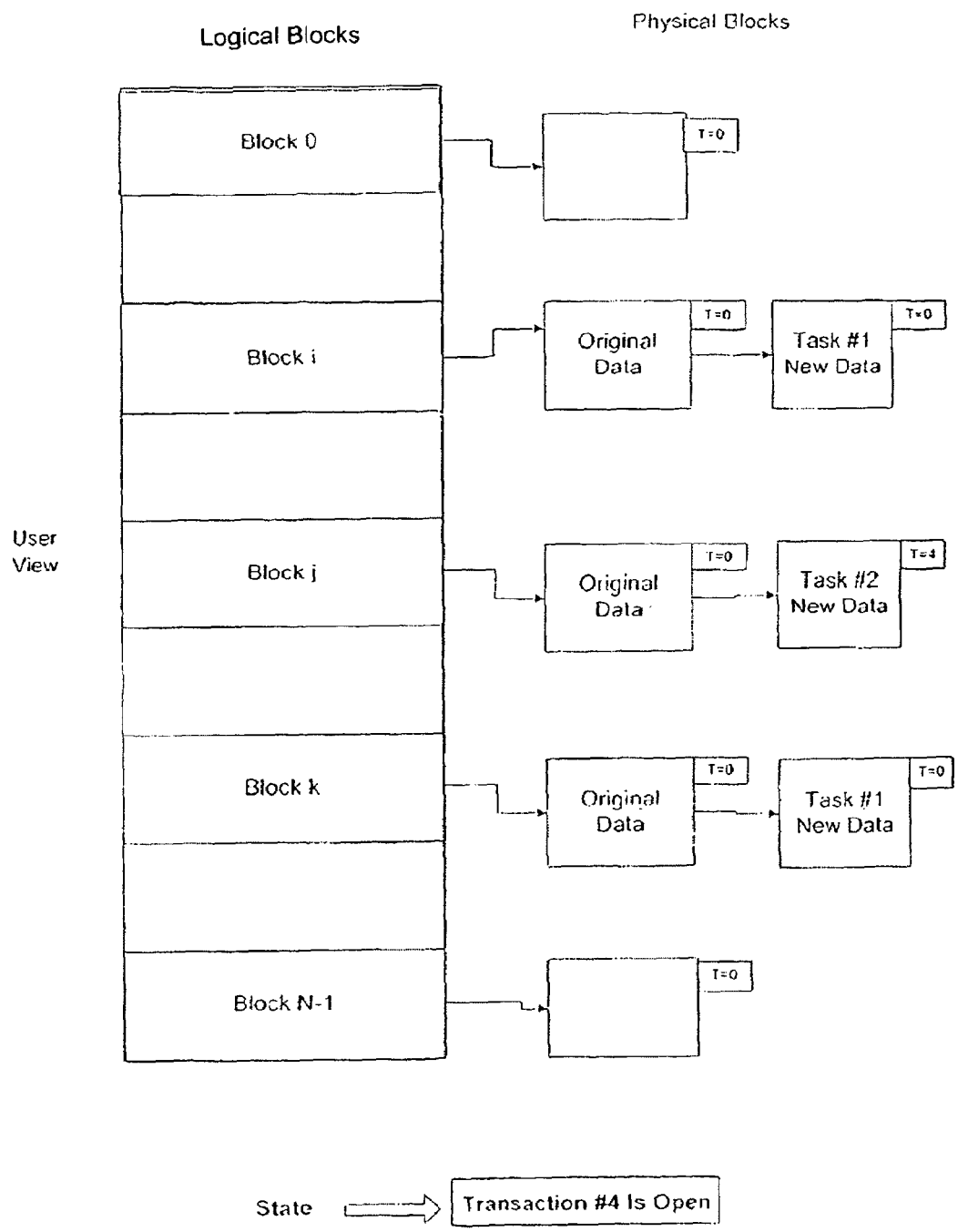

The host 110 may inform the non-volatile storage device 150 that all of the write commands associated with the set of commands from task #1 has been transmitted and processed, and hence, a new consistent data state can be established. The host 110 may indicate this by transmitting an end of set command to the controller 160 defining a new consistent data state. In FIG. 14G (the equivalent of FIG. 11E) the controller 160 logical to physical block address mapping state is shown after the host informs the controller that a new consistent data state has been reached because task #1 has been completed. As a result, the controller 160 removes transaction #7 from the global open transactions list (leaving only transaction #4 in the list), and the last physical blocks added to the chains of logical blocks "i" and "k" have their transaction fields set to null. In contrast to FIG. 11E, nothing is changed in logical block "j", as its transaction field is not #7 (the transaction being closed) but #4. Therefore the new data in block "j" remains conditionally associated, avoiding the problem that was illustrated in FIG. 11E.

Figure 14H:
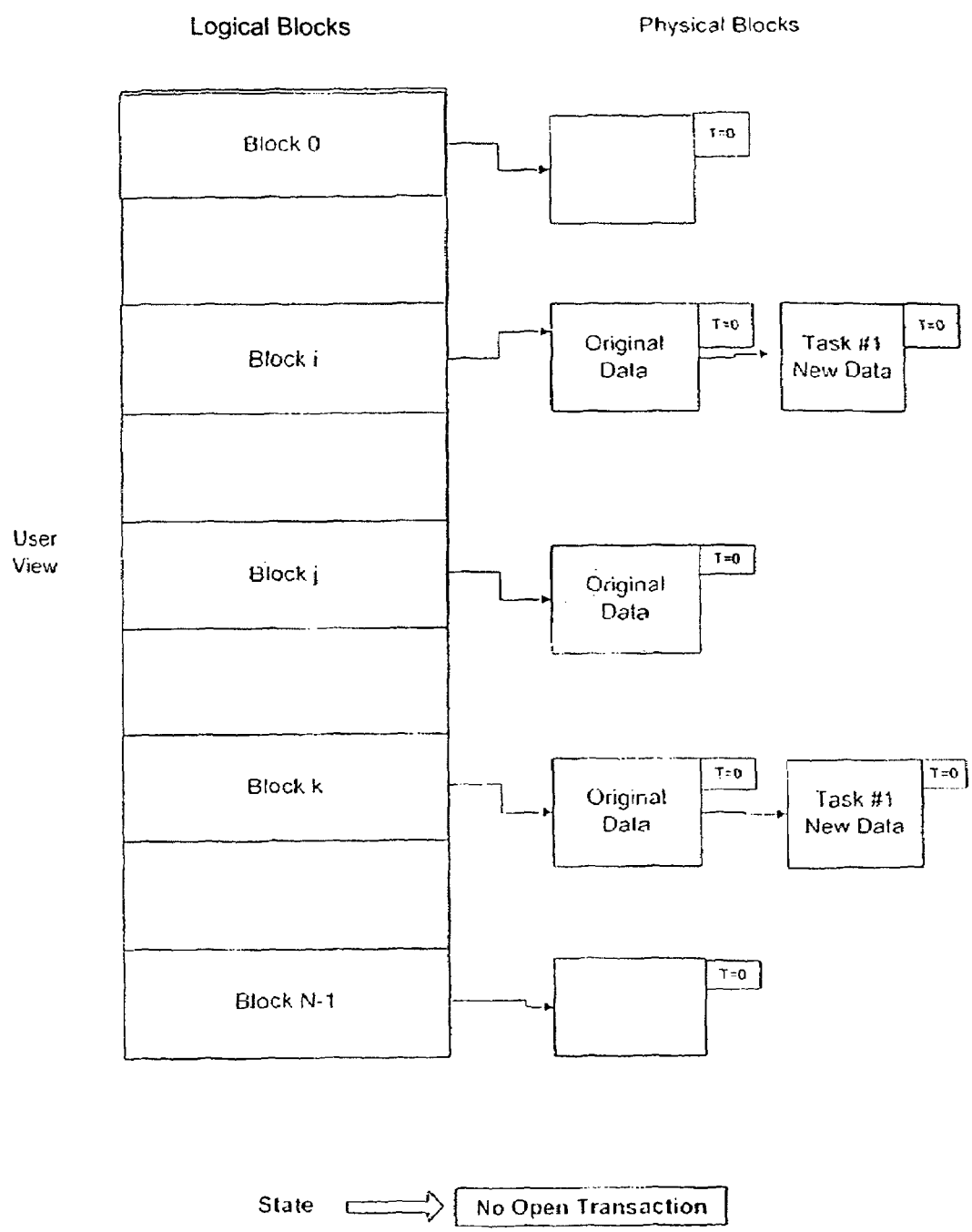

If a power failure occurs before the host 110 directs the controller 160 to close transaction #4 associated with task #2, the controller 160 will recover the data state of the device by rolling back changes to the storage data done as part of transaction #4, regardless of whether the change was done while transaction #7 was still open, or if the change occurred after transaction #7 was closed. Thus, the change to logical block "j" associated with transaction #4 will correctly be rolled-back during the recovery that the controller performs after the next power on. This is shown in FIG. 14H, which illustrates the controller's logical to physical block address mapping state after a recovery following a power loss occurring in the state shown in FIG. 14G. Logical block "j" is rolled-back to the data it had before starting transaction #4, and the global transaction list is cleared.

The exemplary embodiment shown in FIGS. 14A-14E demonstrate that the problem of multithreaded operation identified in FIGS. 11A-11E have been addressed through the use of a transaction identifier. Thus, the non-volatile memory device 150 may provide ruggedized operation when in communication with a host 110 that supports multitasking or multithreaded data access operations.

Considerations Associated with the Multithreaded Embodiment:

There are several issues that are important for the optimization and usefulness of the multithreaded embodiment described in FIGS. 13A-13F and FIGS. 14A-14E and the accompanying text.

a. Intercrossing Transactions: Even though the above examples did not demonstrate intercrossing transactions, the methods of this embodiment are equally applicable to the cases where multiple transactions cross each other on the same sector. That is, one transaction writes into a sector that contains conditionally associated data of another transaction. However, while the controller 160 can support such cases, it is the responsibility of the host to guarantee that the order by which the calls are generated really reflects the desired final outcome. In other words, the controller 160 give preference to more recently written data over less recent data, and thus the host 110 has to make sure the data to be kept after the intercrossing transactions is the data written last.

b. Multiple Transactions by Same Task: While the above examples focused on the case of two tasks concurrently accessing the storage device, the methods of this embodiment are equally applicable to the case of one task initiating concurrently open multiple transactions. This is actually a special and simpler case of the more general multitasking case, and may be useful for tasks operating on multiple files. For the purpose of the present embodiments, multitasking should be interpreted to also include the case of a single task generating multiple transactions.

c. Where Multiple Transactions are not Required: If it is known that the non-volatile storage device 150 does not ever need to support more than one open transaction at a time, the interface to the non-volatile storage device 150 driver may be simplified. As there is only one open transaction, there is no need for exchanging transaction identifiers between the host 110 and the non-volatile storage device 150. The interaction between the host 110 and the non-volatile storage device 150 in this case is as follows: 1) The host 110 requests the non-volatile storage device 150 to open a new transaction. 2) The host 110 sends commands to the non-volatile storage device 150 to carry out a sequence of operations that may each change the contents of the storage media, where a transaction identifier is not specified in the command. The command may indicate that it is associated with the only open transaction. 3) The host 110 requests the non-volatile storage device 150 to close the transaction, where a transaction identifier is not specified in the command. This mode of operation is a simplification of the more general multiple-transaction case, where the transaction handle is automatically implied and the numeric transaction field in the physical blocks can be replaced by a Boolean transaction flag indicating whether the block is taking part in the only open transaction. For the purpose of the present embodiments, transactions or transaction identifiers can be interpreted to also include this case of an implied transaction handle and a transaction Boolean flag.

d. Driver Commands not Associated with a Transaction: It is an advantage of this embodiment that it inherently supports host commands that are not associated with a transaction. This may be useful, for example, when some commands do not require the extra reliability of power-loss protection and it is not desired to pay the extra performance cost associated with ruggedized or multitasking-ruggedized operation. In order to not associate a command or its data with a transaction identifier, the host 110 may simply transmit a command to the non-volatile storage device with the transaction identifier field set to the null transaction identifier. This has the effect of automatically and immediately unconditionally associating the data with the consistent data state, where the controller cannot roll back the data in a recovery operation. Alternatively, the host 110 may also send write commands to the controller 160 that do not have support for a transaction identifier. When the controller 160 processes these commands, it will set the transaction identifier field of the physical block to the null transaction identifier value.

e. Read Operations: Intermixing or interleaving read commands within transactions is permitted. Such commands do not change the media contents and therefore are not associated with any transaction. However, care should be taken when a read is attempted to a logical block address which is being modified by an open transaction (a transaction still in progress). There are two alternative approaches that a controller 160 could take in responding to the read request.

The controller 160 could return the latest data associated with the logical block address, whether conditionally associated or unconditionally associated. While this may be acceptable in many cases, a problem arises when two tasks are modifying data at the same address. For example, consider the following scenario: i. Task #1 writes block A as part of transaction T1. ii. Task #2 reads block A and gets Task #1 data. iii. Task #2 makes a small modification to the data and writes it back into block A as part of transaction T2. iv. Task #2 closes transaction T2. v. A power-loss occurs. vi. On next power-on the controller 160 removes the effects of transaction T1 (which was never closed). While at first glance it seems that the effects of the interrupted T1 transaction were correctly removed, this is not so. The non-committed T1 data of block A became unconditionally associated with the logical block address by the read/modify/write operation of Task #2.

Alternatively, the controller could return the latest data unconditionally associated with the logical block address, ignoring any non-committed data that might be appended to the chain as part of an open transaction. While this may be acceptable in many cases, a problem arises when two tasks are modifying data at the same address. For example, consider the following scenario: i. Task #1 reads block A and gets the original data. ii. Task #1 makes a small modification to the data and writes it back into block A as part of transaction T1. iii. Task #2 reads block A and gets the original data, without task #1 modification. iv. Task #1 closes transaction T1. v. Task #2 makes a small modification to the data and writes it back into block A as part of transaction T2. vi. Task #2 closes transaction T2. In this case, the controller 160 recovery problem discussed above has been avoided, but another problem arises when there is no power-loss. The data generated by Task #1 is lost, which would not happen if a host performed the same series of accesses to a non-ruggedized non-volatile storage device. Thus, there is no one approach suitable for all cases, as the optimal behavior depends on the host's pattern of use. Thus, consequently it is advantageous to have the controller provide a configurable parameter that the host may set with a command that allows the host to select between the above two alternative multithreaded read behaviors.

f. Power-Loss During Processing of a Command to Close a Transaction: Care should be taken in the implementation of this embodiment because it is possible for a power loss to occur while the controller 160 is in the middle of closing a transaction. If a power-loss occurs in the middle of the unconditional associating process that is part of closing a transaction, the controller 160 may have already committed some of the blocks associated with the transaction (by nullifying their transaction fields) but not all of them. During the next power-on the transaction, the controller 160 will find the transaction as open and will attempt to roll back its changes. But this roll-back will only be able to remove those physical blocks not committed yet, resulting in a half-committed transaction and an inconsistent data state. One possible solution to this is that upon receiving a "close transaction" command the controller 160 can mark the transaction with a "closing in progress" flag in the open transactions list. In doing so, the controller 160 will not roll-back an open transaction with this flag set, but will continue with the interrupted transaction closing operation for this transaction, unconditionally associating the rest of the physical block data received in the transaction with the corresponding logical block addresses. This exemplary modification may provide full protection against power-loss in the middle of transaction closing.

g. More Optimizations: As it is readily apparent to any person skilled in the art, there are numerous optimizations that can be applied to the methods of this embodiment without deviating from the essence of these methods. For example, the controller 160 may maintain in RAM tables that map each open transaction into the list of blocks associated with that transaction. This can speed-up the processing of "close transaction" commands. As another example, the controller 160 may store in the non-volatile memory 180 tables that map each open transaction into the list of blocks associated with that transaction. This can speed-up the process of recovery and clean-up after a power-loss, by avoiding having to scan each logical block address in the non-volatile storage device 150. All such optimizations are considered to be within the scope of the present embodiments.

Figure 15:
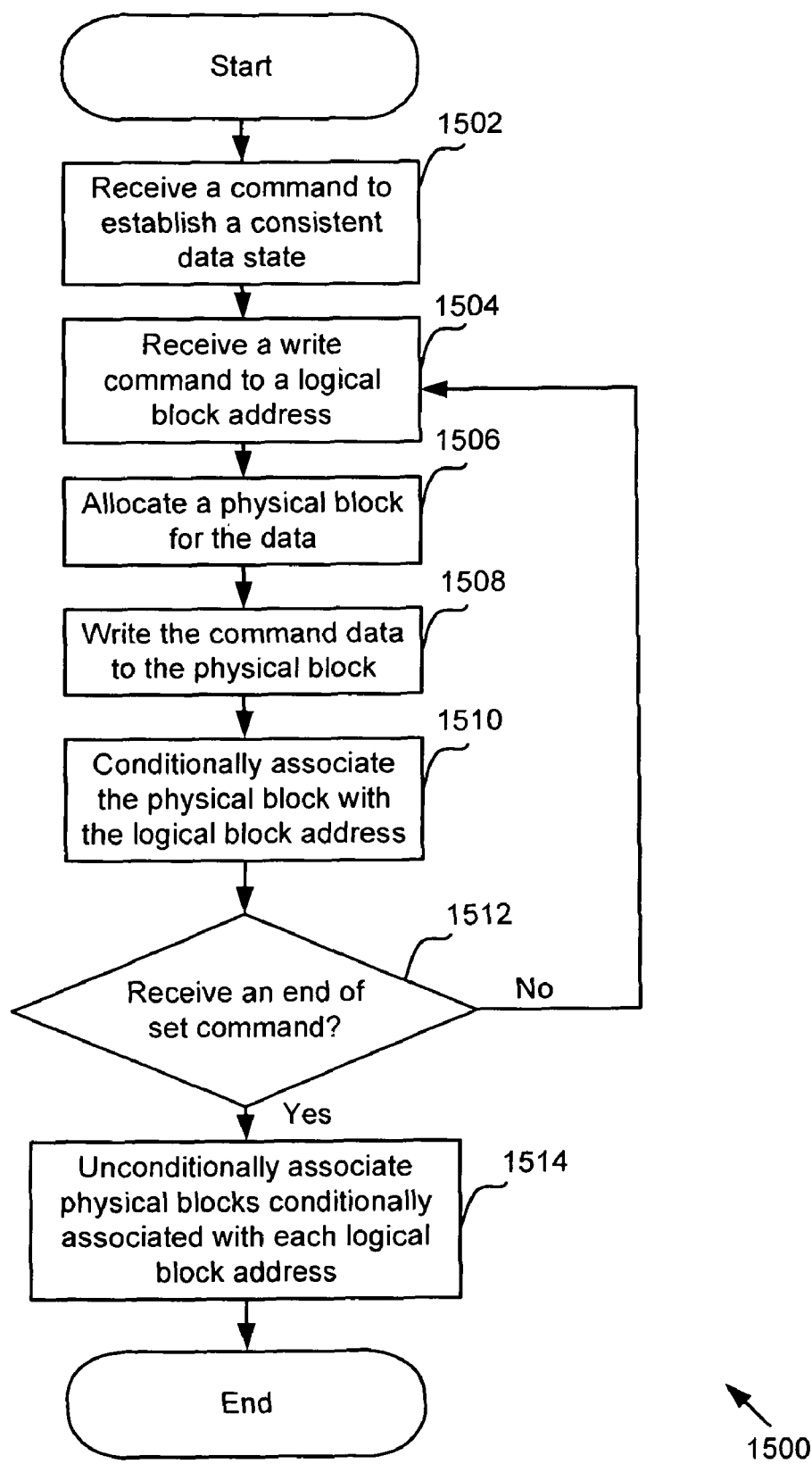
FIG. 15 shows exemplary steps for a controller in a non-volatile storage device processing write requests from a host in a single threaded system.

Thus, a controller 160 may be adapted to support ruggedized write operations from hosts 110 presenting single threaded or multithreaded write operations. FIG. 15 shows exemplary steps 1500 for a controller 160 in a non-volatile storage device 150 processing write requests from a host 110 in a single threaded system. Control begins at step 1502, where the controller receives a command from the host 110 to establish a consistent data state. If the controller 160 subsequently needs to perform a roll-back or recovery to a consistent data state, the data in the device will be restored to this state using the methods described above. Stated another way, the controller 160 may assume that every command received after this point is part of a set of commands sent by the host 110 to transition the storage device from one consistent data state to the next consistent data state. In one embodiment, this command is unnecessary, as the non-volatile memory device 150 uses a previously received end of set command, shown in step 1512, as a command indicating the beginning of the next set of commands transitioning the device to the next consistent data state.

Control passes to step 1504, where a write command in a set of commands is received from the host 110. The command may comprise a logical block address, and data to write. The controller 160 responds to this command by allocating a physical block to store the data in step 1506. The physical block is a storage element in the non-volatile memory 180 of the non-volatile storage device 150. The controller 160 writes the data received in the command to the physical block in step 1508. Control then passes to step 1510, where the physical block is conditionally associated with the logical block address the write command directed the data to, perhaps by adding the block to the end of a chain of physical blocks associated with the logical block address. Because the physical block (and thus the data) is only conditionally associated with the logical block address, in the event of a power loss, the association between this logical block address and the physical block (and thus the data) will be removed if the controller 160 needs to recover the non-volatile storage device to a consistent data state after a power loss.

In step 1512, the controller 160 determines if an end of set command is received from the host 110. If not, control passes back to step 1504, where the controller waits to receive another write command that is part of the set of commands. Assuming sufficient physical block storage space, the loop shown in steps 1500 may be repeated for as many commands as are in the set of commands. When returning to step 1504 for subsequent loops through the steps 1500, the command received may be a continuation of the command received during the first time a command was received in step 1504, and thus, may not contain all of the information already specified by the host. For example, a write command may specify a starting address and some of the data to write. A subsequent write command containing the remainder of the data to write may not contain an address or other command information, because it is assumed that the controller 160 has saved the command information and can calculate the address information for the subsequent continuing write operation.

Returning to step 1512, if the host 110 transmitted an end of set command, control passes to 1514, where the controller 160 establishes a consistent data state by unconditionally associating the data received in the commands processed in steps 1504-1510 with their corresponding logical block addresses. In this way, the data received in steps 1504-1510 becomes part of the new consistent data state. Once this is complete, the steps 1500 terminate. As mentioned above, the controller may treat the command ending one set of commands as the start of a new set of commands, so that any command received thereafter is treated as an attempt by the host 110 to transition the non-volatile storage device to yet another new consistent data state.

Figure 16:
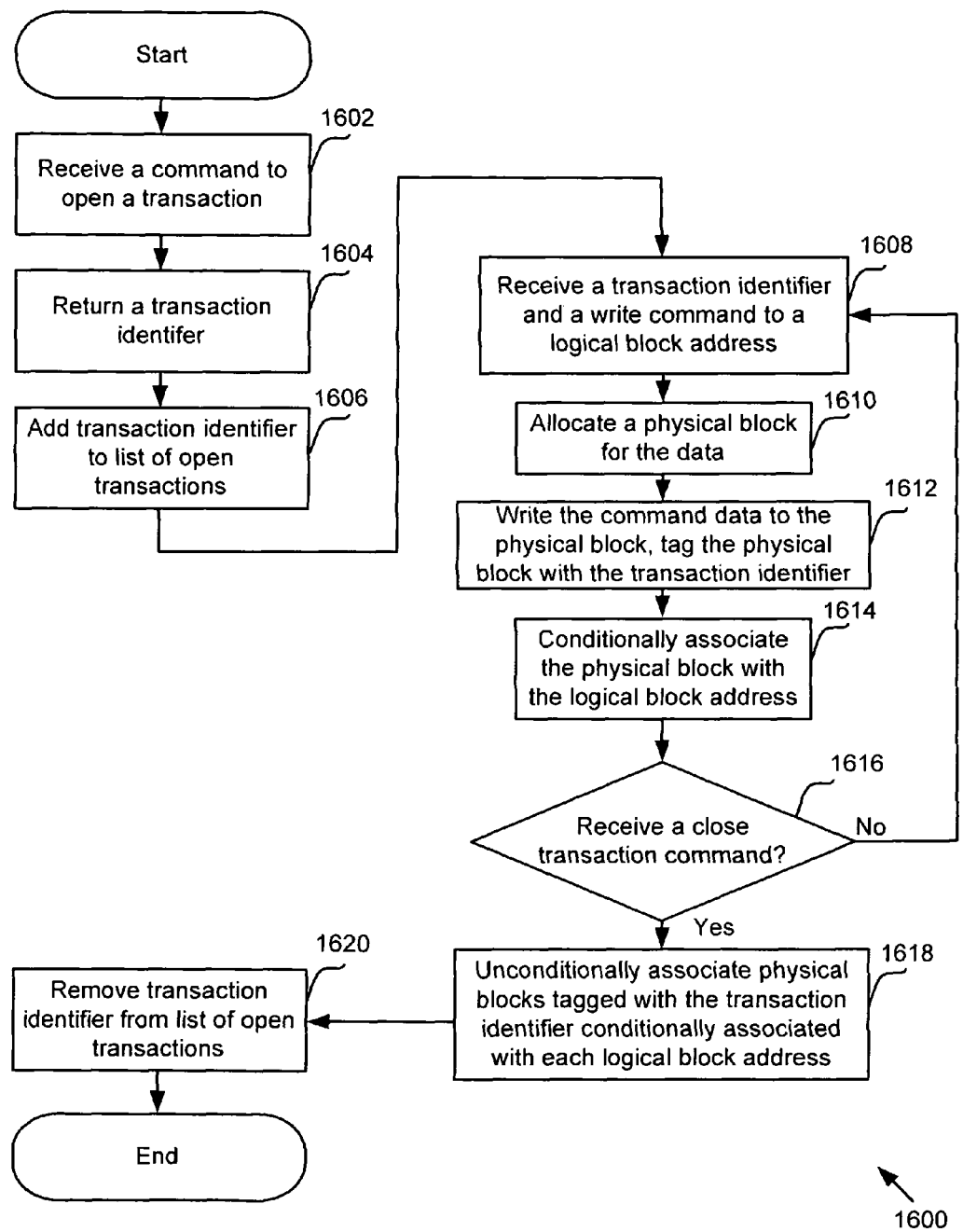
FIG. 16 shows exemplary steps for a controller in a non-volatile storage device processing write requests from a host in a multi-threaded system.

FIG. 16 shows exemplary steps for a controller 160 in a non-volatile storage device 150 processing write requests of a single transaction received from a host 110 in a multi-threaded system. Control begins at step 1602, where the controller 160 receives a command from the host 110 to establish a transaction. Control passes to step 1604, where the controller 160 selects an unused transaction identifier value, and returns the value to the host 110. At step 1606, the controller adds this transaction identifier to the list of open transaction identifiers. In the event of a power loss or interruption in the middle of the transaction (before it is closed in response to a command from the host 110 at step 1616), the controller 160 will roll-back any data changes to the non-volatile memory 180 associated with the transaction identifier. In other words, data received in a write command associated with the transaction identifier is conditionally associated with the corresponding logical block address until the transaction is closed. If a power interruption is closed, the data changes associated with that incomplete transaction is rolled-back by removing stored data associated with that transaction identifier.

Control passes to step 1608, where the first write command in a set of commands associated with the transaction identifier is received from the host 110 at the controller 160. In one implementation, the command includes a logical block address, and contains a transaction identifier to allow the controller 160 to associate the command with an open transaction. At step 1610, the controller 160 allocates a physical block to store the data. The controller 160 stores the data in the physical block in step 1612, and the physical block (and thus the data) is tagged with the transaction identifier. At step 1614, the new physical block (and thus the data) is conditionally associated with the logical block address corresponding to the write command received in step 1608. In one embodiment, this conditional association includes adding the physical block to the chain of physical blocks mapped by the controller 160 to the logical block address.

In step 1616, the controller 160 determines if a close transaction command is received from the host 110, applying to the currently open transaction. If not, control passes back to step 1608, where the controller waits to receive another write command that is part of the set of commands in the open transaction. Assuming sufficient physical block storage space, the loop of shown in steps 1600 may be repeated for as many commands as there are in the set of commands in the transaction. When returning to step 1608 for subsequent operations through the loop of steps in FIG. 16, the command received may be a continuation of a previously received write command associated with the transaction. Thus, the next write command may not contain all of the information already specified by the host 110 in a previous command. For example, if a first write command specifies a starting address and some of the data to write, a subsequent command containing the remainder of the write data to write may not contain an address or other command information, because it is assumed that the controller 160 has saved the command information and can calculate the address information for the subsequent continuing write operation. However, any command received at step 1608 must be identified with the transaction identifier to distinguish it from other commands that the controller 160 might receive while the transaction is open.

Returning to step 1616, if the host 110 transmitted a close transaction command having a matching transaction identifier, control passes to 1618. The close transaction command contains the identifier of the transaction to be closed. Because the host 110 has told the controller 160 that all of the data associated with a transaction has been received, the controller 160 must take action to prevent this data from being removed during a recovery if a power loss should occur. To do this, the controller 160 unconditionally associates the data received in the write commands having the transaction identifier that were processed in steps 1608-1614 with their corresponding logical block addresses. In this way, the data received in steps 1608-1614 becomes part of the new consistent data state. In step 1620, the transaction identifier of the closed transaction is removed from the list of open transactions. Once this is complete, the steps 1600 terminate.

A non-volatile storage device with a controller implemented according to the methods of the present embodiments has several advantages. If power is interrupted to the non-volatile storage device in the middle of a set of commands that transition the device between consistent data states, or a during a set of commands that define an atomic transaction, the non-volatile storage device can recover itself to a consistent data state without any assistance from the host. The recovery process may not require any special commands or direction from the host, and may be initiated automatically by the controller in the non-volatile storage device when power is restored. The non-volatile memory device exports a few additional commands to the host to allow the host to define a consistent data state (the beginning and end of a set of commands that define an atomic transaction) or to associate certain commands (such as write or erase) with a transaction. A host can choose to utilize this extended command set to take advantage of the ruggedized features of the non-volatile storage device without having to maintain the internal data structures of the device required to support ruggedized operation. This simplification from the host's perspective allows the non-volatile memory device to be used with hosts that advantageously utilize the ruggedized features of the non-volatile memory device, and those that do not. Further, because the host does need to not maintain the data structures required for ruggedized operation, and does not access the non-volatile storage device in order to recover a consistent data state, the available bandwidth on the communication interface between the host and the non-volatile storage device is increased. Although the invention has been described with respect to various system and method embodiments, it will be understood that the invention is entitled to protection within the full scope of the appended claims.

What is claimed is:

1. A method of processing an atomic transaction in a non-volatile storage device, comprising:
   receiving a set of commands at the non-volatile storage device, wherein the set of commands comprises a plurality of write commands, and each write command is associated with a corresponding logical block address and comprises data and a transaction identifier, and wherein the transaction identifier comprises a value, and the value of the transaction identifier of each write command in the set of commands is identical;
   processing each of the plurality of write commands, comprising:
      writing the data from each write command to a physical block of a non-volatile memory within the non-volatile storage device; and
      conditionally associating the data received from each write command with its corresponding logical block address;
      associating a value with the physical block, where the value is indicative of a current consistent data state of the non-volatile storage device;
   receiving an additional write command after the set of commands begins and before an end of set command is received;
   receiving an end of set command indicating an end of the set of commands associated with the transaction identifier, wherein the end of set command is associated with the set of commands, and the additional write command is not associated with the set of commands; and
   in response to receiving the end of set command, and without moving the data within the non-volatile storage device, for each logical block address that is associated with a write command in the set of commands, unconditionally associating with the logical block address the data of the last command of the set of commands conditionally associated with the logical block address.

2. The method of claim 1, further comprising: receiving a command indicating a start of the set of commands prior to receiving the set of commands.

3. The method of claim 1, wherein conditionally associating the data received from each command with its corresponding logical block address comprises associating the physical block with the logical block address, wherein a plurality of physical blocks are associated with the logical block address.

4. The method of claim 1, wherein processing each of the plurality of write commands further comprises erasing the physical block before writing the data to the physical block.

5. The method of claim 4, further comprising:
   in response to receiving the end of set command, and without moving the data within the non-volatile storage device, for each logical block address that is associated with a write command in the set of commands, disassociating all physical blocks from the logical block address except for a most recently written physical block associated with the logical block address.

6. The method of claim 1, wherein associating a value with the physical block comprises:
   if a previously allocated physical block is a most recently written block associated with a logical block address that is associated with a write command in the set of commands:
      reading a flag value for the previously allocated physical block;
      toggling the flag value to form a toggled flag value; and
      associating the toggled flag value with a newly allocated physical block, wherein writing the data to the physical block comprises writing the data to the newly allocated physical block.

7. The method of claim 6, further comprising:
   in response to receiving the end of set command, and without moving the data within the non-volatile storage device, for each logical block address that is associated with a write command in the set of commands, disassociating all physical blocks from the logical block address except for a most recently written physical block having the toggled flag value.

8. The method of claim 1, wherein associating a value with the physical block comprises:
   getting the value indicative of a version of a current consistent data state of the non-volatile storage device;
   incrementing the value to form an incremented value; and
   associating the incremented value with the physical block.

9. The method of claim 8, wherein unconditionally associating with the logical block address the data of the last command of the set of commands conditionally associated with the logical block address comprises updating the value indicative of the current consistent data state of the non-volatile storage device with the incremented value.

10. A method of processing an atomic transaction in a non-volatile storage device, comprising:
receiving a set of commands at the non-volatile storage device, wherein the set of commands comprises a plurality of write commands, and each write command is associated with a corresponding logical block address and comprises data and a transaction identifier, and wherein the transaction identifier comprises a value, and the value of the transaction identifier of each write command in the set of commands is identical;
processing each of the plurality of write commands, comprising:
writing the data from each write command to a physical block of a non-volatile memory within the non-volatile storage device; and
conditionally associating the data received from each write command with its corresponding logical block address;
associating a value with the physical block, where the value is indicative of a current consistent data state of the non-volatile storage device; and
writing the transaction identifier from each write command to a non-volatile memory within the non-volatile storage device;
receiving an additional write command after the set of commands begins and before an end of set command is received
receiving an end of set command indicating an end of the set of commands associated with the transaction identifier, wherein the end of set command is associated with the set of commands, and the additional write command is not associated with the set of commands; and
in response to receiving the end of set command, for each logical block address that is associated with a write command in the set of commands, unconditionally associating with the logical block address the data of the last command of the set of commands conditionally associated with the logical block address.

11. The method of claim 10, further comprising:
receiving a command indicating a start of the set of commands prior to receiving the set of commands.

12. The method of claim 10, wherein the transaction identifier comprises a flag operative to associate the write command with the set of commands.

13. The method of claim 10, wherein conditionally associating the data received from each command with its corresponding logical block address comprises associating the physical block with the logical block address, wherein a plurality of physical blocks are associated with the logical block address.

14. The method of claim 10, wherein writing the transaction identifier to a non-volatile memory within the non-volatile storage device comprises associating the transaction identifier with the physical block.

15. The method of claim 10, further comprising adding the transaction identifier to a list of open transactions if the transaction identifier is not already in the list of open transactions.

16. The method of claim 15, further comprising removing the transaction identifier from the list of open transactions when the end of set command is received.

17. The method of claim 10, further comprising setting a transaction identifier value associated with the physical block to a pre-determined value after receiving the end of set command.

18. The method of claim 10, wherein the processing further comprises:
erasing the physical block before writing the data to the physical block.

19. The method of claim 18, further comprising:
in response to receiving the end of set command, and without moving the data within the non-volatile storage device, for each logical block address that is associated with a write command in the set of commands, disassociating all physical blocks from the logical block address except for a most recently written physical block associated with the logical block address.

20. The method of claim 10, wherein associating a value with the physical block comprises:
if a previously allocated physical block is a most recently written block associated with a logical block address that is associated with a write command in the set of commands:
reading a flag value for the previously allocated physical block;
toggling the flag value to form a toggled flag value; and
associating the toggled flag value with a newly allocated physical block, wherein writing the data to the physical block comprises writing the data to the newly allocated physical block.

21. The method of claim 20, further comprising:
in response to receiving the end of set command, and without moving the data within the non-volatile storage device, for each logical block address that is associated with a write command in the set of commands, disassociating all physical blocks from the logical block address except for a most recently written physical block having the toggled flag value.

22. The method of claim 10, wherein associating a value with the physical block comprises:
getting the value indicative of a version of a current consistent data state of the non-volatile storage device;
incrementing the value to form an incremented value; and
associating the incremented value with the physical block.

23. The method of claim 22, wherein unconditionally associating with the logical block address the data of the last command of the set of commands conditionally associated with the logical block address comprises updating the value indicative of the current consistent data state of the non-volatile storage device with the incremented value.

24. A method of processing an atomic transaction in a non-volatile storage device, comprising:
receiving a set of commands at the non-volatile storage device, wherein the set of commands comprises a plurality of write commands, and each write command is associated with a corresponding logical block address and comprises data and a transaction identifier, and wherein the transaction identifier comprises a value, and the value of the transaction identifier of each write command in the set of commands is identical;
processing each of the plurality of write commands, comprising:
writing the data from each write command to a non-volatile memory within the non-volatile storage device; and
conditionally associating the data received from each write command with its corresponding logical block address;
receiving an additional write command after the set of commands begins and before an end of set command is received;

receiving the end of set command indicating the end of the set of commands associated with the transaction identifier, wherein the end of set command is associated with the set of commands, and the additional write command is not associated with the set of commands; and in response to receiving the end of set command, for each logical block address that is associated with a write command in the set of commands, unconditionally associating with the logical block address the data of the last command of the set of commands conditionally associated with the logical block address.

25. The method of claim 24, wherein the additional write command is associated with an additional set of commands, the additional set of commands comprising a plurality of additional write commands, each additional write command associated with an additional logical block address and comprising data and an additional transaction identifier, wherein the transaction identifier and the additional transaction identifier distinguishes the set of commands from the additional set of commands.

* * * * *

UNITED STATES PATENT AND TRADEMARK OFFICE
CERTIFICATE OF CORRECTION

| | | |
|---|---|---|
| PATENT NO. | : 8,266,365 B2 | Page 1 of 1 |
| APPLICATION NO. | : 12/316924 | |
| DATED | : September 11, 2012 | |
| INVENTOR(S) | : Lasser | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this
Fifteenth Day of July, 2014

Michelle K. Lee
*Deputy Director of the United States Patent and Trademark Office*